(12) United States Patent
Itoh et al.

(10) Patent No.: US 10,242,030 B2
(45) Date of Patent: Mar. 26, 2019

(54) INFORMATION PROCESSING SYSTEM, INFORMATION PROCESSING METHOD, AND INFORMATION PROCESSING APPARATUS

(71) Applicants: Atsushi Itoh, Kanagawa (JP); Hidenobu Kishi, Kanagawa (JP); Kunikazu Okajima, Kanagawa (JP); Kohichi Sakamoto, Tokyo (JP); Toshiki Yamanishi, Tokyo (JP); Yuki Wakita, Tokyo (JP); Junko Nakano, Tokyo (JP)

(72) Inventors: Atsushi Itoh, Kanagawa (JP); Hidenobu Kishi, Kanagawa (JP); Kunikazu Okajima, Kanagawa (JP); Kohichi Sakamoto, Tokyo (JP); Toshiki Yamanishi, Tokyo (JP); Yuki Wakita, Tokyo (JP); Junko Nakano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

(21) Appl. No.: 15/228,253

(22) Filed: Aug. 4, 2016

(65) Prior Publication Data
US 2017/0052980 A1    Feb. 23, 2017

(30) Foreign Application Priority Data

Aug. 7, 2015 (JP) ................. 2015-157726
Aug. 20, 2015 (JP) ................. 2015-163210
(Continued)

(51) Int. Cl.
*G06F 7/00* (2006.01)
*G06F 17/30* (2006.01)

(52) U.S. Cl.
CPC .... *G06F 17/30247* (2013.01); *G06F 17/3028* (2013.01); *G06F 17/30259* (2013.01)

(58) Field of Classification Search
None
See application file for complete search history.

(56) References Cited

U.S. PATENT DOCUMENTS

2004/0215660 A1\* 10/2004 Ikeda ................ G06F 17/30277
2007/0283277 A1\* 12/2007 Hayakawa ............ G06F 3/0481
715/748

(Continued)

FOREIGN PATENT DOCUMENTS

JP     2014-010723       1/2014
JP     2016-095787       5/2016
(Continued)

*Primary Examiner* — Tuan A Pham
(74) *Attorney, Agent, or Firm* — Harness, Dickey & Pierce, P.L.C.

(57) ABSTRACT

A terminal device stores therein an application program provided by a second provider and including an image search program. An image search system provided by a first provider stores therein image data and identification information identifying the image search program; registers, in association with the identification information, setting information indicating whether a storage area to be searched is a first storage area exclusive to the second provider or a second storage area not exclusive to the second provider; stores the image data specified as a search target by the second provider in the first or second storage area; receives a search request for the image data transmitted from the terminal device; determines, when the search request includes the identification information, a storage area to be searched among the first and second storage areas; and determines, when not, the second storage area to be the storage area to be searched.

15 Claims, 53 Drawing Sheets

(30) Foreign Application Priority Data

Jan. 22, 2016  (JP) ................................ 2016-010966
Jan. 22, 2016  (JP) ................................ 2016-011017

(56) References Cited

U.S. PATENT DOCUMENTS

| | | | |
|---|---|---|---|
| 2014/0006387 A1* | 1/2014 | Kishi | G06F 17/30554 707/722 |
| 2014/0188931 A1* | 7/2014 | Smiling | G06F 17/30545 707/770 |
| 2016/0140704 A1 | 5/2016 | Itoh et al. | |
| 2016/0140715 A1 | 5/2016 | Wakita et al. | |
| 2016/0364415 A1 | 12/2016 | Itoh et al. | |

FOREIGN PATENT DOCUMENTS

| | | |
|---|---|---|
| JP | 2016-095790 | 5/2016 |
| JP | 2017-004380 A | 1/2017 |

* cited by examiner

FIG.18

Module registration/edit

- Module ID: ⸺ 5201
- Contract type: ⦿ Evaluation contract  ◯ Formal contract ⸺ 5202
- Start date of use: 2015/05/20 ⸺ 5203
- End date of use: 2015/11/20 ⸺ 5204
- DB number: ◯ Ordinary  ⦿ Exclusive  SP002 ⸺ 5206 (5205)
- Client ID: ⸺ 5207
- Application ID: ⸺ 5208
- Package name: ⸺ 5209
- Add ⸺ 5210
- Application name/notes: ⸺ 5211

OK (5212)    Cancel (5213)

FIG.26

```
1: 
2:         <hotspot>
3:                 <area>x1,y1,x2,y2</area>
4:                 <link>
5:                         <title>****Shop Web Page</title>
6:                         <type>info</type>
7:                         <URI>http://1.example.org/index.html</URI>
8:                 </link>
9:                 <link>
10:                        :
11:                </link>
12:        </hotspot>
13:        <hotspot>
14:                :
15:        </hotspot>
16: 
```

FIG.30A

Image search application — 4001'

AID9785937123 — 4010

Image search module — 4020

DBS847012 — 4021

| Module registration/edit | | |
|---|---|---|
| Module ID: | DBS847012 | 5201 |
| Contract step: | ◯ Evaluation contract  ⦿ Formal contract | 5202 |
| Start date of use: | 2015/05/20 | 5203 |
| End date of use: | 2015/11/20 | 5204 |
| DB number: | ◯ Ordinary  ⦿ Exclusive  SP002 | 5205, 5206 |
| Client ID: | | 5207 |
| Application ID: | AID9785937123 | 5208 |
| Package name: | | 5209 |
| | Add | 5210 |
| Application name/notes: | | 5211 |
| | OK   Cancel | 5212, 5213 |

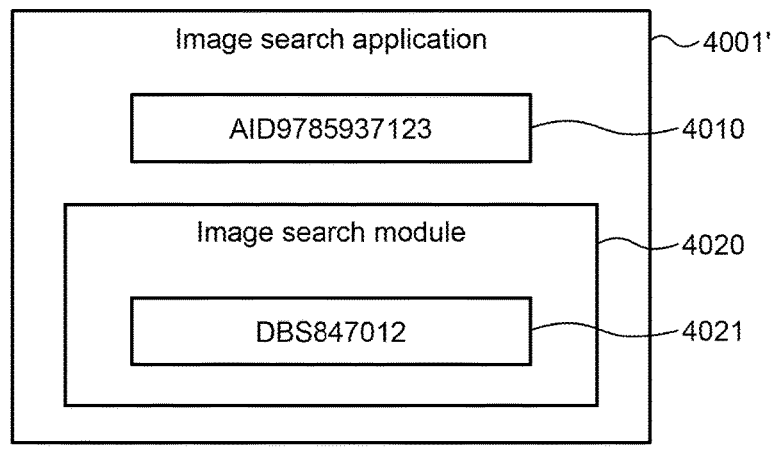
FIG.31A / FIG.31B

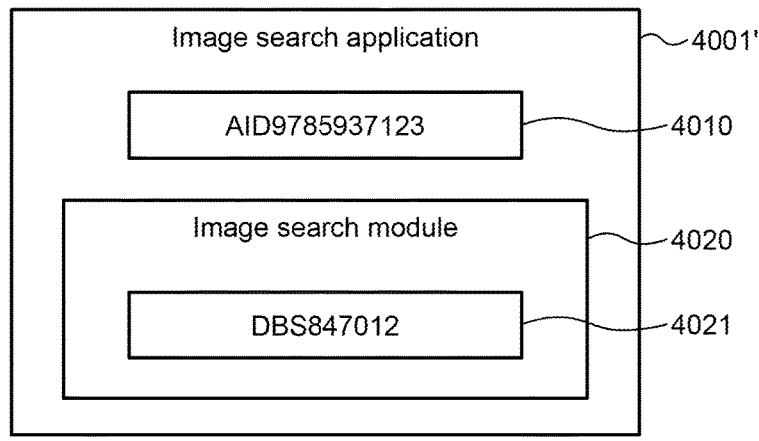

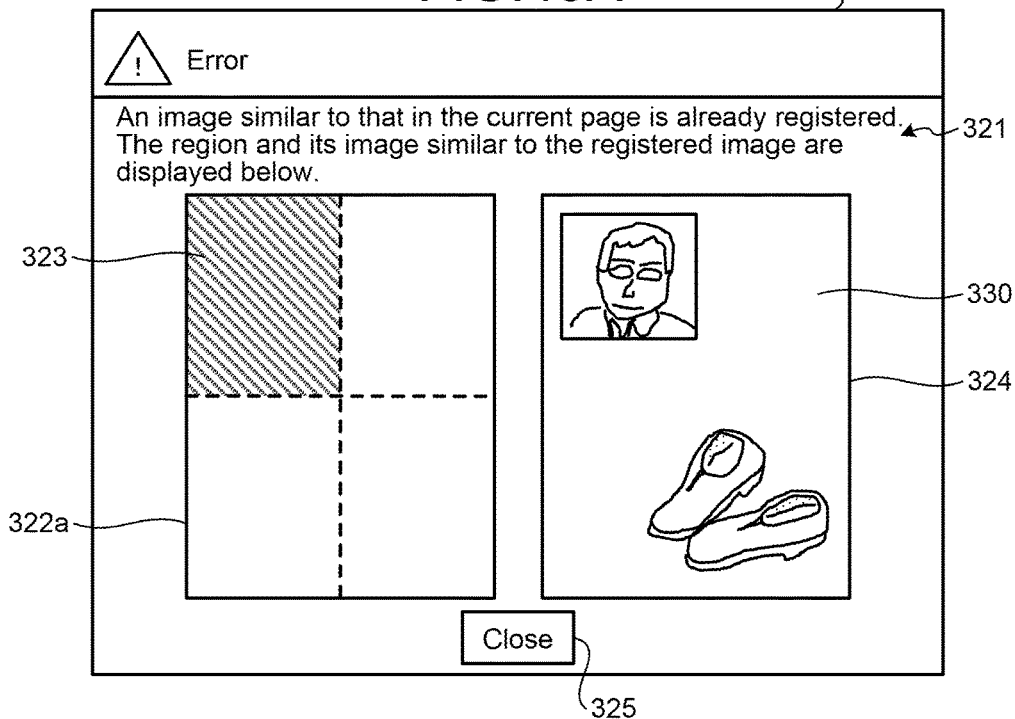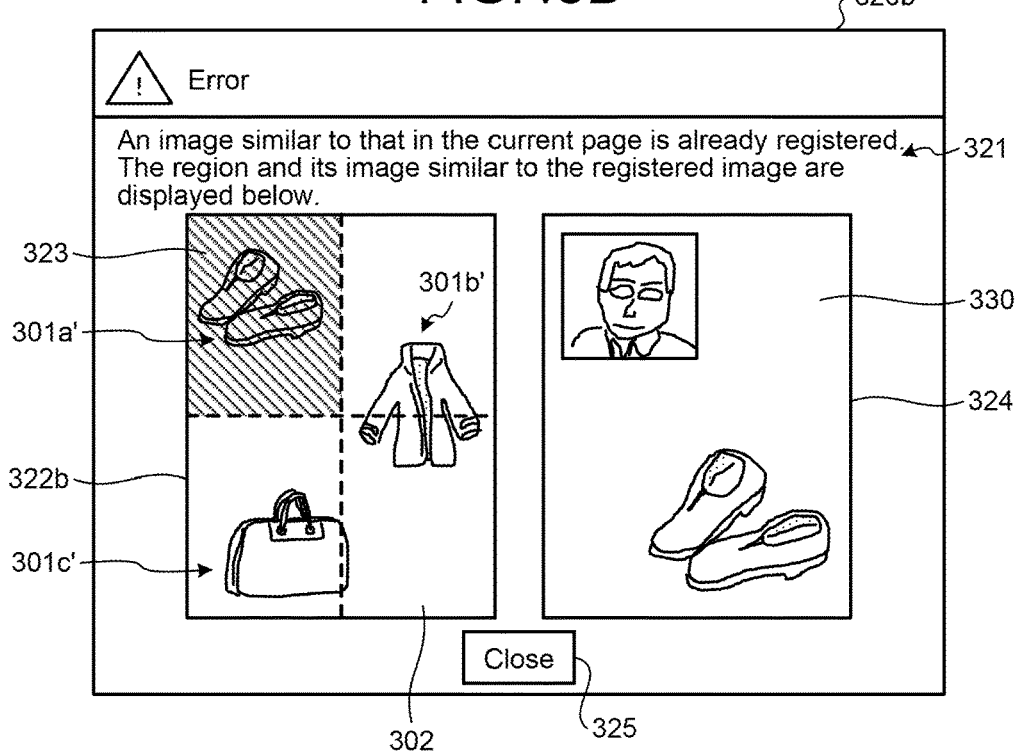

FIG.52A

```
                                                   141a
1: 
2:          <weightarea>
3:                   <area>x3,y3,x4,y4</area>
4:                   <weight>1.0</weight>
5:          </weightarea>
6:          <weightarea>
7:                   <area>x5,y5,x6,y6</area>
8:                   <weight>-0.7</weight>
9:          </weightarea>
10:         <weightarea>
11:                  <area>x7,y7,x8,y8</area>
12:                  <weight>-0.4</weight>
13:         </weightarea>
14: 
```

FIG.52B

```
                                                   141b
1: 
2:          <hotspot>
3:                   <area>x1,y1,x2,y2</area>
4:                   <link>
5:                            <title>****Shop Web Page</title>
6:                            <type>info</type>
7:                            <URI>http://1.example.org/index.html</URI>
8:                   </link>
9:                   <link>
10:                           :
11:                  </link>
12:         </hotspot>
13:         <hotspot>
14:                  :
15:         </hotspot>
16:         <weightarea>
17:                  <area>x3,y3,x4,y4</area>
18:                  <weight>1.0</weight>
19:         </weightarea>
20:         <weightarea>
21:                  <area>x5,y5,x6,y6</area>
22:                  <weight>-0.7</weight>
23:         </weightarea>
24:         <weightarea>
25:                  <area>x7,y7,x8,y8</area>
26:                  <weight>-0.4</weight>
27:         </weightarea>
28: 
```

$s_0' = s_0 + f(w_{10}, s_{10}) + f(w_{20}, s_{20})$ $s_1' = s_1 + f(w_{11}, s_{11})$   $s_2' = s_2 + f(w_{12}, s_{12})$   $s_3' = s_3 + f(w_{13}, s_{13})$   $s_4' = s_4 + f(w_{14}, s_{14})$

INFORMATION PROCESSING SYSTEM, INFORMATION PROCESSING METHOD, AND INFORMATION PROCESSING APPARATUS

CROSS-REFERENCE TO RELATED APPLICATIONS

The present application claims priority under 35 U.S.C. Section 119 to Japanese Patent Applications No. 2015-157726, filed on Aug. 7, 2015, No. 2015-163210, filed on Aug. 20, 2015, No. 2016-010966, filed on Jan. 22, 2016, and No. 2016-011017, filed on Jan. 22, 2016. The contents of which are incorporated herein by reference in their entirety.

BACKGROUND OF THE INVENTION

1. Field of the Invention

The present invention relates to an information processing system, an information processing method, and an information processing apparatus.

2. Description of the Related Art

Image search techniques are known in which features are extracted from, for example, a captured image obtained by being captured by a camera, and a pre-registered image group is searched for an image having many similar features. Image search systems are known that use such image search techniques to register images in certain photographs or printed materials in a database in association with various kinds of electronic data, to use a captured image obtained by capturing one of the photographs or the printed materials to search this database for a similar image, and to present linkage information associated with the similar image (for example, Japanese Unexamined Patent Application Publication No. 2014-010723).

Conventionally, the search for a registered image has not been managed for each person/organization (for example, for each business operator) who has registered the image. As a result, if a plurality of business operators have registered images having portions similar to one another, a problem occurs that the image search based on the captured image can result in a different result from that intended by a business operator who has registered the image. A problem also occurs that the search is difficult to be controlled according to the state of contract with the business operator on use of the image search system.

SUMMARY OF THE INVENTION

According to an embodiment, an information processing system includes a terminal device and an image search system provided by a first provider. The terminal device includes a first memory storing therein an application program that includes at least an image search program for using the image search system, and that is provided by at least one second provider, and a first processor that transmits a search request requesting search for image data to the image search system. The image search system includes a second memory and a second processor. The second memory is configured to store therein image data, linkage information associated with the image data, and identification information identifying the image search program. The identification information is provided from the first provider to the second provider, and is different second provider by second provider. The second processor is configured to register, in association with the identification information, setting information indicating whether a storage area to be searched during the search for the image data is a first storage area or a second storage area in the second memory. The first area is exclusive to the second provider, and is provided by the first provider, and the second area is not exclusive to the second provider. The second processor is configured to store the image data specified as a search target by the second provider in the first storage area exclusively assigned to the second provider, or in the second storage area, in the second memory, to receive the search request for the image data transmitted from the terminal device, to determine, when the search request includes the identification information, a storage area to be searched for the received image data from among the first storage area and the second storage area, based on the received identification information and the registered setting information, to determine, when the search request does not include the identification information, the second storage area to be the storage area to be searched, to search the determined storage area for the image data received from the terminal device in response to the search request, and to transmit a search result to the terminal device.

BRIEF DESCRIPTION OF THE DRAWINGS

FIG. 18 is a diagram illustrating an example of a module registration/edit screen according to the embodiments;

FIG. 26 is a diagram illustrating an example of an Extensible Markup Language (XML) code according to the embodiments that describes information indicating a target area;

FIG. 30A is a diagram for explaining the process for search by the management server according to the embodiments;

FIG. 30B is another diagram for explaining the process for search by the management server according to the embodiments;

FIG. 31A is still another diagram for explaining the process for search by the management server according to the embodiments;

FIG. 31B is still another diagram for explaining the process for search by the management server according to the embodiments;

FIG. 32A is still another diagram for explaining the process for search by the management server according to the embodiments;

FIG. 32B is still another diagram for explaining the process for search by the management server according to the embodiments;

FIG. 43A is a diagram illustrating an example of an error screen applicable to the first example of the similar image check according to the embodiments;

FIG. 43B is a diagram illustrating an example of another error screen applicable to the first example of the similar image check according to the embodiments;

FIG. 52A is a diagram illustrating an example of the XML code generated by a registration tool according to the first modification of the search process according to the embodiments;

FIG. 52B is a diagram illustrating another example of the XML code generated by the registration tool according to the first modification of the search process according to the embodiments;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
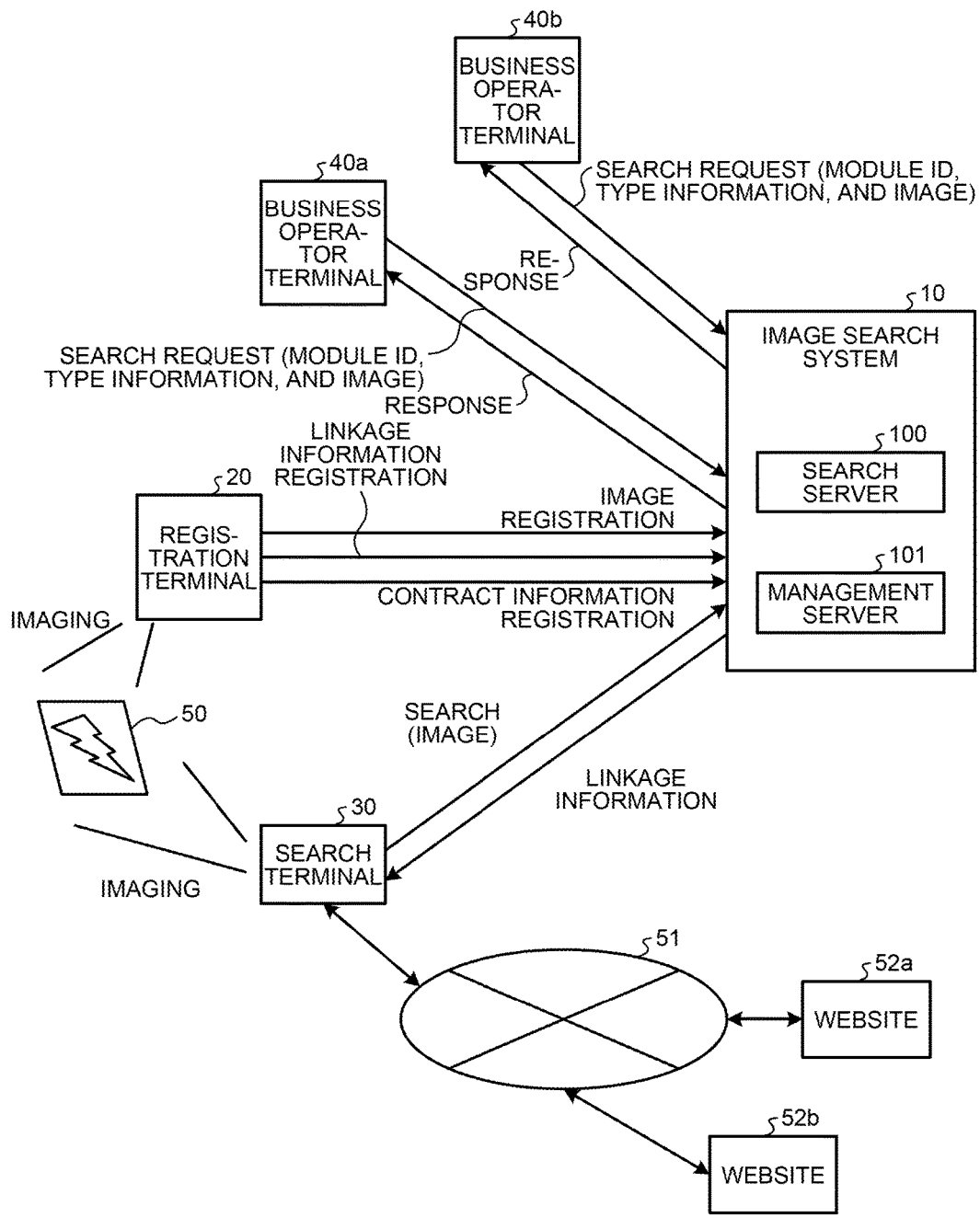
FIG. 1 is a block diagram schematically illustrating an exemplary configuration of an information processing system applicable to embodiments of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

An object of the embodiments is to allow each person/organization who registers an image to specify a search target to be searched for the image.

The following describes in detail embodiments of an information processing system, an information processing apparatus, an information processing method, and an information processing program with reference to the accompanying drawings.

System Applicable to Embodiments

FIG. 1 schematically illustrates an exemplary configuration of the information processing system applicable to the embodiments. In FIG. 1, the information processing system includes an image search system 10, a registration terminal 20, a search terminal 30, and business operator terminals 40a and 40b. The image search system 10 includes a search server 100 and a management server 101. The search server 100 is capable of communicating with the registration terminal 20, the search terminal 30, and the business operator terminals 40a and 40b through a network. The management server 101 is capable of communicating with the registration terminal 20 and the business operator terminals 40a and 40b through the network.

The search server 100 and the management server 101 are operated and managed by a service provider who provides an image search function performed by the image search system 10. Each of the search server 100 and the management server 101 may be constituted by one information processing apparatus, or may be constituted by a plurality of interconnected information processing apparatuses with functions distributed thereamong. The search server 100 and the management server 101 can alternatively be configured as one information processing apparatus.

The registration terminal 20 acquires an image and linkage information to be associated with the image, and transmits them to the image search system 10. The image search system 10 registers the image and the linkage information transmitted from the registration terminal 20 in association with each other in an image search database (DB) included in the search server 100. The linkage information can include, for example, Uniform Resource Locators (URLs) of a website 52a and a website 52b on the Internet 51.

In the example of FIG. 1, the registration terminal 20 uses a captured image obtained by capturing a photographic subject 50 as the image to be registered in the image search DB. The image to be registered in the image search DB is not limited to this example. The registration terminal 20 may use an image supplied from the outside or an image created in the registration terminal 20 as the image to be registered in the image search DB.

The search terminal 30 is a terminal device used by a general user, and has an image capturing function. The search terminal 30 is not limited to this example, but may store an image to be subjected to the image search, without having the image capturing function. The search terminal 30 may naturally have the image capturing function, and include a unit for storing an image to be subjected to the image search.

The search terminal 30 is loaded with an image search application serving as an application program for using the image search by the image search system 10. To install the image search application on the search terminal 30, for example, the following method can be used: on a predetermined download site on the network such as the Internet 51, the general user specifies and downloads therefrom the image search application as the application program to be installed, and installs it on the search terminal 30.

An image search application provided as a customized application with a built-in image search module is customized by a business operator, is given a module identifier (ID), and is distributed to the general user. In contrast, an image search application distributed from the service provider is not given any module ID, or is given a module ID indicating that the image search application is distributed from the service provider. That is, the image search system 10 can identify each business operator and each customized application, and can also distinguish between the business operator and the service provider based on the module ID.

By executing the image search application, the search terminal 30 can perform the image capturing processing to capture the photographic subject 50 using the image capturing function, and can transmit the image obtained by capturing the photographic subject 50 to the image search system 10 through the network. The search terminal 30 captures the photographic subject 50 by starting the image capturing function, for example, in response to a user operation, and transmits a search request requesting search for an image similar to the captured image to the image search system 10. The search request includes the captured image and search type information indicating a mode of search. The transmitted search request is received by the search server 100 in the image search system 10.

The business operator can set various items, such as a leaflet, a poster, a signboard, a signage, a promotional photograph, a certain scenery, and a product, as the photographic subject. In other words, in the category in which the image search system 10 functions, all objects determined by the business operator can serve as the photographic subject. This is because the business operator only needs to disclose the photographic subject to the general user, and the general user only needs to capture the photographic subject and use the image search system 10.

In the image search system 10, the search server 100 searches the image search DB for an image similar to the image in response to the search request transmitted from the search terminal 30, and acquires identification information (hereinafter, called the image identification information) on the found image as a search result. The search server 100 transmits the linkage information associated with the found image to the search terminal 30.

For example, if the linkage information includes a URL, the search terminal 30 can access the website 52a or the website 52b through the Internet 51 according to the linkage information that has been found on the search server 100 based on the captured image obtained by capturing the photographic subject 50 and that has been transmitted. Hereinafter, a person who operates the search terminal 30 is called the general user.

In the information processing system described above, the service provider of the image search system 10 allows a person or an organization having a particular contract with the service provider to register an image and linkage information in the search server 100. Hereinafter, the person or the organization having a particular contract with the service provider is called the business operator. In response to a request from the business operator, the service provider registers the image and the linkage information provided by the business operator in the search server 100. Depending on the content of the contract, the business operator can operate the registration terminal 20 by themselves to register the image and the linkage information in the search server 100. That is, the registration terminal 20 is a terminal device used by the service provider or the business operator.

The business operator terminals 40a and 40b are terminals to be used by the business operators, and can be used, for example, to check the image and the linkage information registered in the search server 100. In the embodiments, the business operator can customize the image search application to be installed on the search terminal 30. The business operator terminals 40a and 40b have, for example, the same functions. Hence, in the description to be given below, the business operator terminal 40a will represent the business operator terminals 40a and 40b unless otherwise stated.

For example, the service provider provides, to the business operator having the particular contract, the image search module for performing the function of the image search application necessary on terminals (the business operator terminals 40a and 40b and the search terminal 30) in order to use the search function performed by the search server 100. This image search module is provided as, for example, a software development kit (SDK) from the service provider to the business operator. The business operator can incorporate the provided image search module into, for example, another application program developed by the business operator themselves. This incorporation can make, for example, a customized application in which the image search application function is added to a business operator application for providing a service by the business operator. By distributing the customized application with the built-in image search module to the general user, the business operator can allow the general user to use the image search function in accordance with the intention of the business operator, and can provide the general user with the service by the business operator.

The business operator terminal 40a is loaded with this customized application. For example, the business operator uses the business operator terminal 40a loaded with this customized application to transmit a search request to the image search system 10, and checks whether a search result intended by the business operator is obtained. The search request includes the image to be subjected to the image search, the module ID serving as first identification information for identifying the image search module, and type information indicating the search type. The module ID and the type information will be described later.

In the image search system 10, the search server 100 performs the image search according to the search request transmitted from the business operator terminal 40a, and transmits the search result as a response to the search request to the business operator terminal 40a. Based on this search result, the business operator checks, for example, the operation of the customized application, and also the image and the linkage information registered in the search server 100. If no problem is determined to be present, the business operator provides the general user with the customized application and the service using the image search function.

That is, it can be said that the service provider is a user who operates the image search system 10 to provide a search service (search function), that the business operator is a user who determines the image or other information to be registered in the image search system 10 to use the search service, and determines also the imaging target (photographic subject 50) to be captured on the search terminal 30 of the general user, and that the general user is a user who captures the imaging target determined by the business operator, and transmits the captured image to use the image search system 10. The term "user" includes a person and a corporation.

Figure 2:
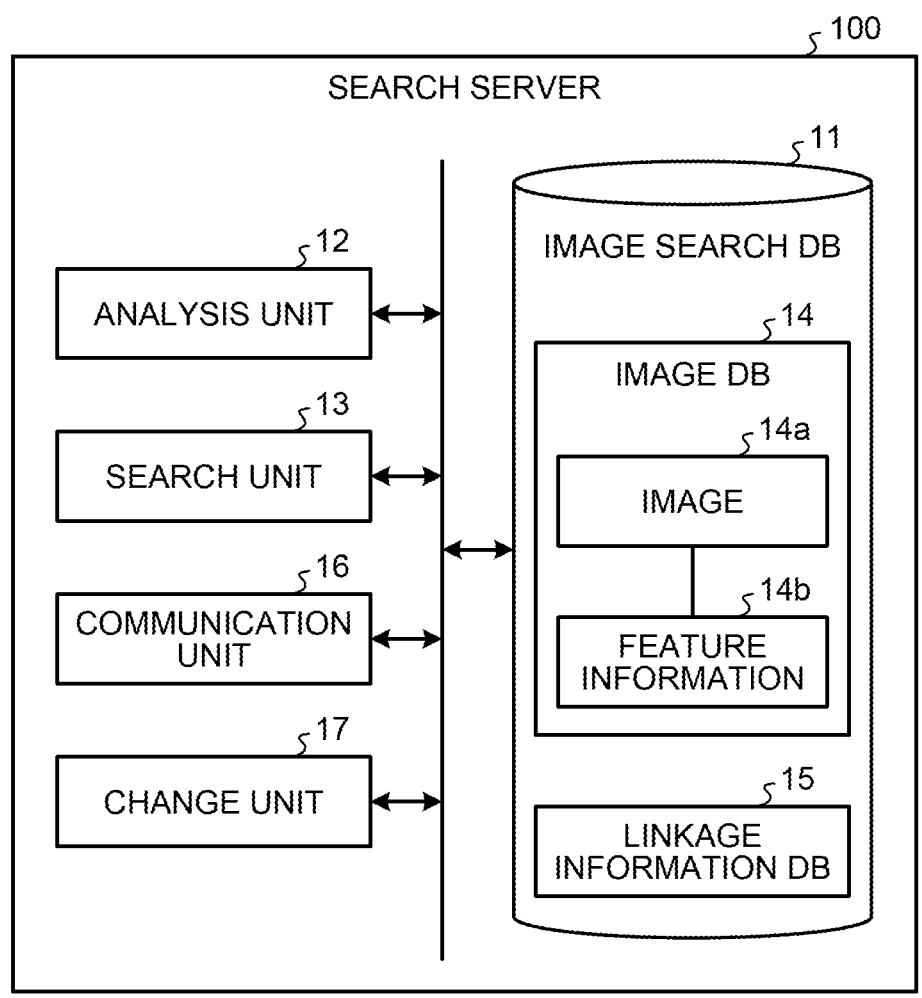
FIG. 2 is an exemplary functional block diagram for explaining functions of a search server applicable to the embodiments.

FIG. 2 is an exemplary functional block diagram for explaining functions of the search server 100 applicable to the embodiments. The search server 100 includes an image search DB 11, an analysis unit 12, a search unit 13, a communication unit 16, and a change unit 17, and performs the search process based on the captured image transmitted from the search terminal 30. The image search DB 11 includes an image DB 14 and a linkage information DB 15. The image DB 14 registers an image in a searchable manner. More specifically, the image DB 14 registers an image 14a and feature information 14b extracted from the image 14a by the analysis unit 12 in association with each other. The linkage information DB 15 registers the linkage information for linking with the image registered in the image DB 14 in association with the image.

The following briefly describes a specific example of the association between the image and the linkage information. In the embodiments, one or more areas can be specified in the image, and one or more pieces of the linkage information can be associated with each of the specified areas. This area specified in the image for being associated with the linkage information will be hereinafter called the target area.

Information indicating the target area is stored and registered in the linkage information DB 15 in association with the image identification information. In the embodiments, this information indicating the target area is described using, for example, the Extensible Markup Language (XML) that is a kind of markup language that uses tags to define and describe meanings and structures of data. The linkage information DB 15 stores, for example, the file name of a file storing an XML code describing the information indicating the target area and the image identification information in association with each other. A specific example of this XML code describing the information indicating the target area will be described later.

The search server 100 performs the registration processing of the image as briefly described below. The search server 100 uses the analysis unit 12 to analyze an image to be registered, and extracts feature information representing the feature of the image. The search server 100 stores the extracted feature information 14b and the image 14a serving as an extraction source from which the feature information 14b has been extracted, in the image DB 14, in association with the image identification information for identifying the image 14a. The image 14a serving as the extraction source corresponds to the image to be registered, and for example, is the same image as the image to be registered.

The search server 100 also stores the linkage information to be provided to the user in the linkage information DB 15 in association with the image identification information. The image 14a and the feature information 14b, and the linkage information are stored in the image DB 14 and the linkage information DB 15, respectively, in association with the image identification information. Thus, the image to be registered is registered in the image search DB 11.

In general, an original image is unreproducible from the feature information extracted from the image. In other words, the feature information is image information from which an image as a source thereof is unreproducible in a form recognizable by human eyes. In contrast, image data is image information from which an image can be reproduced in a form recognizable by human eyes. Thus, the feature information on the image can be clearly distinguished from the image data.

The search server 100 performs the search processing for the image as briefly described below. For example, the search server 100 uses the communication unit 16 to receive the image transmitted from the search terminal 30, and transfers the received image as the image 14a serving as the extraction source to the analysis unit 12 through the search unit 13. The analysis unit 12 analyzes the transferred image 14a to extract the feature information 14b from the image, and transfers the extracted feature information 14b to the search unit 13. Based on the feature information 14b transferred from the analysis unit 12, the search unit 13 searches the image DB 14 for the feature information 14b having a high similarity to the transferred feature information 14b. The search unit 13 acquires the linkage information associated with the image identification information corresponding to the found feature information 14b from the linkage information DB 15. The search server 100 uses the communication unit 16 to transmit the linkage information acquired from the linkage information DB 15, as a search result to the search terminal 30.

The change unit 17 in the search server 100 changes the similarity according to a weight value set to a predetermined value. The processing of the change unit 17 will be described later in detail.

Figure 3:
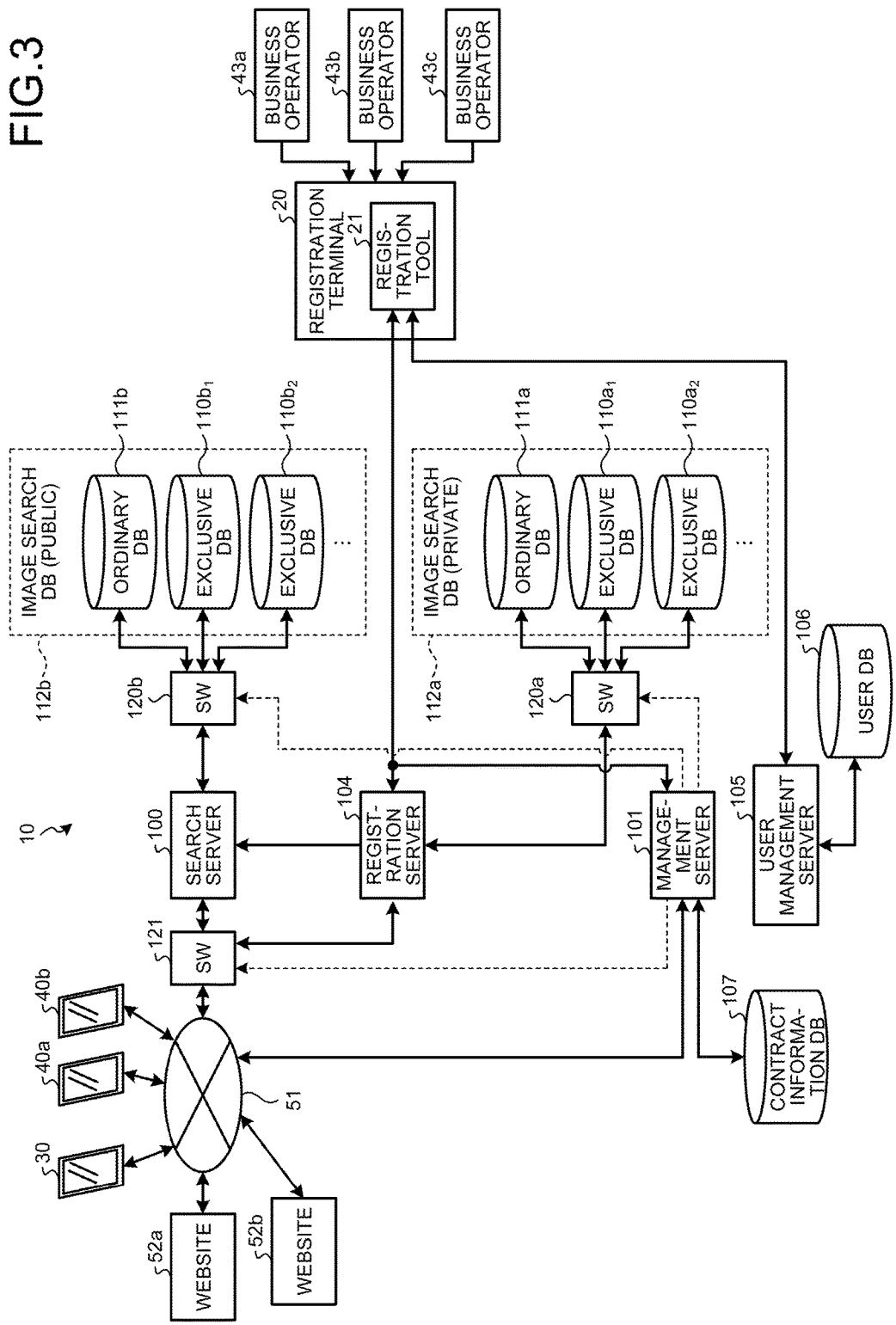
FIG. 3 is a block diagram schematically illustrating an exemplary configuration of the information processing system applicable to the embodiments.

FIG. 3 schematically illustrates an exemplary configuration of the information processing system applicable to the embodiments. In FIG. 3, the same reference numerals are assigned to components common to those in FIG. 1 or 2 explained above, and detailed description thereof will be omitted.

In FIG. 3, the information processing system includes the image search system 10, the registration terminal 20, the search terminal 30, the business operator terminals 40a and 40b, and a user management server 105. The user management server 105 is connected to a user DB 106 that stores user information. The image search system 10 includes the search server 100, the management server 101, and a registration server 104. For descriptive purposes, FIG. 3 illustrates an image search DB 112b corresponding to the image search DB 11 of FIG. 2 in a manner externally connected to the search server 100.

The image search DB 112b includes a plurality of DBs including an ordinary DB 111b and exclusive DBs 110$b_1$, 110$b_2$, . . . , each of which includes the image DB 14 and the linkage information DB 15. The search server 100 performs the image search using, as a search target DB, a DB that is selected from among the DBs included in the image search DB 112b by a switch unit (SW) 120b according to DB specifying information (to be described later) from the management server 101.

As described using FIGS. 1 and 2, the search server 100 uses the analysis unit 12 to analyze the image (captured image) transmitted from the search terminal 30 through the Internet 51 so as to extract the feature information, and uses the search unit 13 to search the image DB 14 for the feature information 14b similar to the extracted feature information. The search server 100 acquires, from the linkage information DB 15, the linkage information corresponding to the image identification information associated with the feature information 14b found from the image DB 14, and uses the communication unit 16 to transmit the acquired linkage information to the search terminal 30.

The registration server 104 includes an image search DB 112a corresponding to the image search DB 112b, and has an image search function including the functions of the analysis unit 12 and the search unit 13, in the same manner as the search server 100. In the same manner as the image search DB 112b, the image search DB 112a includes a plurality of DBs including an ordinary DB 111a and exclusive DBs $110a_1$, $110a_2$, . . . , each of which includes the image DB 14 and the linkage information DB 15. The ordinary DB 111a and the exclusive DBs $110a_1$, $110a_2$, . . . correspond to the ordinary DB 111b and the exclusive DBs $110b_1$, $110b_2$, . . . , respectively, included in the image search DB 112b.

Each of the exclusive DBs $110a_1$, $110a_2$, . . . and the exclusive DBs $110b_1$, $110b_2$, . . . is a DB in which a business operator designated in advance according to a contract can register an image. In contrast, the ordinary DBs 111a and 111b are DBs in which a plurality of business operators can commonly register images.

Hereinafter, when need not be distinguished from one another, the exclusive DBs $110a_1$, $110a_2$, . . . and the exclusive DBs $110b_1$, $110b_2$, . . . will be each referred to as an exclusive DB, where appropriate. In the same manner, when need not be distinguished from each other, the ordinary DBs 111a and 111b will be each referred to as an ordinary DB, where appropriate.

The registration server 104 performs the image search using, as a search target DB, a DB that is selected from among the DBs included in the image search DB 112a by a switch unit (SW) 120a according to the DB specifying information (to be described later) from the management server 101.

The management server 101 is connected to a contract information DB 107. The contract information DB 107 stores contract information serving as information on a contract concluded between the service provider and the business, operator. The contract information includes contract type information indicating the type of the contract with the business operator and the DB specifying information indicating which DB of the DBs included in the image search DBs 112a and 112b is the search target DB.

The management server 101 determines DBs selected by the switch units 120a and 120b based on the contract type information and the DB specifying information included in the contract information and on the search type information included in the search request. The management server 101 switches a switch unit (SW) 121 based on the contract type information and the search type information so as to select which of the search server 100 and the registration server 104 is connected for access through the Internet 51. That is, the management server 101 also serves as a control unit that controls the switch units 120a, 120b, and 121 to determine the search target DB.

The registration terminal 20 includes a registration tool 21. The registration tool 21 is implemented by a program running on a central processing unit (CPU) of the registration terminal 20. For example, the registration terminal 20 is connected to the registration server 104 so as to be provided with the program for implementing the registration tool 21 from the registration server 104.

The registration terminal 20 is provided with images and linkage information to be associated with the images from respective business operators 43a, 43b, 43c, . . . . The registration terminal 20 uses the registration tool 21 to transmit the images provided from the business operators 43a, 43b, 43c, . . . and the linkage information associated with each of the images to the registration server 104. The registration terminal 20 can also use the registration tool 21 to transmit the contract information on the respective business operators 43a, 43b, 43c, . . . to the registration server 104.

Figure 4:
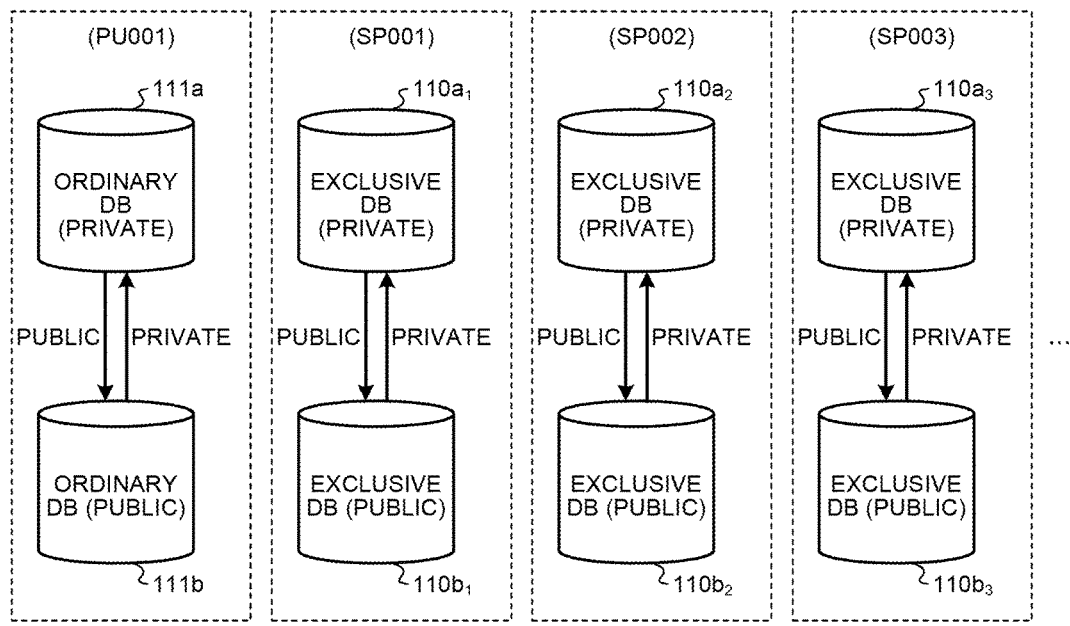
FIG. 4 is a diagram conceptually illustrating configurations of image search databases (DBs) applicable to the embodiments.

FIG. 4 conceptually illustrates configurations of the image search DBs 112a and 112b applicable to the embodiments. The ordinary DB 111a, the exclusive DB $110a_1$, the exclusive DB $110a_2$, and the exclusive DB $110a_3$ included in the image search DB 112a are private DBs that prohibit any search from the search terminal 30 by the general user. By registering an image in any one of these private DBs, the business operator can use the business operator terminal 40a to search for and check the image before disclosure (before presentation) to the general user using this image. That is, the business operator can specify the private DB to be a search target when checking the image.

In contrast, the ordinary DB 111b, the exclusive DB $110b_1$, the exclusive DB $110b_2$, and the exclusive DB $110b_3$ included in the image search DB 112b are public DBs that allow search by the general user using the search terminal 30, and can be each specified as a search target by the search terminal 30 used by the general user and by the business operator terminal 40a used by the business operator. The business operator can move the image registered in the private DB to corresponding one of these public DBs. The business operator is not limited to doing this, but may directly register the image in this public DB.

In each pair of the ordinary DBs 111a and 111b, the exclusive DBs $110a_1$ and $110b_1$, the exclusive DBs $110a_2$ and $110b_2$, and the exclusive DBs $110a_3$ and $110b_3$, the DBs included in the pair are assigned with the same DB number. In the example of FIG. 4, the exclusive DBs $110a_1$ and $110b_1$ forming one pair are each assigned with a DB number "SP001". In the same manner, the exclusive DBs $110a_2$ and $110b_2$ forming one pair and the exclusive DBs $110a_3$ and $110b_3$ forming one pair are assigned with DB numbers "SP002" and "SP003", respectively. The pair of the ordinary DBs 111a and 111b are assigned with a DB number "PU001".

Through disclosure/non-disclosure processing, an image to be disclosed and an image to be undisclosed are moved between each pair of the ordinary DBs 111a and 111b, the exclusive DBs $110a_1$ and $110b_1$, the exclusive DBs $110a_2$ and $110b_2$, and the exclusive DBs $110a_3$ and $110b_3$. In the example of the pair of the exclusive DBs $110a_1$ and $110b_1$, through the disclosure processing, an image specified to be public among images to be private (private images) stored in the exclusive DB $110a_1$ serving as a private DB is moved to the exclusive DB $110b_1$ serving as a public DB. Through the non-disclosure processing, an image specified to be private among images to be public (public images) stored in the exclusive DB $110b_1$ is moved to the exclusive DB $110a_1$.

In other words, the image to be disclosed that is stored in the exclusive DB $110a_1$ and has been set private is moved to the exclusive DB $110b_1$ through the disclosure processing, and becomes searchable from the business operator terminal 40a and the search terminal 30. In contrast, the image to be undisclosed that is stored in the exclusive DB $110b_1$ is moved to the exclusive DB $110a_1$ through the non-disclosure processing, and remains searchable (specifiable as a search target) from the business operator terminal 40a, but becomes not searchable (not specifiable as a search target) from the search terminal 30.

These movements of the images to be disclosed and to be undisclosed between the DBs through the disclosure/non-disclosure processing apply in the same manner to the other pairs, that is, the ordinary DBs 111a and 111b, the exclusive DBs 110$a_2$ and 110$b_2$, and the exclusive DBs 110$a_3$ and 110$b_3$, in the example of FIG. 4.

Although the example of FIG. 3 illustrates that each of the image search DBs 112a and 112b includes three exclusive DBs, the image search DBs 112a and 112b are not limited to this example. For example, each of the image search DBs 112a and 112b is provided with a number of the exclusive DBs corresponding to the number of contracts of the business operators.

Figure 5:
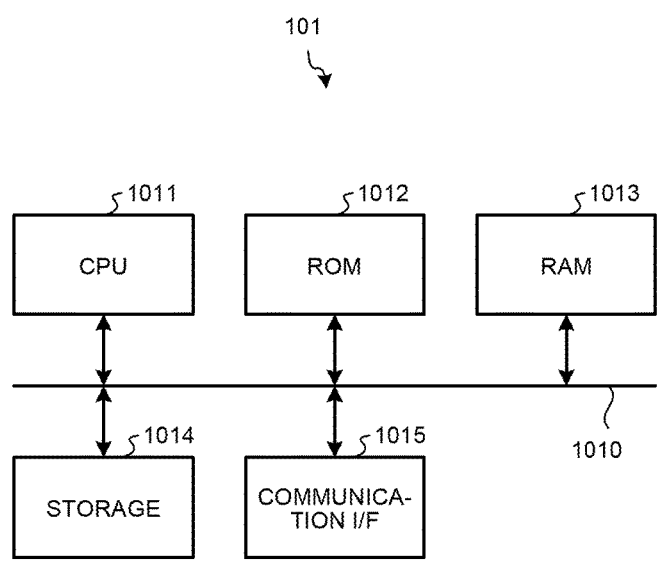
FIG. 5 is a block diagram illustrating an exemplary hardware configuration of a management server applicable to the embodiments.

FIG. 5 illustrates an exemplary hardware configuration of the management server 101 applicable to the embodiments. In FIG. 5, in the management server 101, a CPU 1011, a read-only memory (ROM) 1012, a random access memory (RAM) 1013, a storage 1014, and a communication interface (I/F) 1015 are connected to a bus 1010. The storage 1014 is a storage medium capable of storing data in a nonvolatile manner, and is, for example, a hard disk drive. The storage 1014 is not limited to this example. A nonvolatile semiconductor memory, such as a flash memory, may be used as the storage 1014.

According to programs stored in the ROM 1012 and the storage 1014, the CPU 1011 controls the whole of this overall management server 101 using the RAM 1013 as a work memory.

The storage 1014 stores programs to be executed by the CPU 1011 and various types of data. The contract information DB 107 described above is built using a storage area on this storage 1014. Although FIG. 5 illustrates that the storage 1014 is constituted by one piece of hardware, the storage 1014 is not limited to this example. For example, a plurality of storage devices may be integrally managed as one storage 1014.

The communication I/F 1015 performs communication through the network according to the control of the CPU 1011.

Although FIG. 5 illustrates that the management server 101 is constituted by one piece of hardware, the management server 101 is not limited to this example. For example, the management server 101 may be built by integrally controlling a plurality of server devices having the same configuration. The search server 100 and the registration server 104 can be built by the same hardware configuration as that of the management server 101, so that description thereof will be omitted here.

Figure 6:
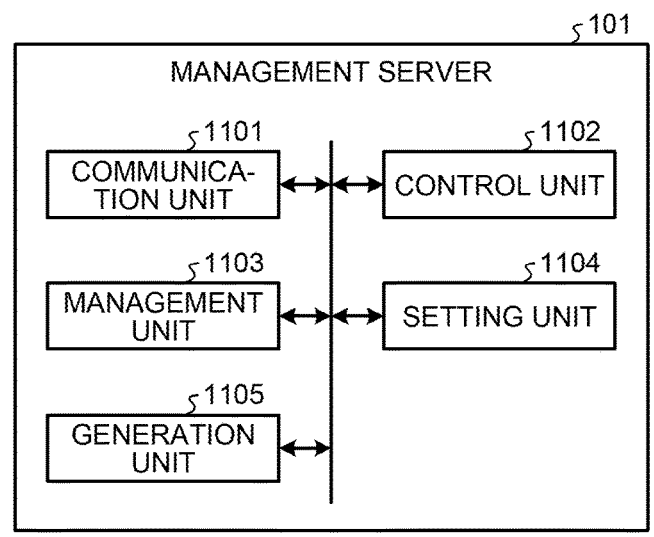
FIG. 6 is an exemplary functional block diagram for explaining functions of the management server applicable to the embodiments.

FIG. 6 is an exemplary functional block diagram for explaining functions of the management server 101 applicable to the embodiments. The management server 101 includes a communication unit 1101, a control unit 1102, a management unit 1103, a setting unit 1104, and a generation unit 1105. The communication unit 1101, the control unit 1102, the management unit 1103, the setting unit 1104, and the generation unit 1105 are implemented by a program running on the CPU 1011. The communication unit 1101, the control unit 1102, the management unit 1103, the setting unit 1104, and the generation unit 1105 are not limited to being implemented in this manner, but some or all thereof may be built using hardware circuits that operate in cooperation with one another.

The communication unit 1101 controls the communication through the network performed by the communication I/F 1015. The control unit 1102 controls the switch units 120a, 120b, and 121 to control the search path. The control unit 1102 controls the disclosure/non-disclosure processing described above. The management unit 1103 manages the contract information stored in the contract information DB 107. The setting unit 1104 sets the contract information and the module ID. The generation unit 1105 generates a verification DB (to be described later in detail) for checking whether an image to be registered in the image search system 10 is correctly found before the image is disclosed in the image search system 10.

Figure 7:
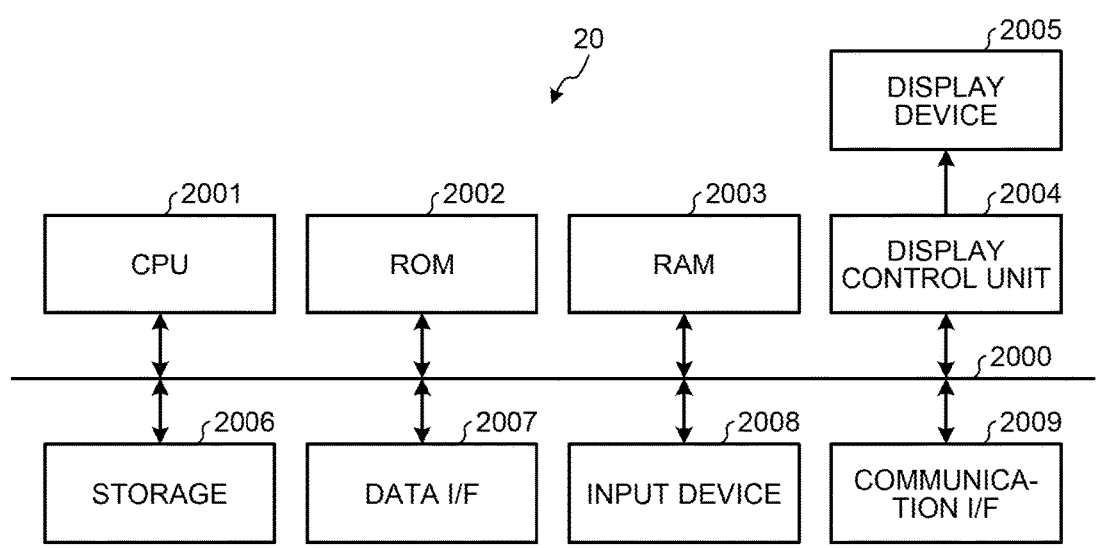
FIG. 7 is a block diagram illustrating an exemplary configuration of hardware of a registration terminal applicable to the embodiments.

FIG. 7 illustrates an exemplary configuration of hardware of the registration terminal 20 applicable to the embodiments. In the registration terminal 20 illustrated in FIG. 7, a CPU 2001, a ROM 2002, a RAM 2003, and a display control unit 2004 are connected to a bus 2000. A storage 2006, a data I/F 2007, an input device 2008, and a communication I/F 2009 are also connected to the bus 2000.

The storage 2006 is a storage medium capable of storing data in a nonvolatile manner. For example, a hard disk drive is used as the storage 2006. The storage 2006 is not limited to this example. A nonvolatile semiconductor memory, such as a flash memory, may be used as the storage 2006. The storage 2006 stores programs to be executed by the CPU 2001 and various types of data.

According to programs stored in the ROM 2002 and the storage 2006, the CPU 2001 controls the whole of this registration terminal 20 using the RAM 2003 as a work memory.

The display control unit 2004 converts a display control signal generated by the CPU 2001 into a signal displayable by a display device 2005, and outputs the converted signal. The display control unit 2004 drives the display device 2005 based on the display control signal generated by the CPU 2001. The display device 2005 is driven by the display control unit 2004 to perform display according to the display control signal.

The data I/F 2007 receives and outputs data from and to external equipment. An interface, such as a Universal Serial Bus (USB) interface or a Bluetooth (registered trademark) interface, can be used as the data I/F 2007. The communication I/F 2009 performs communication through the network using wireless communication according to the control of the CPU 2001.

The input device 2008 includes, for example, a pointing device, such as a mouse, and a keyboard, and accepts user input. A user can issue an instruction to the registration terminal 20, for example, by operating the input device 2008 according to the display on the display device 2005.

Figure 8:
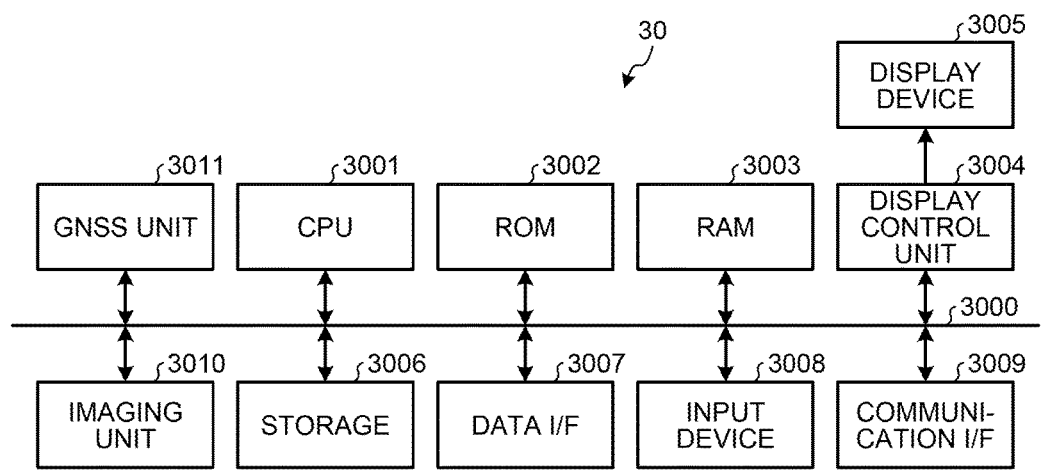
FIG. 8 is a block diagram illustrating an exemplary configuration of hardware of a search terminal applicable to the embodiments.

FIG. 8 illustrates an exemplary configuration of hardware of the search terminal 30 applicable to the embodiments. In FIG. 8, in the search terminal 30, a CPU 3001, a ROM 3002, a RAM 3003, a display control unit 3004, a storage 3006, a data I/F 3007, an input device 3008, a communication I/F 3009, and an imaging unit 3010 are connected to a bus 3000. In the search terminal 30, a global navigation satellite system (GNSS) unit 3011 may also be connected to the bus 3000.

The storage 3006 is a storage medium capable of storing data in a nonvolatile manner, and is, for example, a nonvolatile semiconductor memory such as a flash memory. The storage 3006 is not limited to this example. A hard disk drive may be used as the storage 3006. The storage 3006 stores programs to be executed by the CPU 3001 and various types of data. The storage 3006 and the ROM 3002 may share, for example, one rewritable nonvolatile semiconductor memory or the like.

According to programs stored in the ROM 3002 and the storage 3006, the CPU 3001 controls the whole of this search terminal 30 using the RAM 3003 as a work memory.

The display control unit 3004 converts a display control signal generated by the CPU 3001 into a signal displayable by a display device 3005, and outputs the converted signal.

The data I/F 3007 receives and outputs data from and to external equipment. An interface, such as a USB interface or a Bluetooth (registered trademark) interface, can be used as the data I/F 3007.

The display control unit 3004 drives the display device 3005 based on the display control signal generated by the CPU 3001. The display device 3005 includes, for example, a liquid crystal display (LCD), and is driven by the display control unit 3004 to perform display according to the display control signal.

The input device 3008 accepts user input. A user can issue an instruction to the search terminal 30, for example, by operating the input device 3008 according to the display on the display device 3005. The input device 3008 and the display device 3005 are preferably integrated to be formed into a touchscreen panel that outputs a control signal corresponding to a pressed position, and transmits images on the display device 3005.

The communication I/F 3009 performs communication through the network using wireless communication according to the control of the CPU 3001.

The imaging unit 3010 includes an optical system, an imaging device, and a control and drive circuit for the optical system and the imaging device, and applies predetermined processing to an imaging signal output from the imaging device to output the result as a captured image formed by a digital signal. The imaging unit 3010 performs functions such as imaging and zooming according to instructions by user operations to the input device 3008. The captured image output from the imaging unit 3010 is transmitted to the CPU 3001 through the bus 3000, and is subjected to predetermined image processing according to a program. The captured image that has been output from the imaging unit 3010 and subjected to the image processing can be stored in, for example, the storage 3006. The CPU 3001 can read the captured image from the storage 3006, and transmit it to the network via the communication I/F 3009.

The GNSS unit 3011 receives a signal provided by a global navigation satellite system (GNSS), and calculates the current position represented by latitude and longitude based on the received signal.

Figure 9:
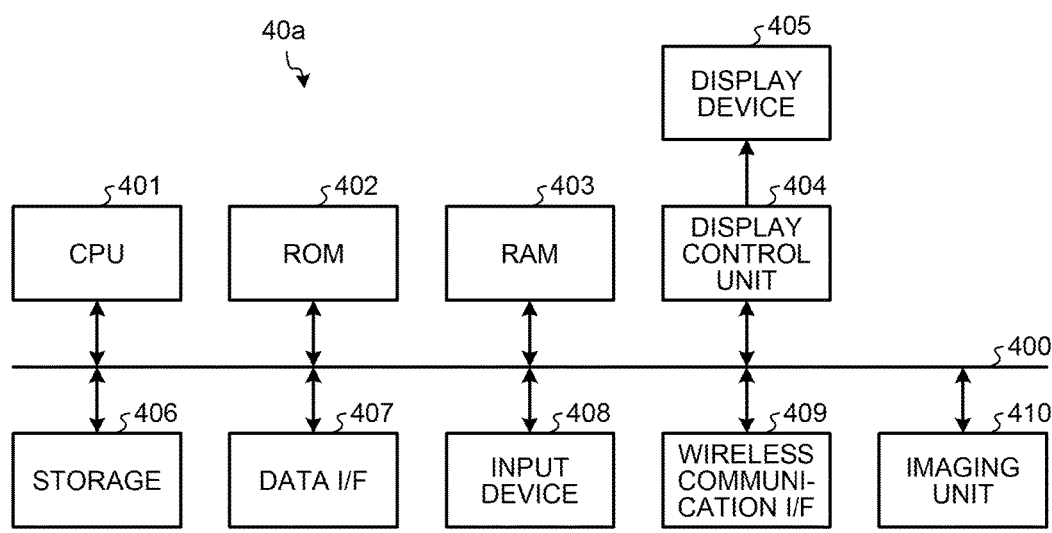
FIG. 9 is a block diagram illustrating an exemplary hardware configuration of a business operator terminal applicable to the embodiments.

FIG. 9 illustrates an exemplary hardware configuration of the business operator terminal 40a applicable to the embodiments. In the business operator terminal 40a illustrated in FIG. 9, a CPU 401, a ROM 402, a RAM 403, and a display control unit 404 are connected to a bus 400. A storage 406, a data I/F 407, an input device 408, a wireless communication I/F 409, and an imaging unit 410 are also connected to the bus 400. In this manner, the business operator terminal 40a is an information processing apparatus equipped with a computer including the CPU 401, the ROM 402, and the RAM 403.

The storage 406 is a storage medium capable of storing data in a nonvolatile manner, and is, for example, a nonvolatile semiconductor memory such as a flash memory. The storage 406 is not limited to this example. A hard disk drive may be used as the storage 406. The storage 406 stores programs to be executed by the CPU 401 and various types of data. The storage 406 and the ROM 402 may share, for example, one rewritable nonvolatile semiconductor memory or the like.

According to programs stored in the ROM 402 and the storage 406, the CPU 401 controls the whole of this business operator terminal 40a using the RAM 403 as a work memory. The display control unit 404 converts a display control signal generated by the CPU 401 into a signal displayable by a display device 405, and outputs the converted signal. The display device 405 includes, for example, a liquid crystal display (LCD), and is driven by the signal output from the display control unit 404 to perform display according to the display control signal.

The data I/F 407 receives and outputs data from and to external equipment. An interface, such as a USB interface or a Bluetooth (registered trademark) interface, can be used as the data I/F 407.

The input device 408 accepts user input. A user can issue an instruction to the business operator terminal 40a, for example, by operating the input device 408 according to the display on the display device 405. The input device 408 and the display device 405 are preferably integrated to be formed into a touchscreen panel that outputs a control signal corresponding to a pressed position, and transmits images on the display device 405.

The wireless communication I/F 409 performs communication through the network using wireless communication according to the control of the CPU 401.

The imaging unit 410 includes an optical system, an imaging device, and a control and drive circuit for the optical system and the imaging device, and applies predetermined processing to an imaging signal output from the imaging device to output the result as a captured image formed by a digital signal. The captured image that has been output from the imaging unit 410 and subjected to image processing can be stored in, for example, the storage 406. The CPU 401 can read the captured image from the storage 406, and transmit it to the network via the wireless communication I/F 409.

Figure 10:
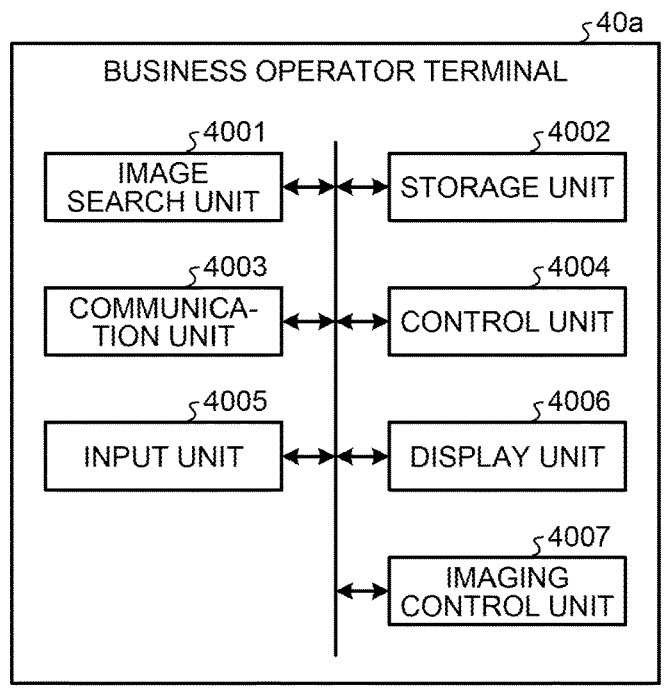
FIG. 10 is an exemplary functional block diagram for explaining functions of the business operator terminal applicable to the embodiments.

FIG. 10 is an exemplary functional block diagram for explaining functions of the business operator terminal 40a applicable to the embodiments. The business operator terminal 40a includes an image search unit 4001, a storage unit 4002, a communication unit 4003, a control unit 4004, an input unit 4005, a display unit 4006, and an imaging control unit 4007. The image search unit 4001, the storage unit 4002, the communication unit 4003, the control unit 4004, the input unit 4005, the display unit 4006, and the imaging control unit 4007 are implemented by a program running on the CPU 401. The image search unit 4001, the storage unit 4002, the communication unit 4003, the control unit 4004, the input unit 4005, the display unit 4006, and the imaging control unit 4007 are not limited to being implemented in this manner, but some or all thereof except the image search unit 4001 may be built using hardware circuits that operate in cooperation with one another.

The image search unit 4001 performs an image search process on the business operator terminal 40a according to the embodiments. The image search unit 4001 is set up on the business operator terminal 40a by installing, on the business operator terminal 40a, the image search application distributed by the service provider to the business operator having a particular contract.

The storage unit 4002 controls the storage of the data in the storage 406 and the RAM 403. The communication unit 4003 controls the communication performed by the wireless communication I/F 409. The control unit 4004 controls the overall operation of the business operator terminal 40a. The input unit 4005 outputs input information according to the input operation made to the input device 408. The display unit 4006 generates the display control signal to be supplied to the display control unit 404. The imaging control unit 4007 controls the imaging operation of the imaging unit 410.

Figure 11:
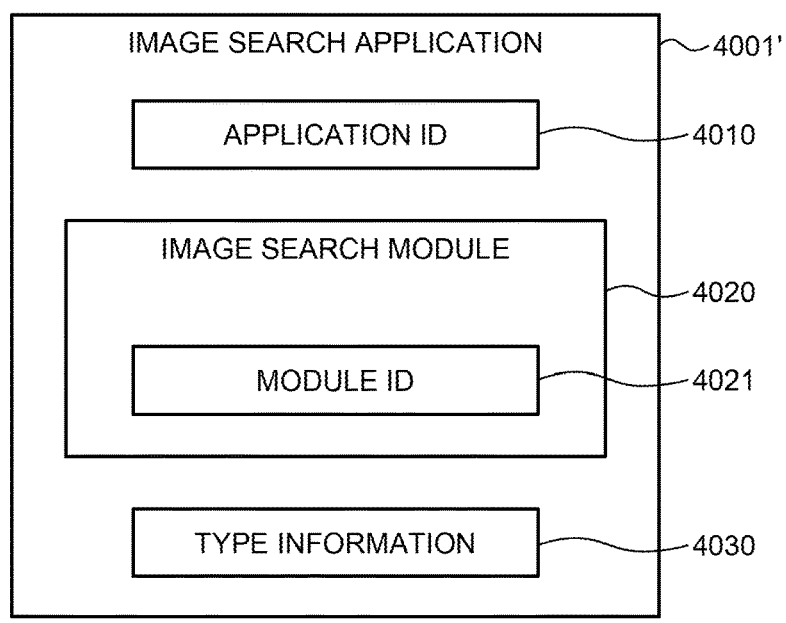
FIG. 11 is a block diagram illustrating an exemplary configuration of an image search application for setting up an image search unit applicable to the embodiments.

FIG. 11 is a block diagram illustrating an exemplary configuration of the image search application for setting up the image search unit 4001 applicable to the embodiments. In FIG. 11, an image search application 4001' includes an application ID 4010, an image search module 4020, and a type information 4030. The image search module 4020 includes a module ID 4021 serving as identification information for identifying the image search module 4020.

The image search application 4001' corresponds to the customized application described above, and is made, for example, by incorporating the image search module 4020 provided by the service provider into a predetermined application provided by the business operator. The type information 4030 may be incorporated in the image search application 4001' by the business operator, or may be incorporated in advance into the image search module 4020 and provided to the business operator by the service provider.

The application ID 4010 is, for example, identification information unique to each image search module 4020 that is incorporated in the image search application 4001' and is provided to the business operator, and identifies one customized application created by the business operator. Consequently, if one business operator creates a plurality of customized applications, the customized applications have different application IDs from one another. Alternatively, one application ID may be given to a plurality of customized applications of one business operator. The application ID 4010 is given by the management server 101, for example, when the image search application 4001' is first executed. Using the application ID 4010 enables identification of the image search application 4001' that has transmitted a search request.

The type information 4030 is information indicating whether the search type of the image search application 4001' incorporating the image search module 4020 is that of a "trial version" or that of a "full-use version". The "full-use version" has a search type that allows the general user to perform a search using the search terminal 30, and assumes the search target to be the image search DB 112b serving as a public DB. In contrast, the "trial version" has a search type, for example, for making a trial as to whether search is correctly performed based on an image prepared by the business operator, and assumes the search target to be the image search DB 112a serving as a private DB.

Figure 12:
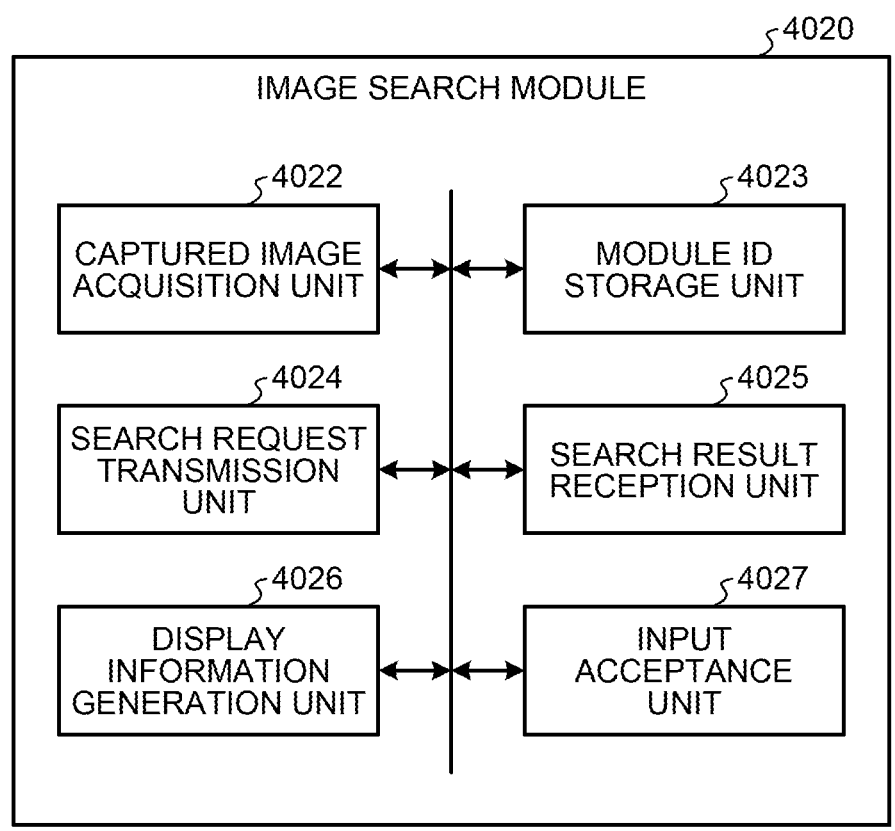
FIG. 12 is an exemplary functional block diagram for explaining functions of an image search module applicable to the embodiments.

FIG. 12 is an exemplary functional block diagram for explaining functions of the image search module 4020 applicable to the embodiments. In FIG. 12, the image search module 4020 includes a captured image acquisition unit 4022, a module ID storage unit 4023, a search request transmission unit 4024, a search result reception unit 4025, a display information generation unit 4026, and an input acceptance unit 4027.

The captured image acquisition unit 4022 acquires the captured image captured by the imaging unit 410 from the imaging control unit 4007. The module ID storage unit 4023 controls storage of the module ID 4021 into the RAM 403 or the storage 406 and reading of the module ID 4021 from the RAM 403 or the storage 406. The search request transmission unit 4024 generates a search request for requesting the image search system 10 to search for an image based on the captured image acquired by the captured image acquisition unit 4022. The search request includes the captured image, the module ID 4021, and the type information 4030. The search request transmission unit 4024 transmits the generated search request to the image search system 10 via the wireless communication I/F 409.

The search result reception unit 4025 receives the search result transmitted from the image search system 10 in response to the search request transmitted by the search request transmission unit 4024. The display information generation unit 4026 generates display information to be displayed by the display device 405. For example, the display information generation unit 4026 generates the display information to be displayed according to the search result received by the search result reception unit 4025. The input acceptance unit 4027 accepts the input operation made to the input device 408.

The image search module 4020 is constituted by units that serve as cores for performing the image search in cooperation with the image search system 10. The service provider provides the business operator having a contract with the service provider with the image search module. This allows the business operator to easily incorporate this image search module 4020 in a business operator's own application program. This incorporation of the image search module 4020 in the business operator's own application program is called customization by the image search module 4020. The application program in which the image search module 4020 is incorporated by the customization corresponds to the customized application described above.

An information processing program for performing the functions provided by the image search module 4020 is provided by being recorded together with the module ID 4021 as a file in an installable format or an executable format on a computer-readable recording medium, such as a Compact Disc (CD), a flexible disk, or a digital versatile disc (DVD). The information processing program and the module ID 4021 are not limited to being provided in this manner, but may be stored on a computer connected to a network, such as the Internet, and provided by being downloaded through the network. The information processing program and the module ID 4021 may alternatively be provided or distributed through a network, such as the Internet.

The information processing program has a modular structure including the above-described units (the captured image acquisition unit 4022, the module ID storage unit 4023, the search request transmission unit 4024, the search result reception unit 4025, the display information generation unit 4026, and the input acceptance unit 4027). As actual hardware, the CPU 401 reads the information processing program from a storage medium such as the storage 406, and executes it so as to load the units described above into the main memory, such as the RAM 403, to generate the captured image acquisition unit 4022, the module ID storage unit 4023, the search request transmission unit 4024, the search result reception unit 4025, the display information generation unit 4026, and the input acceptance unit 4027 in the main memory.

The search terminal 30 can be provided by substantially the same hardware configuration and functional configuration as those of the business operator terminal 40a described above, so that detailed description thereof will be omitted here. The search terminal 30 includes the image search application 4001' with the type information 4030 set for the general user.

Registration Processes Applicable to Embodiments

Figure 13:
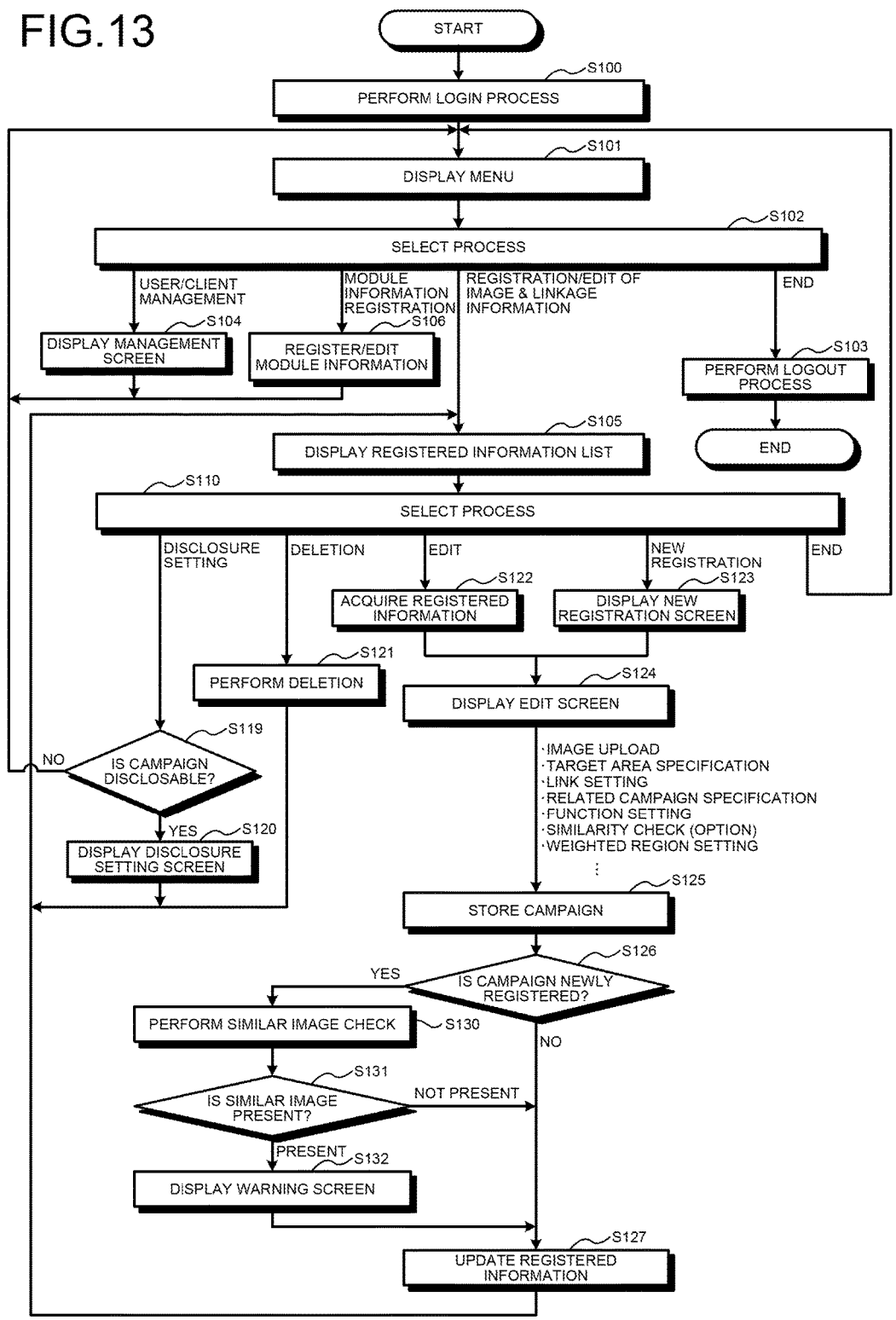
FIG. 13 is an exemplary flowchart illustrating registration processes applicable to the embodiments.

The following describes registration processes applicable to the embodiments. FIG. 13 is an exemplary flowchart illustrating the registration processes performed by the registration tool 21 in the registration terminal 20. The user management server 105 is assumed to have registered information on a user (a user ID and a password) who uses the registration tool 21 in the user DB 106 prior to the processing of the flowchart of FIG. 13. Hereinafter, images are assumed to be registered on a campaign-by-campaign basis, and registered in association with a campaign specified by the registerer.

The following briefly describes the campaign. The campaign is identified by a campaign ID, and includes one or more images, metadata, and related campaign information. The name "campaign" is a term for business operators, and does not limit the scope of rights. When the business operator provides some kind of service using the image search function for general users, the information processing system according to the embodiments prepares a unit called "campaign" so as to be able to easily manage images, the linkage information, and various type of attribute information on a service-by-service basis.

Each image on a page-by-page basis in the campaign is called a "page", and includes one or more pieces of the linkage information. The metadata includes the attribute information about the campaign. The attribute information about the campaign includes, for example, the campaign ID, the campaign name, the name of a client asking for the registration, the date and time of update, and information indicating whether the state is a disclosed state or an undisclosed state, about the campaign. The related campaign information is information indicating other campaigns related to this campaign. The information indicating this campaign is stored, for example, in the contract information DB 107 by the management server 101.

Figure 14:
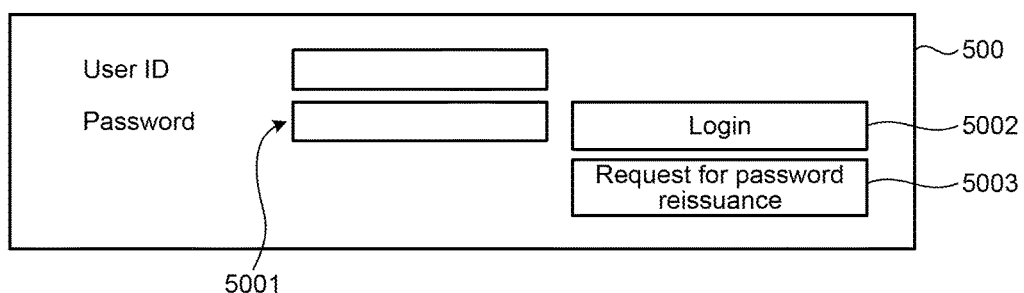
FIG. 14 is a diagram illustrating an example of a login screen applicable to the embodiments.

After the registration tool 21 starts on the registration terminal 20, the registration tool 21 performs login process for the user at Step S100. For example, the registration tool 21 displays a login screen 500 illustrated in FIG. 14 on the display device of the registration terminal 20. In the example of FIG. 14, an input region 5001 for entering the user information (the user ID and the password), a button 5002 for instructing login, and a button 5003 for asking for reissue of a password are arranged on the login screen 500.

For example, after the user ID and the password are entered into the input region 5001, the registration tool 21 transmits the user ID and the password thus entered to the user management server 105, and requests authentication of the user ID. If the registration tool 21 receives information indicating that the authentication of the user ID is successful from the user management server 105, the registration tool 21 shifts the process to Step S101.

Figure 15:
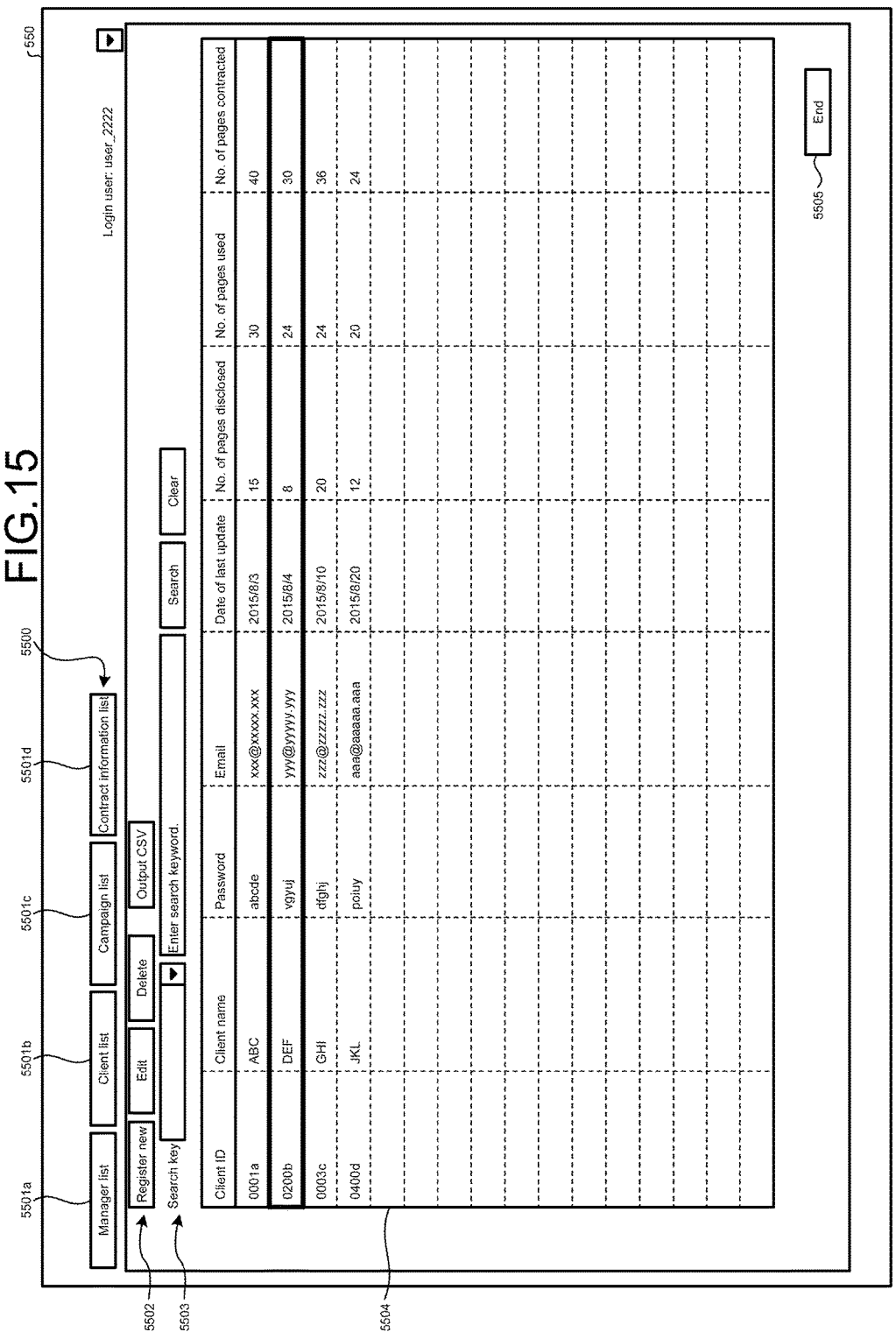
FIG. 15 is a diagram illustrating an example of a client list screen including a menu region according to the embodiments.

At Step S101, the registration tool 21 displays a screen including a menu region on the display of the registration terminal 20. FIG. 15 illustrates an example of a client list screen 550 including a menu region 5500 according to the embodiments. Hereinafter, expressions such as "display the screen on the display of the registration terminal 20" will be simply described, for example, "display". In the example of FIG. 15, a menu region 5500 including tabs 5501a, 5501b, 5501c, and 5501d, a button group 5502, a search input section 5503, a list display region 5504, and an end button 5505 are arranged on the client list screen 550.

The tabs 5501a, 5501b, 5501c, and 5501d included in the menu region 5500 are tabs for selecting a menu item to determine the operational mode of the registration tool 21. The tabs 5501a and 5501b are tabs for switching to a user management mode, and are operated to display a manager list and a client list, respectively. The tab 5501c is a tab for switching to an image registration mode, and is operated to display a campaign list. The tab 5501d is a tab for switching to a module information registration mode, and is operated to display a list of contract information indicating contracts made between the service provider and the business operator.

The list display region 5504 displays a list corresponding to a menu item selected with one of the tabs 5501a, 5501b, 5501c, and 5501d. The example of FIG. 15 illustrates a state in which the tab 5501b is operated to select the client list. Hereinafter, each row of the list is called a record, and each column thereof is called an item.

The button group 5502 selects a process to be applied to the list displayed in the list display region 5504. In the example of FIG. 15, the button group 5502 includes four buttons, and the respective buttons are assigned with functions of "New registration", "Edit", "Delete", and "CSV output" in the order from the left. The "New registration" button is a button for newly adding a record to the list displayed in the list display region 5504. The "Edit" button is a button for editing information in a record selected in the list displayed in the list display region 5504. The "Delete" button is a button for deleting the information in the record selected in the list displayed in the list display region 5504. The "CSV output" button is a button for outputting information in the list displayed in the list display region 5504 as a file in the comma separated value (CSV) format.

The search input section 5503 includes a region for selecting or entering a search key for selecting a record from the list displayed in the list display region 5504, a search button for executing a search based on the search key, and a clear button for clearing the search result and the search key. The end button 5505 is a button for ending the processing by the registration tool 21.

In the example of FIG. 15, each record of the client information includes-items of "Client ID", "Client name", "Password", "E-mail address (Email)", "Date of last update", "Number of pages disclosed", "Number of pages used", and "Number of pages contracted". The client information may include more items.

The description refers back to FIG. 13. After the menu is displayed at Step S101, the process goes to the next step S102, and the registration tool 21 waits until any one of the tabs 5501a, 5501b, 5501c, and 5501d and the end button 5505 is operated to select a process. If the end button 5505 is operated, the registration tool 21 shifts the process to Step S103 to perform logout process for the user, and ends the processing of the registration tool 21.

If, at Step S102, the tab 5501a or the tab 5501b is operated to select the user management mode, the registration tool 21 shifts the process to Step S104. At Step S104, the registration tool 21 displays either one of the manager list screen and the client list screen (refer to FIG. 15) according to which of the tab 5501a and the tab 5501b is operated at Step S102. Here, the tab 5501b is assumed to be operated to display the client list screen 550 illustrated in FIG. 15.

Figure 16:
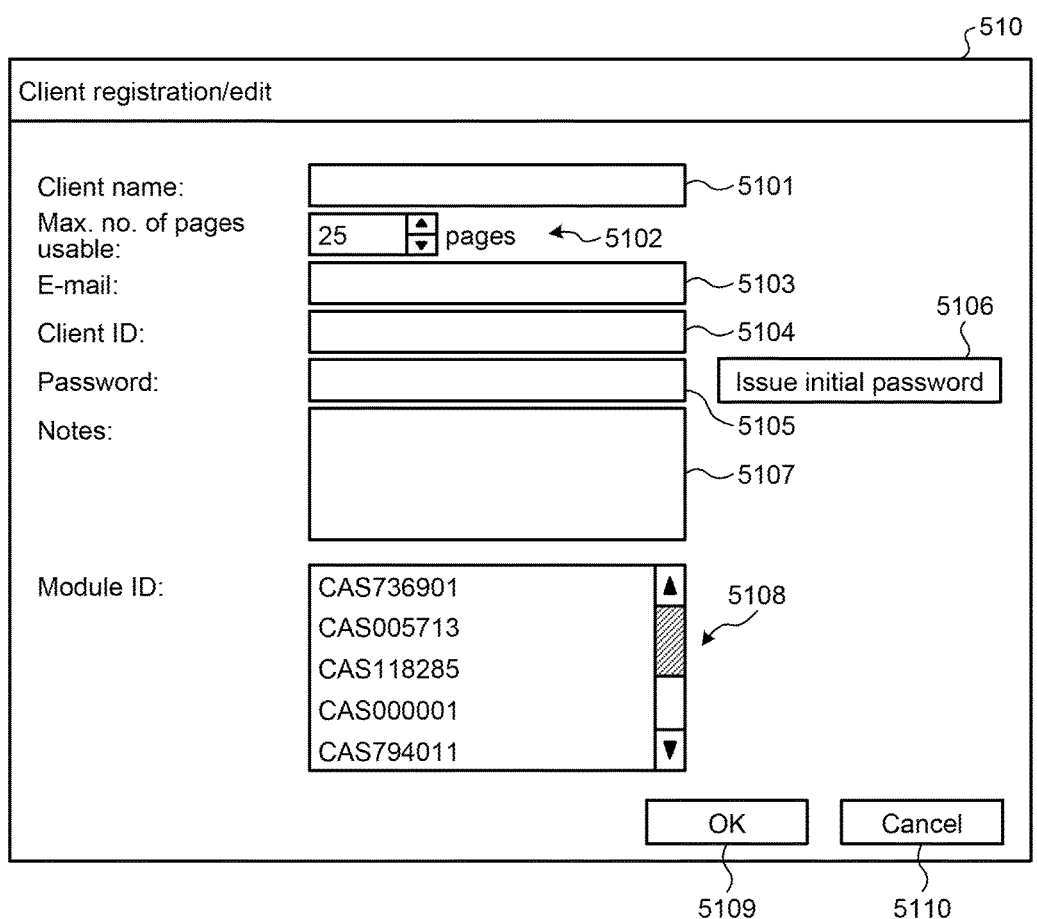
FIG. 16 is a diagram illustrating an example of a client registration/edit screen according to the embodiments.

If the "New registration" button or the "Edit" button included in the button group 5502 is operated on the client list screen 550, the registration tool 21 displays a client registration/edit screen 510 according to the embodiments that is exemplified in FIG. 16. In FIG. 16, input regions 5101 to 5108, an "OK" button 5109, and a "Cancel" button 5110 are arranged on the client registration/edit screen 510.

The input region 5101 is a region for entering the name of a client to be registered. The input region 5102 is a region for entering the upper limit value of the number of pages usable by the client. The input region 5103 is a region for entering contact information (e-mail address in this example) of the client. The input region 5104 is a region for entering a client ID for identifying the client. The input region 5105 is a region for entering the password used for authentication when the client attempts to use the image search system 10. The input region 5106 is a button for automatically generating an initial value of the password to be entered into the input region 5105. The input region 5107 is a region for entering notes.

The client ID and the password entered into the input regions 5104 and 5105, respectively, are assumed to be transmitted, for example, from the registration terminal 20 to the user management server 105, and are assumed to be registered in the user DB 106 by the user management server 105 in association with the user ID entered when the user logged into the registration tool 21.

The module ID 4021 associated with the client ID of the client is entered into the input region 5108. The module ID 4021 can be manually entered into the input region 5108. The module ID 4021 is not limited to being entered in this manner. If the module IDs 4021 are already associated with the client ID, the module ID 4021 may be entered by being selected from among these module IDs 4021 associated with the client ID.

The "OK" button 5109 is a button for determining the content entered into the input regions 5101 to 5108. For example, if the "OK" button 5109 is operated, the registration tool 21 transmits the pieces of information entered into the input regions 5101 to 5108 to the management server 101. The management server 101 receives the pieces of information transmitted from the registration tool 21, and stores the received pieces of information in the contract information DB 107. The "Cancel" button is a button for discarding the information entered into the input regions 5101 to 5108, and displaying the client list screen 550.

If an operation is performed indicating the end of the processing on the manager list screen or the client list screen, the registration tool 21 returns the process to Step S101 to display the screen including the menu region 5500.

Figure 17:
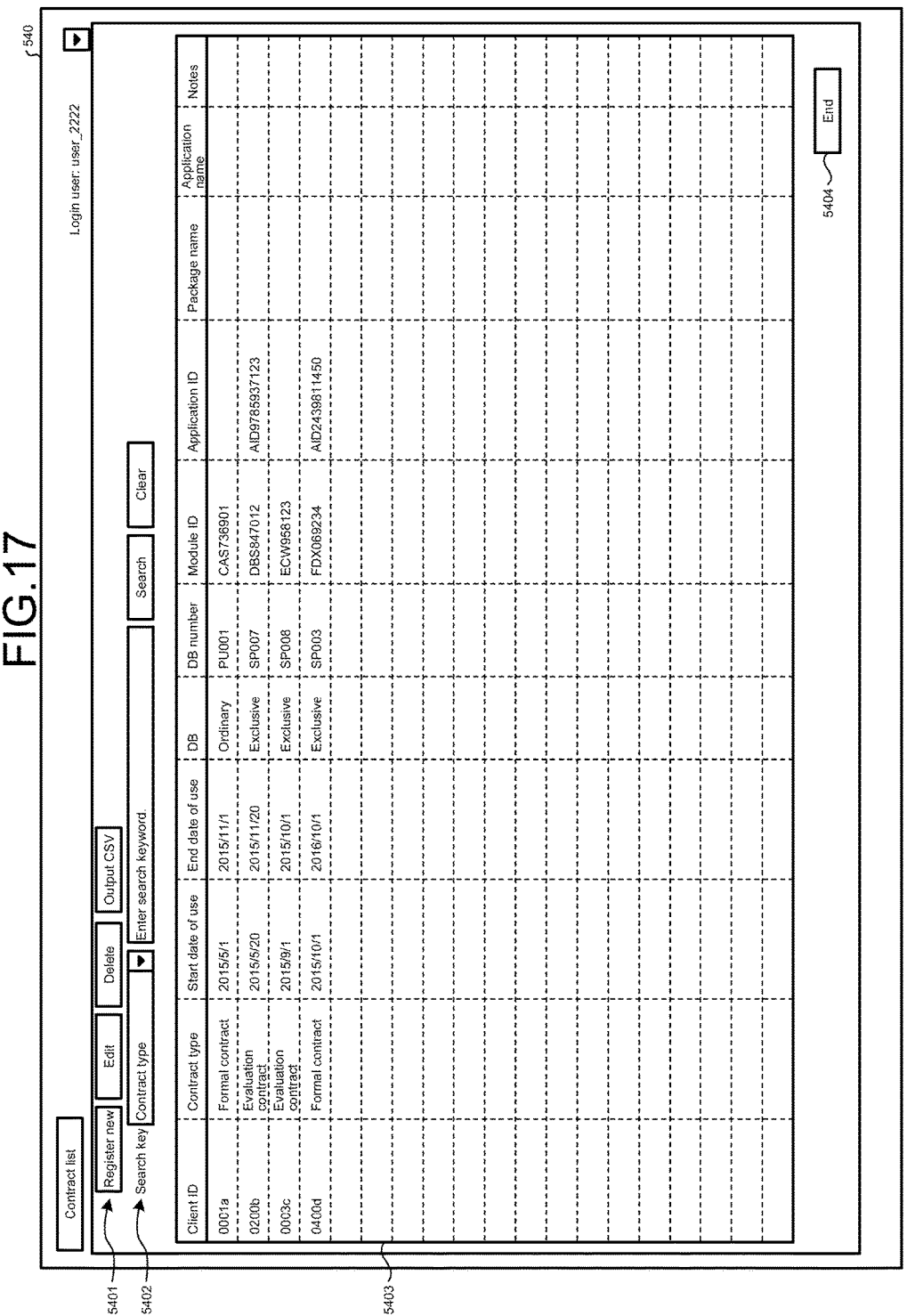
FIG. 17 is a diagram illustrating an example of a contract list screen according to the embodiments.

If, at Step S102, the tab 5501$d$ is operated to select the module information registration mode, the registration tool 21 shifts the process to Step S106. At Step S106, the registration tool 21 displays a contract list screen 540 according to the embodiments as exemplified in FIG. 17. In FIG. 17, a button group 5401, a search input section 5402, a list display region 5403, and an end button 5404 are arranged on the contract list screen 540. If the end button 5404 is operated, the registration tool 21 returns the process to Step S101 to display the screen including the menu region 5500.

The list display region 5403 displays the list of the contract information registered in the management server 101 (contract information DB 107). In the example of FIG. 17, each record in the list displayed in the list display region 5403 is created, for example, on a campaign-by-campaign basis, and includes items of "Client ID", "Contract type", "Start date of use", "End date of use", "Database (DB)", "DB number", "Module ID", "Application ID", "Package name", "Application name", and "Notes". The management server 101 stores the information in the record in the contract information DB 107. The registration tool 21 communicates with the management server 101 to acquire the contract information stored in the contract information DB 107, and displays the acquired contract information in the list display region 5403.

The button group 5401 includes four buttons, and the respective buttons are assigned with functions of "New registration", "Edit", "Delete", and "CSV output" in the order from the left. The "New registration" button is a button for newly adding a record to the list displayed in the list display region 5403. The "Edit" button is a button for editing information in a record selected in the list displayed in the list display region 5403. The "Delete" button is a button for deleting the information in the record selected in the list displayed in the list display region 5403. The "CSV output" button is a button for outputting information in the list displayed in the list display region 5403 as a file in the CSV format.

If the "New registration" button or the "Edit" button included in the button group 5401 is operated, the registration tool 21 displays, for example, a module registration/edit screen 520 according to the embodiments that is exemplified in FIG. 18, as a screen for newly registering or editing the contract information. In FIG. 18, input regions 5201 to 5211, an "OK" button 5212, and a "Cancel" button 5213 are arranged on the module registration/edit screen 520.

The input region 5201 is a region for entering the module ID 4021 of the image search module 4020 provided to the business operator by the service provider. A unique value in the image search module 4020 provided by the image search system 10 is used as the module ID 4021. For example, the management server 101 uniquely generates the module ID 4021. The management server 101 transmits the generated module ID 4021 to the registration tool 21. After receiving the module ID 4021 transmitted from the management server 101, the registration tool 21 enters the received module ID 4021 into the input region 5201. The module ID 4021 is not limited to being entered in this manner, but may be manually entered. For example, a contract is made with the business operator for each module ID 4021.

The input region 5202 is a region for entering the contract type. In this example, two types of contracts, that is, an evaluation contract and a formal contract are prepared as the contract types. The evaluation contract is a contract type for the business operator to evaluate the image search system 10, and allows registration of images in the image search DB 112*a* serving as a private DB while not allowing the disclosure processing. The formal contract is a contract having a wider scope of authority than the evaluation contract, and allows registration of images in the image search DB 112*a* serving as a private DB and in the image search DB 112*b* serving as a public DB. The formal contract allows the disclosure processing and the non-disclosure processing. The evaluation contract or the formal contract is exclusively entered into the input region 5202.

The input regions 5203 and 5204 are regions for entering the start date of use and the end date of use, respectively, of the module ID 4021 entered into the input region 5201, that is, the image search module 4020 corresponding to the module ID 4021. The image search module 4020 is usable within a period from the date entered into the input region 5203 to the date entered into the input region 5204, and is unusable outside the period. The start date of use and the end date of use correspond to the start date and the end date of the contract for the image search module 4020.

The input regions 5205 and 5206 are regions for specifying a DB to be used for the image search by the image search module 4020 corresponding to the module ID 4021 entered into the input region 5201. The input region 5205 specifies which pair of the pair of the ordinary DBs 111*a* and 111*b* and any pair of the exclusive DBs 110$a_1$ and 110$b_1$, 110$a_2$ and 110$b_2$, . . . is used. Entering "Ordinary" specifies the pair of the ordinary DBs 111*a* and 111*b*. In contrast, entering "Exclusive" specifies any one of the pairs of the exclusive DBs 110$a_1$ and 110$b_1$, 110$a_2$ and 110$b_2$, . . . .

The input region 5206 is a region for entering the DB number of the specified pair of DBs. For example, with reference to FIG. 4, if the "Exclusive" is entered into the input region 5205 and the "SP002" is entered into the input region 5206, the pair of the exclusive DBs 110$a_2$ and 110$b_2$ is specified. If the "Ordinary" is entered into the input region 5205, for example, the DB number assigned to the pair of the ordinary DBs 111a and 111b is automatically entered. A different number is provided as the DB number from the service provider to each business operator according to the contract.

The input region 5207 is a region for entering a client ID for identifying a business operator associated with this contract information.

The input region 5208 is a region for entering the application ID 4010. The input region 5208 may be left blank. Entering the application ID 4010 of the image search application 4001' into the input region 5208 enables filtering of the image search application 4001' corresponding to the entered application ID 4010.

The input regions 5209 to 5211 are regions for entering optional information, and can be left with no entry. The input region 5209 is a region for entering the package name of, for example, the image search application 4001' incorporating the image search module 4020 including the module ID 4021 entered into the input region 5201. The input region 5211 is a region for entering the name of the image search application 4001' or notes. The input region 5210 is an "Add" button, and is a button for adding the input region 5211.

The "OK" button 5212 is a button for determining the content entered into the input regions 5201 to 5211. For example, if the "OK" button 5212 is operated, the registration tool 21 transmits the pieces of information entered into the input regions 5201 to 5211, as the contract information to the management server 101. The management server 101 receives the contract information transmitted from the registration tool 21, and stores the received contract information in the contract information DB 107. The "Cancel" button 5213 discards the pieces of information entered into the input regions 5201 to 5211, and, for example, returns the process to Step S101 to display the screen including the menu region 5500.

Referring back to FIG. 13, if, at Step S102, the tab 5501c is operated to select the image registration mode, the registration tool 21 shifts the process to Step S105. At Step S105, the registration tool 21 displays a registered information list screen indicating information on registered campaigns on the display.

Figure 19:
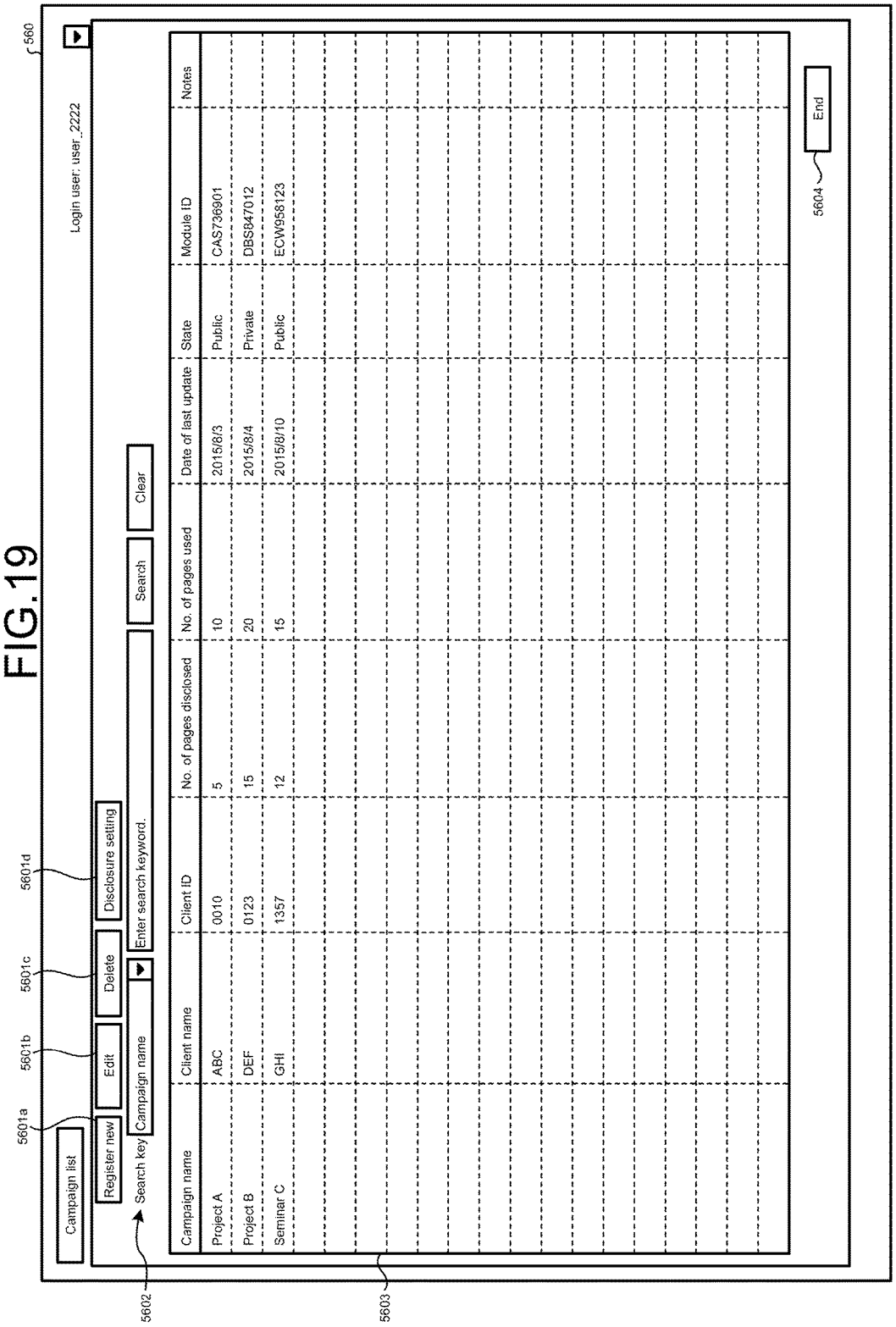
FIG. 19 is a diagram illustrating an example of a registered information list screen according to the embodiments.

FIG. 19 illustrates an example of a registered information list screen 560 according to the embodiments that is displayed at Step S105. In FIG. 19, a new registration button 5601a, an edit button 5601b, a delete button 5601c, a disclosure setting button 5601d, a search input section 5602, a list display region 5603, and an end button 5604 are arranged on the registered information list screen 560.

The list display region 5603 displays a list of campaign information registered in the management server 101 (contract information DB 107). In the example of FIG. 19, each record in the list displayed in the list display region 5603 includes items of "Campaign name", "Client name", "Client ID", "Number of pages disclosed", "Number of pages used", "Date of last update", "State", "Module ID", and "Notes". The management server 101 stores the information in the record in the contract information DB 107. The registration tool 21 communicates with the management server 101 to acquire the campaign information stored in the contract information DB 107, and displays the acquired campaign information in the list display region 5603.

The new registration button 5601a is a button for newly adding a record to the list displayed in the list display region 5603. The edit button 5601b is a button for editing information in a record selected in the list displayed in the list display region 5603. The delete button 5601c is a button for deleting the information in the record selected in the list displayed in the list display region 5603. The disclosure setting button 5601d is a button for setting the state of the record selected in the list displayed in the list display region 5603 to either of the disclosed state and the undisclosed state.

After the registered information list screen 560 is displayed at Step S105, the registration tool 21 shifts the process to Step S110 to wait for an operation to any of the buttons 5601a to 5601d and the end button 5604. The following describes processes corresponding to the operations to the respective buttons according items (1) to (5) given below.

(1) If the end button 5604 is operated at Step S110, the registration tool 21, for example, returns the process to Step S101 to display the screen including the menu region 5500.

(2) If, at Step S110, the disclosure setting button 5601d is operated while a record is selected in the list display region 5603, the registration tool 21 shifts the process to Step S119. At Step S119, the registration tool 21 determines, based on the module ID 4021 included in the record, whether the campaign in the selected record can be disclosed.

For example, the registration tool 21 requests, from the management server 101, contract information including the module ID 4021 matching the module ID 4021 included in the selected record among the contract information registered in the contract information DB 107. The registration tool 21 determines that the campaign is disclosable if the contract type is the formal contract and the current date is within the contract period according to the contract information transmitted from the management server 101 in response to the request. The registration tool 21 determines that the campaign is undisclosable if the contract type is the evaluation contract or the current date is out of the contract period.

If the campaign is determined to be undisclosable at Step S119 ("No" at Step S119), the registration tool 21 returns the process to Step S101 to display the screen including the menu region 5500. If, instead, the campaign is determined to be disclosable at Step S119 ("Yes" at Step S119), the registration tool 21 shifts the process to Step S120.

At Step S120, the registration tool 21 displays a disclosure setting screen for setting the campaign indicated by the selected record to be disclosed or undisclosed.

Figure 20:
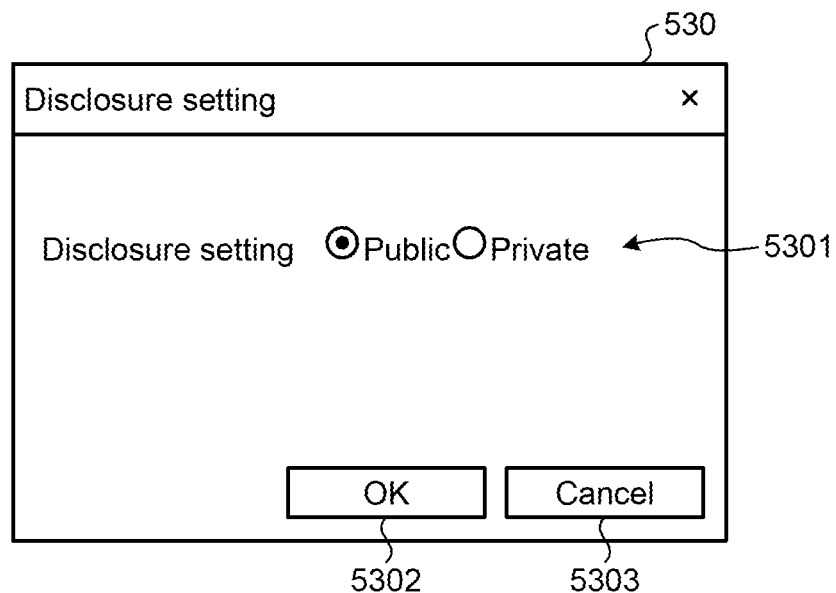
FIG. 20 is a diagram illustrating an example of a disclosure setting screen according to the embodiments.

FIG. 20 illustrates an example of the disclosure setting screen applicable to the embodiments. In FIG. 20, an input region 5301, an "OK" button 5302, and a "Cancel" button 5303 are arranged on a disclosure setting screen 530. The input region 5301 is a region into which public or private is exclusively entered. The value of the item "State" in the selected record is set as the initial value of the input region 5301. The "OK" button 5302 is a button for determining the value entered into the input region 5301.

For example, if the "OK" button 5302 is operated, the registration tool 21 sets the record to a disclosure state that has been set to be disclosed or undisclosed according to the input to the input region 5301. Images included in a campaign indicated by a record with the disclosure state set to be disclosed serve as images to be disclosed, and images included in a campaign indicated by a record with the disclosure state set to be undisclosed serve as images to be undisclosed. After the disclosure state is set, the registration tool 21 updates the display of the list display region 5603, and returns the process to Step S105. If the "Cancel" button 5303 is operated, the registration tool 21 returns the disclosure state of the record to the state before the disclosure setting screen 530 was displayed, and returns the process to Step S105.

(3) If, at Step S110, the delete button 5601c is operated while a record is selected in the list display region 5603, the registration tool 21 shifts the process to Step S121. At Step S121, the registration tool 21 deletes the information in the selected record. At this time, the registration tool 21 preferably displays a confirmation screen asking, for example, whether the record should really be deleted, and/or whether the record should be deleted including information on images associated with the record. After the record is deleted, the registration tool 21 updates the display of the list display region 5603, and returns the process to Step S105.

(4) If the edit button 5601b is operated at Step S110, the registration tool 21 shifts the process to Step S122. At Step S122, the registration tool 21 acquires images included in the campaign indicated by the record selected in the list displayed in the list display region 5603 of the registered information list screen 560 from the registration server 104. If linkage information is associated with the acquired images, the registration tool 21 also acquires this linkage information. After acquiring the images and the linkage information, the registration tool 21 shifts the process to Step S124.

(5) If the new registration button 5601a is operated at Step S110, the registration tool 21 shifts the process to Step S123 to execute a registration process of a new campaign. At Step S123, the registration tool 21 displays a campaign registration screen for newly registering a campaign.

Figure 21:
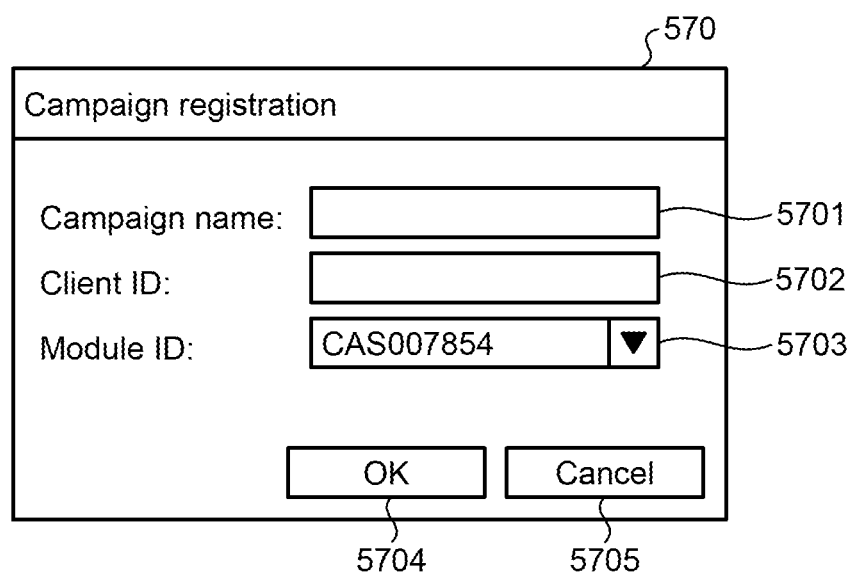
FIG. 21 is a diagram illustrating an example of a campaign registration screen according to the embodiments.

FIG. 21 illustrates an example of the campaign registration screen according to the embodiments. In FIG. 21, input regions 5701 to 5703, an "OK" button 5704, and a "Cancel" button 5705 are arranged on a campaign registration screen 570. The input region 5701 is a region for entering a campaign name. The input region 5702 is a region for entering a client ID for identifying a person/organization (business operator) who runs a newly registered campaign. Values entered into the input regions 5701 and 5702 serve as values of the item "Campaign name" and the item "Client ID", respectively, in the record.

The input region 5703 is a region for entering the module ID 4021. In this case, the module ID 4021 associated with the client ID entered into the input region 5702 is entered into the input region 5703. For example, if the module IDs 4021 are already associated with the client ID, the module ID 4021 may be entered into the input region 5703 by being selected from among these module IDs 4021 associated with the client ID.

For example, assume that the client ID entered into the input region 5702 is associated with a first module ID 4021 specified to be "Ordinary" in the input region 5205 in FIG. 18 and with a second module ID 4021 specified to be "SP002" indicating the exclusive DBs 110$a_2$ and 110$b_2$ in the input region 5206 in FIG. 18. In this case, by selecting and entering either one of the first module ID 4021 and the second module ID 4021 into the input region 5703, the registration destination of the campaign can be specified to be either pair of the pair of the ordinary DBs 111a and 111b and the pair of the exclusive DBs 110$a_2$ and 110$b_2$ according to the entered module ID 4021.

If the "OK" button 5704 is operated, the registration tool 21 determines the values entered into the input regions 5701 to 5703 on the campaign registration screen 570, and uses the determined values to add a record to the list display region 5603 on the registered information list screen 560. The registration tool 21 shifts the process to Step S124. If, instead, the "Cancel" button 5705 is operated, the registration tool 21 discards the values entered into the input regions 5701 to 5703, and, for example, returns the process to Step S105.

Figure 22:
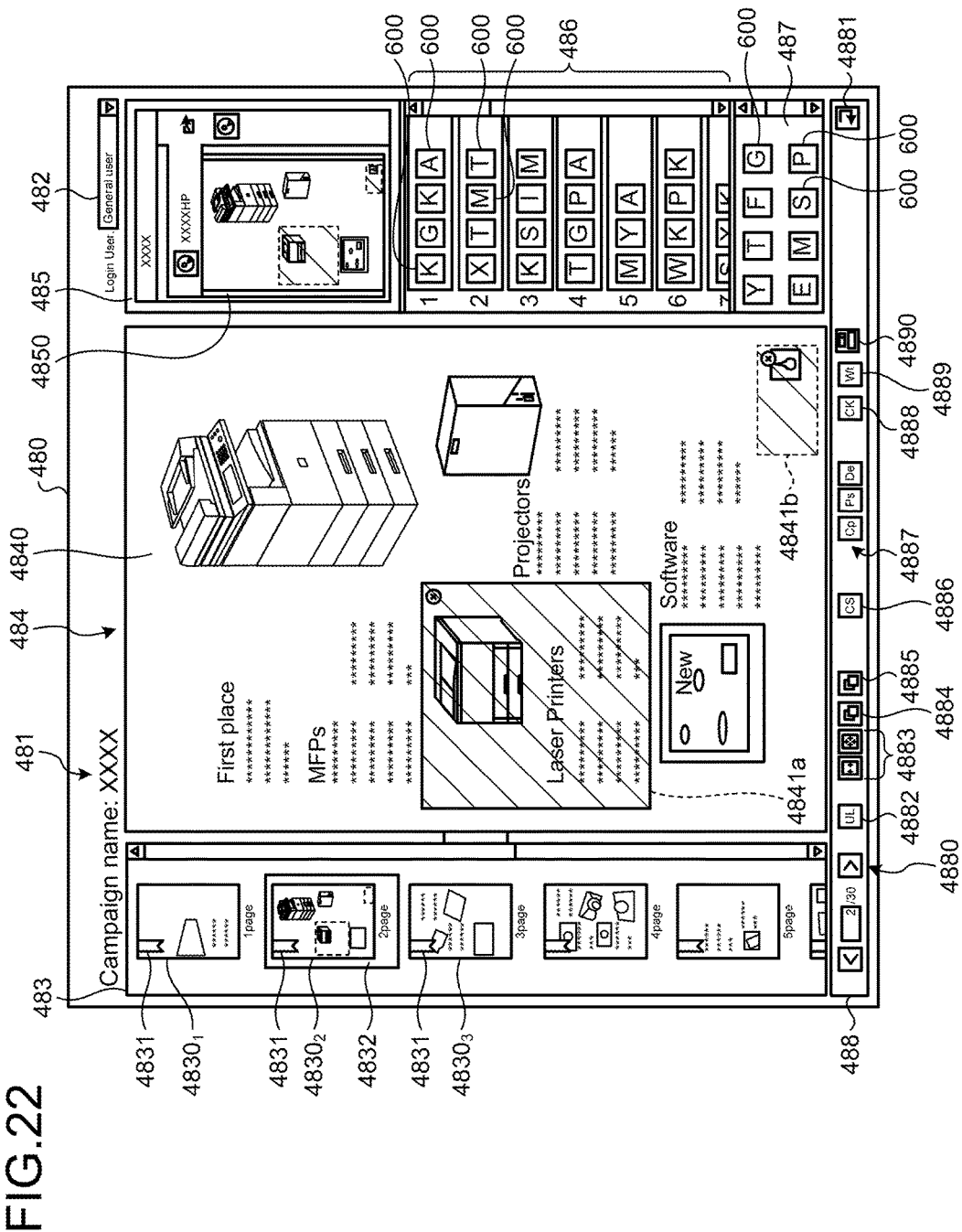
FIG. 22 is a diagram illustrating an example of an edit screen according to the embodiments.

At Step S124, the registration tool 21 displays an edit screen for editing the information about the campaign on the display device 2005 of the registration terminal 20. FIG. 22 illustrates an example of the edit screen according to the embodiments. In FIG. 22, an edit screen 480 includes a header region 481, a thumbnail display region 483, a page edit region 484, a preview region 485, a target area list region 486, a link icon list region 487, and a toolbar 488.

In the header region 481, the name of the campaign subjected to the edit on this edit screen 480 is displayed at the left end, and a user menu display section 482 that is usable with the authority of a user having logged in to the registration tool 21 is placed at the right end.

The thumbnail display region 483 is a region in which thumbnail images obtained by reducing the sizes of images included in the campaign are displayed. For example, if the process has shifted from the above-described step S122 of instructing the edit of the campaign information to this step S124, the registration tool 21 acquires the images that have been acquired from the registration server 104 at Step S122 and that are included in the campaign indicated by the record selected from a list display region 5603, from the image DB 14 of the registration server 104. The registration tool 21 reduces the sizes of the acquired images to generate the thumbnail images, and displays them in the thumbnail display region 483. In the example of FIG. 22, thumbnail images $4830_1$, $4830_2$, $4830_3$, . . . are displayed in the thumbnail display region 483.

When the processing has shifted from the above-described step S123 of instructing the new registration of the campaign information to this step S124, the registration tool 21 makes the thumbnail display region 483, for example, to be blank. The registration tool 21 can sequentially display other thumbnail images virtually displayed outside the thumbnail display region 483 in the thumbnail display region 483 according to operations to a scroll bar provided at the right end of the thumbnail display region 483.

The page edit region 484 displays an image 4840 subjected to the edit among the images included in the campaign. For example, the registration tool 21 displays the original image of a thumbnail image selected from among the thumbnail images $4830_1$, $4830_2$, $4830_3$, . . . displayed in the thumbnail display region 483, as the image 4840 in the page edit region 484. In the example of FIG. 22, the thumbnail image $4830_2$ is selected in the thumbnail display region 483, and the original image of this selected thumbnail image $4830_2$ is displayed as the image 4840 in the page edit region 484. The thumbnail display region 483 displays the thumbnail image $4830_2$ that is selected and currently displayed in the page edit region 484, in a manner highlighted by a surrounding frame 4832.

If a range is specified for the image 4840 displayed in the page edit region 484, the registration tool 21 can set the specified range as a target area. The registration tool 21 specifies the range according to an operation to the input device 2008 by the user. For example, specifying any two points in the image 4840 displayed in the page edit region 484 specifies a rectangular range having the specified two points as diagonal vertices. In the example of FIG. 22, target areas 4841*a* and 4841*b* are each set by the rectangular range for the image 4840 in the page edit region 484.

The registration tool 21 can explicitly indicate the target areas 4841*a* and 4841*b* by displaying the inside areas of the target areas 4841*a* and 4841*b* thus set, for example, in a different color from that of the outside areas thereof. The shape of the target area is not limited to a rectangle, but can be set to any shape as long as being a closed shape.

The registration tool 21 generates identification information (such as serial numbers) identifying the respective target areas 4841*a* and 4841*b* thus set, and associates the identification information with the respective target areas 4841*a* and 4841*b*. The identification information is generated so as to be capable of identifying the target areas throughout the respective images included in the campaign subjected to the edit.

While details will be described later, the registration tool 21 can associate one or more pieces of the linkage information with the target areas 4841*a* and 4841*b* set in the page edit region 484.

The registration tool 21 appends a marker image 4831 to a thumbnail image that has been subjected to some kind of edit, such as specification of a target area, in the page edit region 484, and that corresponds to an image not yet stored, from among the thumbnail images $4830_1$, $4830_2$, $4830_3$, . . . displayed in the thumbnail display region 483.

The preview region 485 displays a preview screen 4850 that emulates a screen of the display device 3005 of the search terminal 30 on which an image being edited in the page edit region 484 is displayed by an application program compatible with the information processing system according to the embodiments. The registration tool 21 explicitly displays the target areas 4841*a* and 4841*b* set in the page edit region 484 in the preview region 485, for example, in a highlighted manner. The registration tool 21 also displays information indicating the linkage information set for the respective target areas 4841*a* and 4841*b* in a corresponding manner to the respective target areas 4841*a* and 4841*b*, in the preview region 485.

The target area list region 486 displays a list of the linkage information appended to the target areas set for the images included in the campaign subjected to the edit, in the form of icon images 600, 600, . . . . In the example of FIG. 22, the registration tool 21 displays the linkage information in the target area list region 486 collectively on a basis of per identification information (per serial number) appended to the corresponding target area. The registration tool 21 can sequentially display the linkage information for other target areas virtually displayed outside the target area list region 486 in the target area list region 486 according to operations to a scroll bar provided at the right end of the target area list region 486.

The link icon list region 487 displays a list of linkage information settable for the target areas using the icon images 600, 600, . . . corresponding to the respective pieces of the linkage information. The registration tool 21 can associate the linkage information corresponding to the icon images 600, 600, . . . with the target area 4841*a* by moving the icon image 600 displayed in the link icon list region 487 using what is called a drag-and-drop operation, and superimposing the icon image on, for example, the target area 4841*a* set inside the page edit region 484. The registration tool 21 can also associate a plurality of pieces of the linkage information with one target area.

The registration tool 21 can sequentially bring other icon images 600 virtually arranged outside the link icon list region 487 into the link icon list region 487 and display the icon images there according to operations to a scroll bar provided at the right end of the link icon list region 487.

When the linkage information is associated with the target area, the registration tool 21 can display the icon image 600 indicating the associated linkage information at a predetermined location of the target area. This makes it easy to find out which linkage information is associated with the target area 4841*a*, which is preferable. The registration tool 21 reflects the association of the linkage information with the target area in the display in the preview region 485.

A page specifying section 4880 for specifying a page (image) displayed in the page edit region 484 and buttons or button groups 4881 to 4890 for performing various functions included in the registration tool 21 are arranged on the toolbar 488. The button 4881 is a button for returning the screen from the edit screen 480 to the registered information list screen 560.

Figure 23:
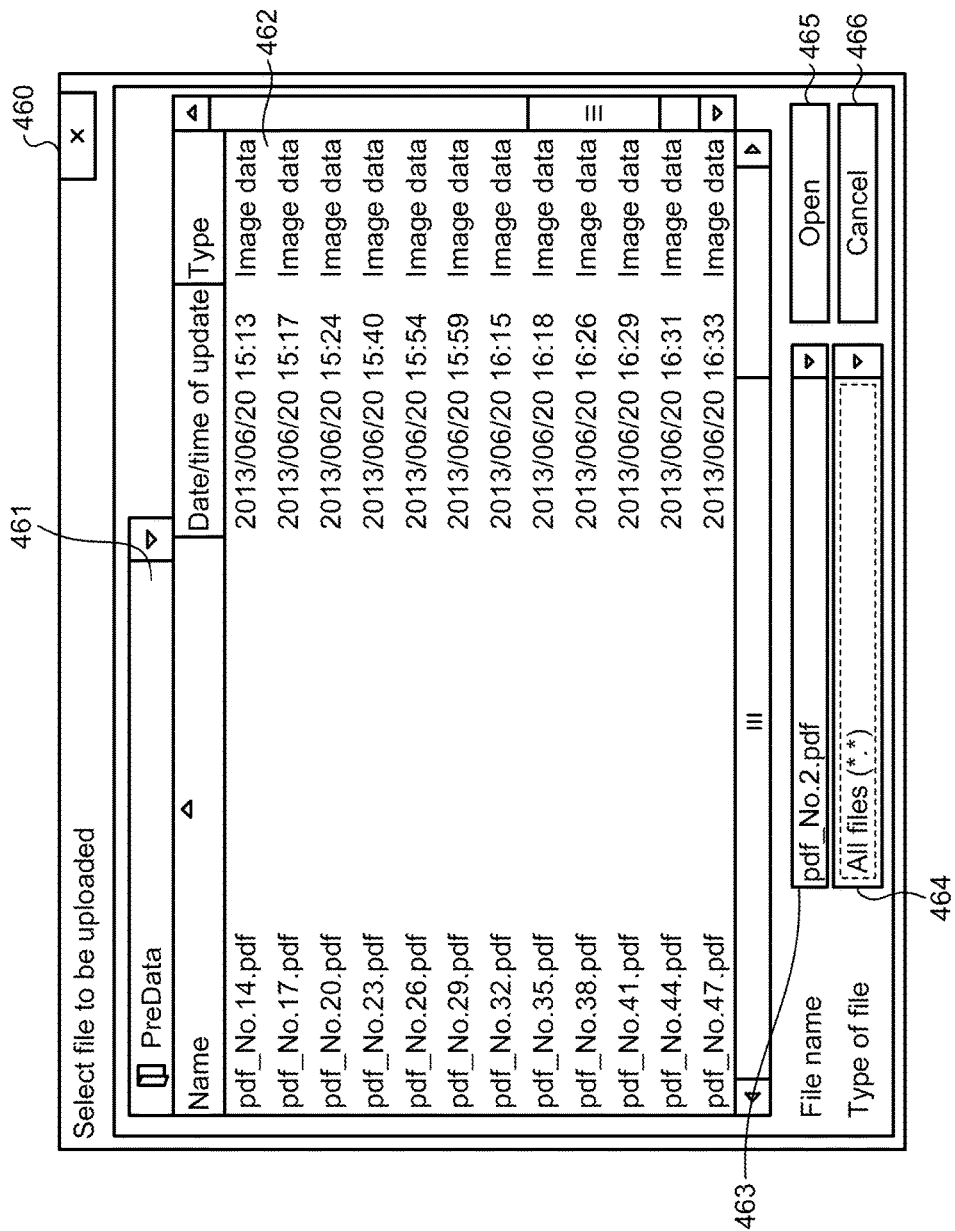
FIG. 23 is a diagram illustrating an example of a file selection screen applicable to the embodiments.

The button 4882 is a button for uploading an image from the registration terminal 20 to the registration server 104. If the button 4882 is operated, the registration tool 21 displays, for example, a file selection screen 460 as exemplified in FIG. 23 on the display device 2005. In FIG. 23, the file selection screen 460 is, for example, a standard file selection screen provided by an operating system (OS) running on the CPU 2001 of the registration terminal 20, and a folder specifying section 461, a file list display region 462, a file name display section 463, a file format specifying section 464, and buttons 465 and 466 are arranged on the file selection screen 460.

The file list display region 462 displays a list of files stored in a folder specified in the folder specifying section 461. The file format specifying section 464 specifies the format of files to be displayed in the file list display region 462. The file name display section 463 displays the file name or names of a file or files selected in the file list display region 462. If one or more files is/are selected from the files displayed in the file list display region 462 and the button 465 is operated, for example, information indicating the selected file or files is transferred from the OS to the registration tool 21. The registration tool 21 transmits the file or files indicated by the file information transferred from the OS from the registration terminal 20 to the registration server 104 to upload an image or images to the registration server 104. The button 466 is used to return the screen to the edit screen 480 without uploading a file.

Returning to the description of FIG. 22, the button group 4883 includes two buttons for adjusting the display size of the image 4840 displayed in the page edit region 484.

The button 4884 switches an area setting mode of setting an area in the page edit region 484 to a target area setting mode of setting a target area. If this button 4884 is operated to switch the edit mode to the target area setting mode, and then an area is set in the image 4840 displayed in the page edit region 484, the registration tool 21 sets the area as the target area.

The button 4885 switches the area setting mode of specifying an area in the page edit region 484 to a mask setting mode of specifying a mask area from which the feature information is not extracted by the analysis unit 12. If this button 4885 is operated to switch the edit mode to the mask setting mode, and then an area is set in the image 4840 displayed in the page edit region 484, the registration tool 21 sets the area as the mask area.

Figure 24:
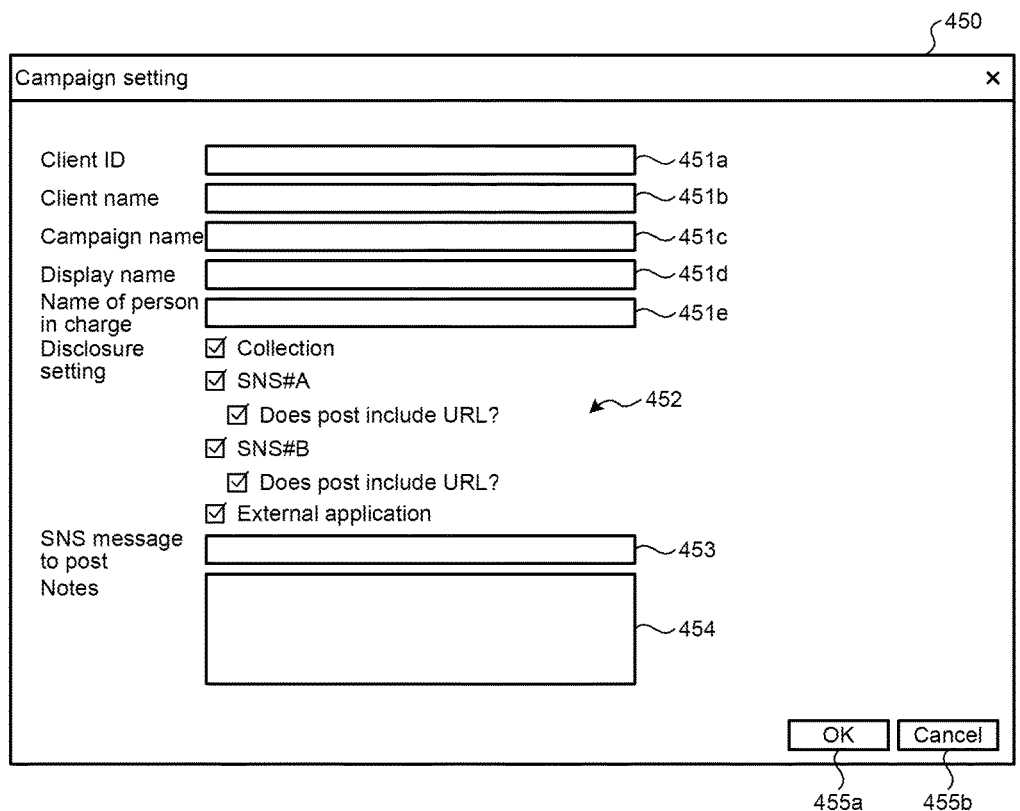
FIG. 24 is a diagram illustrating an example of a campaign edit screen according to the embodiments.

The button 4886 is a button for displaying a campaign setting screen for setting details of a campaign. FIG. 24 illustrates an example of the campaign setting screen. In FIG. 24, display regions 451*a* and 451*b*, input regions 451*c* to 451*e*, 453, and 454, a disclosure method setting section 452, and buttons 455*a* and 455*b* are arranged on a campaign setting screen 450. The display regions 451*a* and 451*b* unchangeably display the values of the items "Client ID" and "Client name", respectively, of the record on the registered information list screen 560 illustrated in FIG. 19.

The input region 451*c* is a region for entering a campaign name. The value of the item "Campaign name" of the record on the registered information list screen 560 has been entered in advance into the input region 451*c* as an initial value. The input region 451*d* is a region for entering a display name used when the campaign is displayed on the search terminal 30. For example, the name of a person in charge of registration of the campaign is entered into the input region 451*e*.

The disclosure method setting section 452 includes setting items for setting the disclosure method of the campaign. The term "disclosure" refers herein to an operation on the search terminal 30 when a predetermined operation is performed on the search terminal 30. In the example of FIG. 24, the disclosure method setting section 452 includes, as the setting items, "Collection", a plurality items, such as "SNS#A" and "SNS#B", for a social networking service (SNS), and "External application". A plurality of disclosure methods can be specified at the same time in the disclosure method setting section 452.

The setting item "Collection" among the setting items included in the disclosure method setting section 452 includes an input region (checkbox in this example) for setting whether the information about the campaign is to be storably disclosed on the search terminal 30. The setting items "SNS#A" and "SNS#B" include input regions for setting whether the information about the campaign is to be posted on the SNS#A and the SNS#B, respectively. Checking an item "Do you include URL in your post?" of each of the setting items "SNS#A" and "SNS#B" allows the URL to be included in the posted content in a linkable manner. The setting item "External application" includes an input region for setting whether the information about the campaign is to be displayed on the search terminal 30 by using an external application program for the application program compatible with the information processing system.

The input region 453 is a region for entering a message to be posted in the case of posting the information about the campaign on the SNS#A and/or the SNS#B if the disclosure is set by the setting item or items "SNS#A" and/or "SNS#B" in the disclosure method setting section 452. The input region 454 is a region for entering notes on, for example, the campaign.

The button 455*a* is a button for reflecting the information entered or set in the input regions 451*c* to 451*e*, 453, and 454 and the disclosure method setting section 452 as setting information for the campaign, and returning the screen to the edit screen 480. This setting information for the campaign is included in the metadata of the campaign. If the button 455*a* is operated, the registration tool 21 updates the record and the metadata corresponding to the campaign based on, for example, the information entered into the input regions 451*c* to 451*e*, 453, and 454 and the setting values set by the disclosure method setting section 452. The button 455*b* is a button for returning the screen to the edit screen 480 without updating the record and the metadata corresponding to the campaign.

Returning to the explanation of FIG. 22, the button group 4887 includes three buttons for executing copy, paste, and deletion of information.

The button 4888 is a button for performing similar image check to check whether the image search system 10 has already registered therein an image including a portion similar to a part or the whole of the image (page) 4840 that is currently displayed in the page edit region 484 of the edit screen 480. The similar image check is performed, for example, by setting the registration server 104 instead of the image search system 10 as a target, and by setting, as a subject of check, an image set to be "Public" by the setting information for the campaign among the images registered in the registration server 104. The subject of check is not limited to this example. An image that is registered in the registration server 104 and set to be "Private" may also be set as the subject of check, and the image search system 10 may be directly set as a target of check. The registration tool 21 displays the search result transmitted from the registration server 104 on the display device 2005. The user can re-edit the image based on this search result.

At this time, for example, the registration tool 21 can request a search for a similar image by transmitting only the image in the target area set according to the operation of the button 4884, as the subject of check, to the registration server 104. The registration tool 21 can also exclude an image in the mask area set according to the operation of the button 4885 from the subject of check. Moreover, the registration tool 21 can also divide the image 4840 currently displayed in the page edit region 484, and request a search for similar images by transmitting the respective divided images to the registration server 104 so as to perform the similar image check for the respective images.

The button 4889 is a button for switching the area setting mode of setting an area in the page edit region 484 to a region-of-interest (ROI) setting mode of setting a region of interest (ROI). If this button 4889 is operated to switch the edit mode to the ROI setting mode, and then an area is set in the image 4840 displayed in the page edit region 484, the registration tool 21 sets the area as the ROI. The registration tool 21 performs weighting by setting a weight value for the ROI thus set. The registration tool 21 can also perform the weighting for the ROI based on a predetermined weight value, or can perform it based on a weight value accepted in response to a user operation to the input device 2008. The setting of this ROI and the weighting for the ROI will be described later in detail.

The button 4890 is a button for instructing storage of the campaign being edited on the edit screen 480.

Returning to the description of FIG. 13, if the button 4890 is operated, the registration tool 21 shifts the process to Step S125 to start storage processing of the campaign. After starting the storage processing, the registration tool 21 shifts the process to Step S126 to determine whether the campaign to be stored is a newly registered campaign. If the process has been shifted from Step S122 described above to this step S126, the registration tool 21 determines that the campaign to be stored is not a newly registered campaign ("No" at Step S126), and shifts the process to Step S127.

If, instead, the process has been shifted from Step S123 described above to this step S126, the registration tool 21 determines that the campaign to be stored is a newly registered campaign ("Yes" at Step S126), and shifts the process to Step S130.

At Step S130, the registration tool 21 performs the similar image check for images in which target areas are set among images included in the campaign to be stored so as to determine whether the registration server 104 has already registered therein any image that includes a portion similar to a part or the whole of any of the above-described images.

For example, the registration tool 21 transmits all the images included in the campaign to be stored to the registration server 104, and requests a search for similar images. At the next step S131, if the registration tool 21 determines, based on the search result, that no similar image has been registered in the registration server 104 ("Unregistered" at Step S131), the registration tool 21 shift the process to Step S127.

Figure 25:
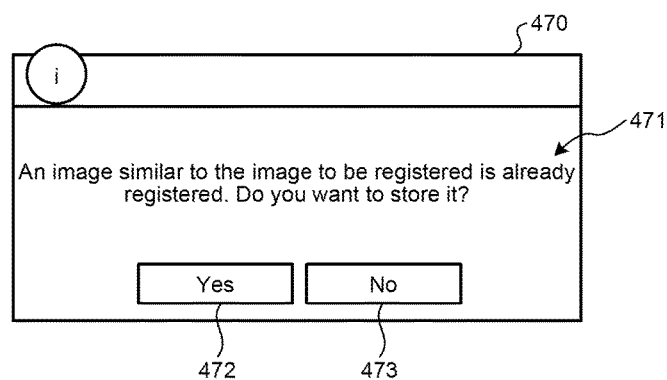
FIG. 25 is a diagram illustrating an example of a warning screen applicable to the embodiments.

At Step S131, if the registration tool 21 determines, based on the search result, that a similar image has been registered in the registration server 104 ("Registered" at Step S131), the registration tool 21 shift the process to Step S132. At Step S132, the registration tool 21 displays, for example, a warning screen exemplified in FIG. 25 on the display device 2005. In FIG. 25, a warning screen 470 displays a warning message 471 indicating that a similar image is already registered in the registration server 104, and has a "Yes" button 472 and a "No" button 473 arranged thereon.

If the "No" button 473 is operated on the warning screen 470, the registration tool 21 can perform an avoidance process to avoid the registration of the similar image. As an example, the registration tool 21 displays, on the display device 2005, a message prompting to perform the avoidance process to avoid the registration of the similar image, and shifts the process to Step S124. In this case, conceivable examples of the avoidance process include changing of an image included in the campaign to be stored, setting of the mask area for the image, and changing of a target area. After the avoidance process is performed, the process shifts to Step S127.

If, instead, the "Yes" button 472 is operated on the warning screen 470, the registration tool 21 can shift the process to Step S127 without performing the avoidance process described above, and can perform the registration of the image.

At Step S127, the registration tool 21 transmits the information about the campaign to the registration server 104, and requests the registration server 104 to update the registered information. For example, the registration tool 21 transmits the images included in the campaign, the pieces of the linkage information associated with the respective images, and metadata of the campaign, to the registration server 104.

The registration tool 21 generates information indicating the target areas based on the pieces of information set on the edit screen 480, and transmits the generated information to the registration server 104. As described above, in the embodiments, the information indicating the target areas is described using, for example, the XML that is a kind of markup language that uses tags to define and describe meanings and structures of data.

In response to the request from the registration tool 21, the registration server 104 updates the image DB 14, the linkage information DB 15, and a metadata DB (not illustrated) storing the metadata, based on the pieces of information transmitted from the registration terminal 20. At this time, the registration server 104 stores, in the linkage information DB 15, the file name of the file storing the XML code describing the information indicating the target areas and the image identification information in association with each other.

After transmitting the request for information update to the registration server 104 at Step S127, the registration tool 21 returns the process to Step S105.

The following briefly describes the XML code describing the information indicating the target areas according to the embodiments. FIG. 26 illustrates an example of the XML code according to the embodiments that describes the information indicating the target areas. In FIG. 26 and drawings illustrating similar code examples below, the number at the top of each line represents a line number for explanation, and is distinguished from a code representing the entire data by a subsequent colon (:), unless otherwise stated. The code exemplified in FIG. 26 is a pseudo-code simulating the notation of the XML.

In FIG. 26, an XML code 140 defines a page by the section (from the first line to the 16th line) interposed between the outermost tags "" and "". That is, the section interposed between the tags "" and "" is associated with one image. In each of the ranges from the second line to the 12th line and from the 13th line to the 15th line (the 14th line being illustrated by omitting a plurality of lines), a section interposed between tags "<hotspot>" and "</hotspot>" defines one target area. In this manner, a plurality of target areas can be defined for one page (one image).

On the third line, a section interposed between tags "<area>" and "</area>" defines the range in the page of the target area indicated from the second line to the 12th line, using, for example, coordinates (x1,y1) of the upper left corner and coordinates (x2,y2) of the lower right corner.

In each of the ranges from the fourth line to the eighth line and from the ninth line to the 11th line (the 10th line being illustrated by omitting a plurality of lines), a section interposed between tags "<link>" and "</link>" defines one piece of the linkage information. In this manner, a plurality of piece of the linkage information can be defined for one target area. For example, as exemplified from the fourth line to the eighth line in FIG. 26, a section interposed between tags "<title>" and "</title>" defines the title of the linkage information. A section interposed between tags "<type>" and "</type>" defines the type of this linkage information.

In this example, a section interposed between tags "<URI>" and "</URI>" defines address information on the network, such as the Internet 51, as the linkage information, using a Uniform Resource Identifier (URI). In this case, appending an argument to the URI can specify, for example, a behavior of a browser application that has read the URI. The linkage information is not limited to the URI. Various types of linkage information can be described by defining tags in advance. For example, information for starting a particular application program can also be described as the linkage information.

In this example, in the linkage information defined in the section interposed between the tags "<link>" and "</link>", three items are defined using the tags "<title>" and "</title>", the tags "<type>" and "</type>", and the tags "<URI>" and "</URI>".

The linkage information is not limited to this example. More items can be defined in the section interposed between the tags "<link>" and "</link>". Image data itself of the linkage information may be described by defining the image data as an item in the section interposed between the tags "<link>" and "</link>".

In this manner, the XML code 140 defines the target areas in the page and the linkage information in the target areas, so that functions can be performed by the linkage information associated with objects included in the target areas in the page.

DB Specifying Method According to Embodiments

Figure 27:
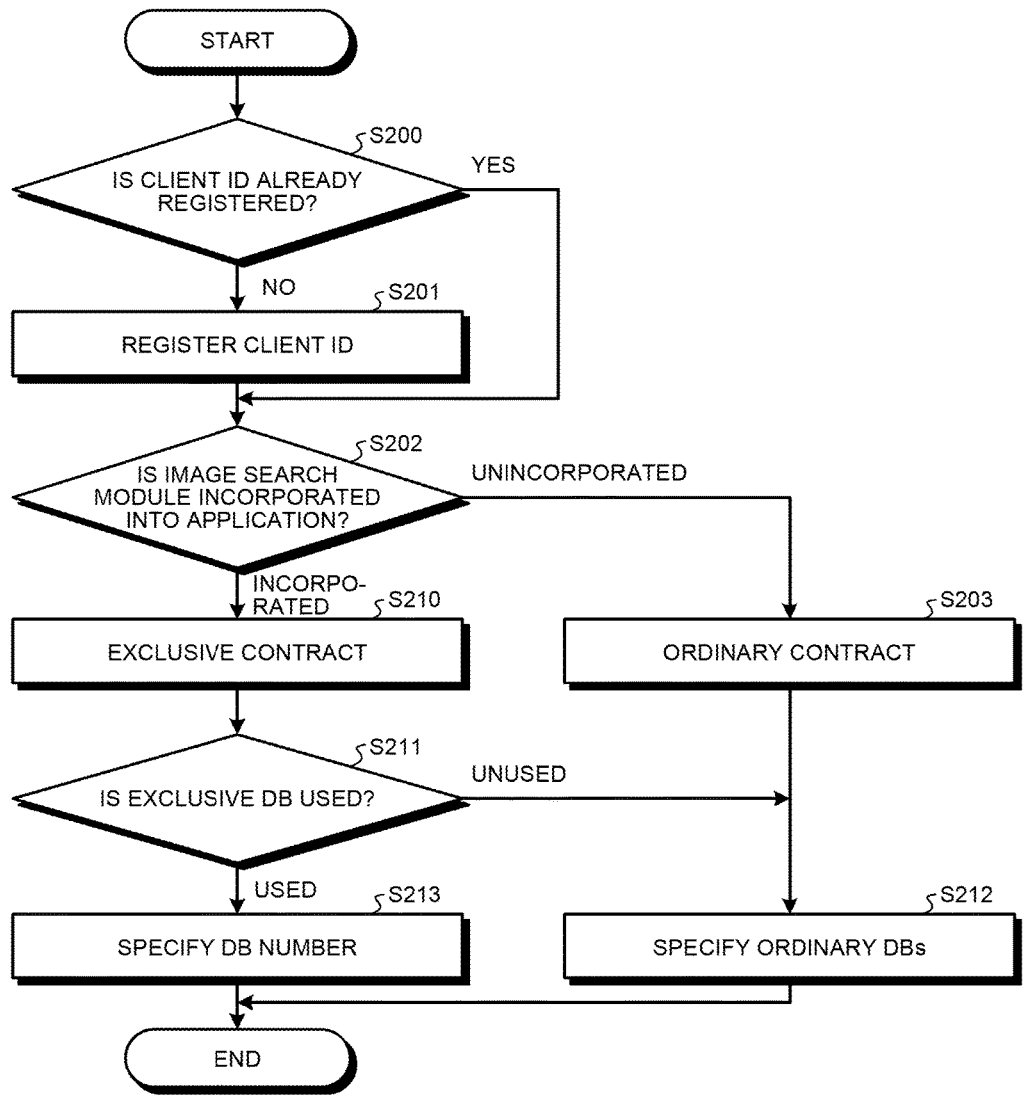
FIG. 27 is an exemplary flowchart illustrating a method according to the embodiments for specifying a DB in which an image is to be registered.

The following briefly describes a method for specifying a DB in which an image is to be registered according to embodiments, using a flowchart of FIG. 27. For example, the service provider performs processing according to the flowchart of FIG. 27. A contract for using the image search system 10 is assumed to have been concluded in advance in writing or the like between a business operator as a client and the service provider.

At Step S200, the service provider determines whether the client ID of the business operator subject to the contract has been registered. For example, the service provider can make an inquiry from the registration terminal 20 to the management server 101 about whether contract information including the client name of the business operator having the contract has been registered in the contract information DB 107, and can make this determination based on the result of the inquiry. If the client ID of the business operator subject to the contract is determined to be already registered ("Yes" at Step S200), the process shifts to Step S202.

If, instead, the client ID of the business operator subject to the contract is determined to be not registered ("No" at Step S200), the process shifts to Step S201. At Step S201, the service provider registers the client ID for identifying the business operator. For example, the service provider displays the client registration/edit screen 510 illustrated in FIG. 16 on the registration terminal 20, enters pieces of information including the client ID of the business operator into the input region 5104, and operates the "OK" button 5109. This operation registers the pieces of information including the client ID of the business operator in the contract information DB 107.

After the client ID is registered at Step S201, the process shifts to Step S202. At Step S202, the service provider determines whether the business operator subject to the contract incorporates the image search module 4020 into another application program (application). This determination is made according to the contract concluded in advance between the service provider and the business operator. The other application is, for example, an application provided by the business operator.

At Step S202, if the image search module 4020 is determined to be not incorporated into the other application ("Unincorporated" at Step S202), the process shifts to Step S203, and the contract with the business operator subject to the contract is determined to be an ordinary contract. The process shifts to Step S212.

At Step S202 described above, if the image search module 4020 is determined to be incorporated into the other application ("Incorporated" at Step S202), the process shifts to Step S210, and the contract with the business operator subject to the contract is determined to be an exclusive contract. At the next step S211, a determination is made as to whether to use an exclusive DB. If no exclusive DB is determined to be used ("Unused" at Step S211), the service provider specifies the ordinary DBs 111*a* and 111*b* as DBs in which an image is to be registered by the business operator subject to the contract (Step S212).

If, instead, an exclusive DB is determined to used ("Used" at Step S211), the service provider specifies, for the business operator subject to the contract, the DB number of a DB that is to serve as a registration target DB from among the pairs of the exclusive DBs 110*a*$_1$ and 110*b*$_1$, the exclusive DBs 110*a*$_2$ and 110*b*$_2$, . . . (Step S213).

The service provider can set a used DB flag for the campaign according to the results of Steps S212 and S213 described above. As a value of the used DB flag, "Ordinary" is used if Step S212 is executed, or "Exclusive" is used if Step S213 is executed. The used DB flag is not limited to these values. The DB number of a specified DB may be used as the used DB flag.

Search Process According to Embodiments

Figure 28:
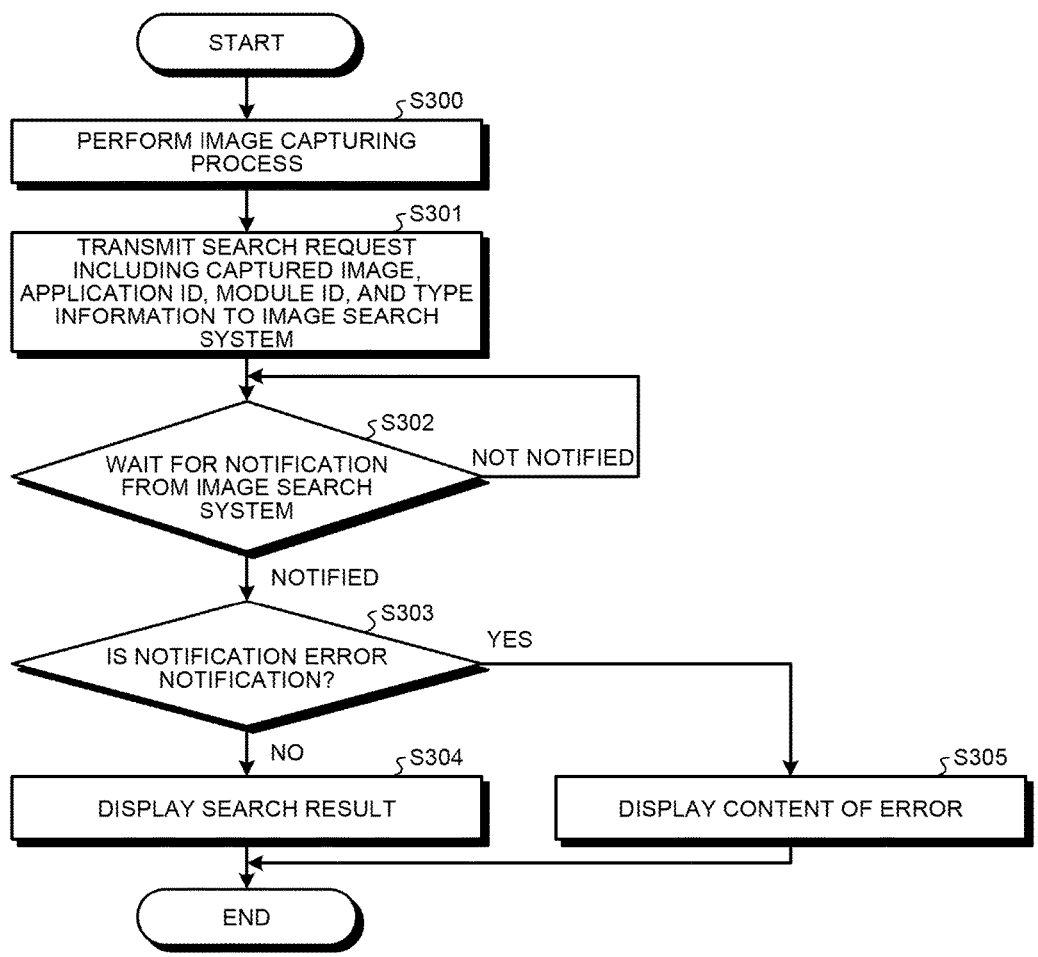
FIG. 28 is a flowchart illustrating an example of a search process executed from the business operator terminal applicable to the embodiments.

The following describes a search process applicable to the embodiments. First, the search process executed from the business operator terminal 40*a* applicable to the embodiments will be described using a flowchart of FIG. 28. At Step S300, the business operator terminal 40*a* performs the image capturing processing in response to the user operation. The captured image is stored, for example, in the storage 406. At the next step S301, the business operator terminal 40*a* transmits, to the image search system 10, a search request including the captured image and including the application ID 4010, the module ID 4021, and the type information 4030 included in the image search application 4001'. This search request is received by the management server 101 in the image search system 10.

At the next step S302, the business operator terminal 40*a* waits for a notification from the image search system 10. If no notification is received ("Not notified" at Step S302), the process of Step S302 is repeated. If the notification is received from the image search system 10 ("Notified" at Step S302), the business operator terminal 40*a* shifts the process to Step S303 to determine whether the received notification is an error notification. If the received notification is determined to be not an error notification ("No" at Step S303), the business operator terminal 40*a* shifts the process to Step S304 to display the search result. If, instead, the received notification is determined to be an error notification ("Yes" at Step S303), the business operator terminal 40*a* shifts the process to Step S305 to display the content of the error.

When the processing at Step S304 or Step S305 ends, the sequence of search processing performed by the business operator terminal 40*a* ends.

The following describes processing related to the search performed by the management server 101 according to embodiments, using a flowchart of FIG. 29, FIGS. 30A and 30B, FIGS. 31A and 31B, and FIGS. 32A and 32B. In FIGS. 30A, 31A, and 32A, the same reference numerals are assigned to components common to those in FIG. 11 explained above, and detailed description thereof will be omitted. In FIGS. 30B, 31B, and 32B, the same reference numerals are assigned to components common to those in FIG. 18 explained above, and detailed description thereof will be omitted.

Figure 29:
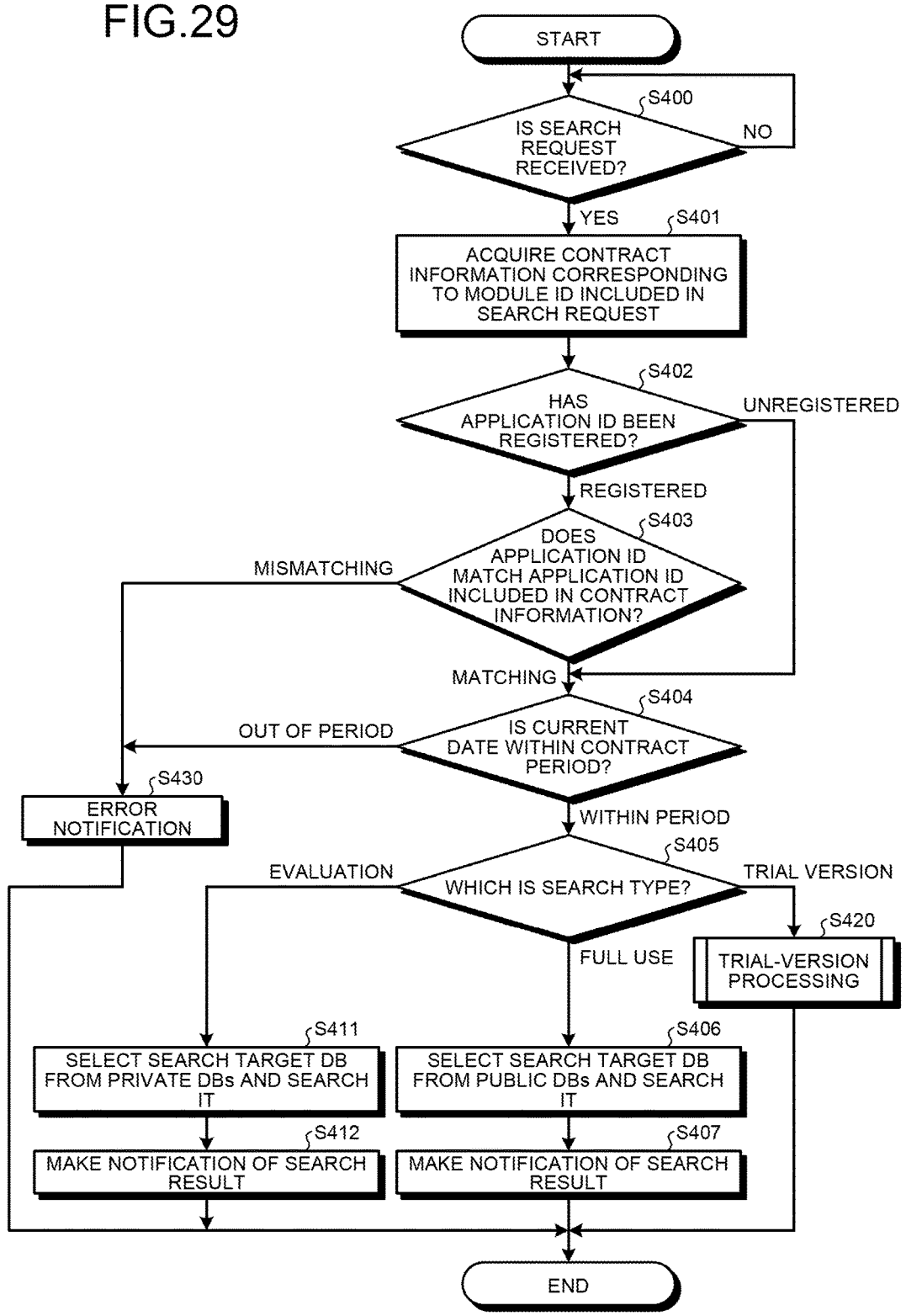
FIG. 29 is an exemplary flowchart illustrating a process for search by the management server according to the embodiments.

In FIG. 29, at Step S400, the management server 101 determines whether the search request is received from the business operator terminal 40*a*. If the search request is determined to be not received ("No" at Step S400), the management server 101 repeats the process of Step S400. If, instead, the search request is determined to be received from the business operator terminal 40*a* ("Yes" at Step. S400), the management server 101 shifts the process to Step S401.

At Step S401, the management server 101 acquires the contract information corresponding to the module ID included in the received search request from the contract information DB 107. At the next step S402, the management server 101 determines whether the application ID 4010 has been registered in the contract information. If the application ID 4010 is determined to be not registered in the contract information ("Unregistered" at Step S402), the management server 101 shifts the process to Step S404. If the application ID 4010 is determined to be registered in the contract information ("Registered" at Step S402), the management server 101 shifts the process to Step S403.

FIGS. 30A and 30B illustrate examples in which the application ID 4010 is registered in the contract information. FIGS. 30A and 30B illustrate the examples of the image search application 4001' installed on the business operator terminal 40a and the module registration/edit screen 520 on which the module ID 4021 matching the module ID 4021 included in the image search application 4001' is registered. As illustrated in FIG. 30A, the application ID 4010 is given to the image search application 4001' and embedded into the image search application 4001', for example, at the first start-up.

On the other hand, the application ID 4010 is entered into the input region 5208 on the module registration/edit screen 520 illustrated in FIG. 30B. In this case, the application ID 4010 is registered in the contract information. If, instead, the input region 5208 is left blank, the application ID 4010 is not registered in the contract information.

At Step S403, the management server 101 determines whether the application ID 4010 included in the contract information matches the application ID 4010 included in the image search application 4001' installed on the business operator terminal 40a. If the application IDs 4010 are determined to not match ("Mismatching" at Step S403), the management server 101 shifts the process to Step S430 to transmit an error notification that the application IDs do not match, to the business operator terminal 40a.

If, instead, the application IDs 4010 are determined to match at Step S403 ("Matching" at Step S403), the management server 101 shifts the process to Step S404.

At Step S404, the management server 101 determines whether the current date is within the contract period based on the start date of use and the end date of use included in the contract information acquired at Step S401. If the current date is determined to be out of the contract period ("Out of period" at Step S404), the management server 101 shifts the process to Step S430 to transmit an error notification that the current date is out of the contract period, to the business operator terminal 40a.

If, instead, the current date is determined to be within the contract period at Step S404 ("Within period" at Step S404), the management server 101 shifts the process to Step S405. At Step S405, the management server 101 determines the search type based on the contract type included in the contract information acquired at Step S401 and the type information 4030 included in the search request received from the business operator terminal 40a.

The search type is classified based on the contract type and the type information in the following manner. First, regarding the contract type, if the contract type is the "evaluation contract" type, images can be registered in the image search system 10, but the disclosure processing is not allowed. Consequently, only the private DBs serve as search targets in the case of the evaluation contract. In contrast, if the contract type is the "formal contract" type, images can be registered in the image search system 10, and moreover, the disclosure/non-disclosure processing is allowed. Consequently, the private DBs and the public DBs serve as the search targets in the case of the formal contract.

Regarding next the type information 4030, the type information 4030 indicates the two types, that is, the "trial version" type and the "full-use version" type, as described above. The "trial version" and the "full-use version" are effective when the contract type is the formal contract. If the contract type is the full-use version type and the type information 4030 indicates the "trial version", a trial-version process (to be described later) is performed. In the trial-version process, the private DBs or DBs copied from the public DBs serve as the search targets. If the contract type is the full-use version type and the type information 4030 indicates the "full-use version", the public DBs serve as the search targets.

From the above, at Step S405, the following three types of determinations are made: (1) the contract type is the formal contract type, and the type information 4030 indicates the "full-use version"; (2) the contract type is the evaluation contract type; and (3) the contract type is the formal contract type, and the type information 4030 indicates the "trial version".

At Step S405, if the management server 101 determines from the determination conditions described above that (1) the contract type is the formal contract type, and the type information 4030 indicates the "full-use version" ("Full use" at Step S405), the management server 101 shifts the process to Step S406. At Step S406, the management server 101 sets a public DB as a search target of the business operator terminal 40a that has transmitted the search request, and switches the switch units 121 and 120b so as to select the search target DB from among the ordinary DB 111b and the exclusive DBs $110b_1$, $110b_2$, . . . based on the contract information corresponding to the module ID 4021 included in the search request. The search server 100 performs the image search in the selected search target DB. The search request may be transferred from the management server 101 to the search server 100, or may have been held in, for example, the switch unit 121.

For example, as illustrated in FIGS. 31A and 31B, if "Formal contract" is entered into the input region 5202 on the module registration/edit screen 520 of FIG. 31B, a public DB is set as a search target of the image search application 4001' illustrated in FIG. 31A that includes the module ID 4021 matching the module ID 4021 entered into the input region 5201. In the setting example of FIG. 31B, "Exclusive" is entered into the input region 5205, and the DB number "SP002" is specified in the input region 5206, so that the management server 101 selects, as the search target DB, a DB having the DB number "SP002" from among the exclusive DBs $110b_1$, $110b_2$, . . . .

At the next step S407, the search server 100 notifies the business operator terminal 40a that has transmitted the search request of the search result.

At Step S405, if the management server 101 determines from the determination conditions described above that (2) the contract type is the evaluation contract type ("Evaluation" at Step S405), the management server 101 shifts the process to Step S411. At Step S411, the management server 101 sets a private DB as the search target of the business operator terminal 40a that has transmitted the search request, and switches the switch units 121 and 121a so as to select the search target DB from among the ordinary DB 111a and the exclusive DBs $110a_1$, $110a_2$, . . . based on the contract information corresponding to the module ID 4021 included in the search request. The registration server 104 performs the image search in the selected search target DB. The search request may be transferred from the management server 101 to the registration server 104, or may have been held in, for example, the switch unit 121.

For example, as illustrated in FIGS. 32A and 32B, if "Evaluation contract" is entered into the input region 5202 on the module registration/edit screen 520 of FIG. 32B, a private DB is set as the search target of the image search application 4001' illustrated in FIG. 32A that includes the module ID 4021 matching the module ID 4021 entered into the input region 5201. In the setting example of FIG. 32B, "Exclusive" is entered into the input region 5205, and the DB number "SP002" is specified in the input region 5206, so that the management server 101 selects, as the search target DB, a DB having the DB number "SP002" from among the exclusive DBs $110a_1$, $110a_2$, . . . .

At the next step S412, the registration server 104 notifies the business operator terminal 40a that has transmitted the search request of the search result.

At Step S405, if the management server 101 determines from the determination conditions described above that (3) the contract type is the formal contract type, and the type information 4030 indicates the "trial version" ("Trial version" at Step S405), the management server 101 shifts the process to Step S420 to perform a trial-version process according to the embodiments (to be described later).

When the above-described processing at Step S407, Step S412, Step S420, or Step S430 is completed, the sequence of processes according to the flowchart of FIG. 29 ends.

If, at Step S401, the contract information corresponding to the module ID 4021 has failed to be acquired from the contract information DB 107, the ordinary DB 111a or the ordinary DB 111b can be set as the search target DB. For example, if the contract information corresponding to the module ID 4021 has failed to be acquired, it is conceivable to set the private ordinary DB 111a as the search target DB if the type information indicates the "trial version", or to set the public ordinary DB 111b as the search target DB if the type information indicates the "full-use version".

First Example of "Trial-Version" Process According to Embodiments

The following describes a first example of the trial-version process of Step S420 in the flowchart of FIG. 29 explained above. In this first example, an image to be registered in the image search system 10 can be checked whether being correctly found, before the image is disclosed in the image search system 10.

In the first example of the trial-version process, a DB serving as a DB for check is generated that approximates a state in which a checking target image (called a trial image) to be checked whether being correctly found is registered in a public DB. This DB for check is searched for an image based on the similarity to the trial image, and a determination is made as to whether the trial image is correctly found after being registered in the public DB.

In this first example of the trial-version process, the generation unit 1105 generates the DB for check described above in the management server 101 explained using FIG. 6. Specifically, in the first example of the trial-version process, the generation unit 1105 generates the DB for check by copying the image search DB 11 included in the search server 100. That is, in this first example, the management server 101 uses, as the DB for check, the DB generated by being copied from the image search DB 11 by the generation unit 1105, and requests the registration server 104 to register the trial image in the DB for check.

Figure 33:
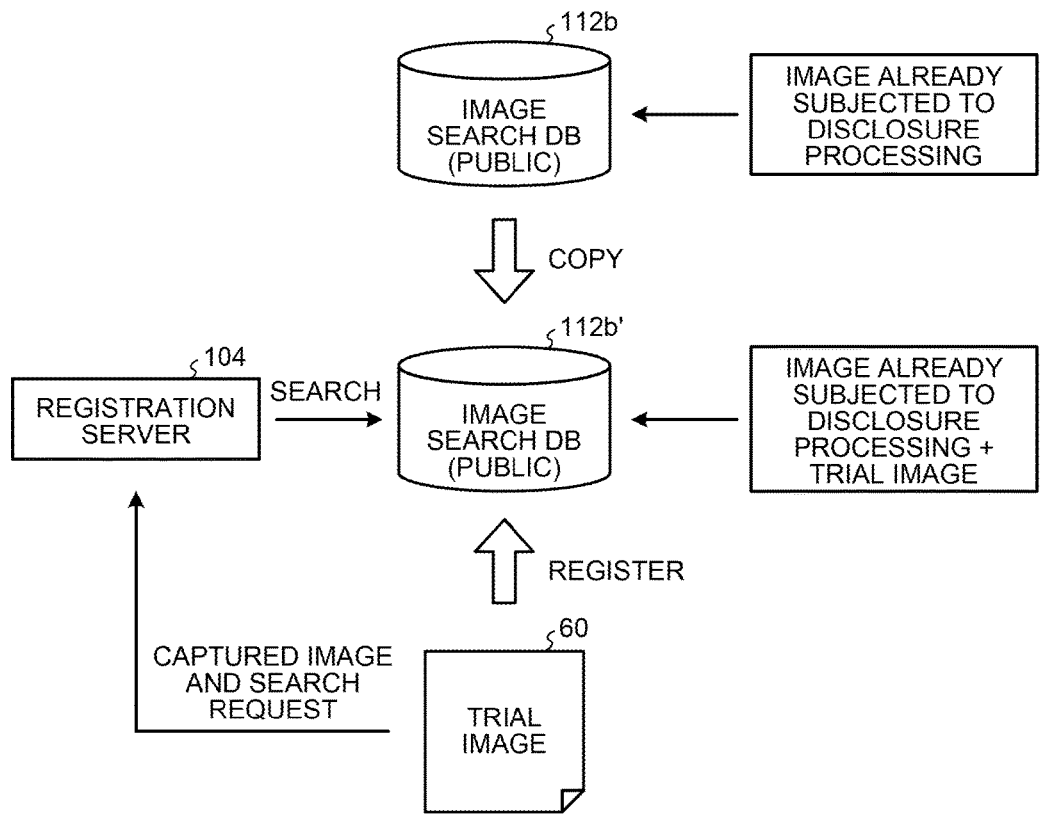
FIG. 33 is a diagram for explaining processing in a first example of a trial-version process according to the embodiments.

The processing in the first example of the trial-version process will be brief described using FIG. 33. In FIG. 33, the same reference numerals are assigned to components corresponding to those in FIG. 3 explained above, and detailed description thereof will be omitted.

In FIG. 33, an image that has been subjected to the disclosure processing is registered in the image search DB 112b, as described above. In the trial-version process at Step S420 of FIG. 29, the management server 101 copies the image search DB 112b to generate an image search DB 112b', for example, by controlling the search server 100, and request the registration server 104 to register a trial image 60 in the image search DB 112b' so as to generate the DB for check. Consequently, the image that has been subjected to the disclosure processing and the trial image 60 have been registered in the image search DB 112b' as the DB for check. The image search DB 112b' is treated as a private DB, and is configured so as not to accept any search made by the general user from the search terminal 30.

In response to the search request based on a captured image obtained by capturing the trial image 60, the registration server 104 searches the image search DB 112b' serving as the DB for check for an image similar to the captured image. In this manner, in a first embodiment, the DB for check is generated by registering the trial image 60 in the image search DB 112b' copied from the actually disclosed image search DB 112b, and this DB for check is searched for the similar image based on the trial image 60. As a result, the check can be accurately made as to whether the search is correctly performed based on the trial image 60 before the trial image 60 is disclosed.

In the description above, the search of the DB for check is performed using the captured image obtained by capturing the trial image 60. However, the search of the DB for check is not limited to this example. The search of the DB for check may be performed, for example, by directly using the trial image 60.

Figure 34:
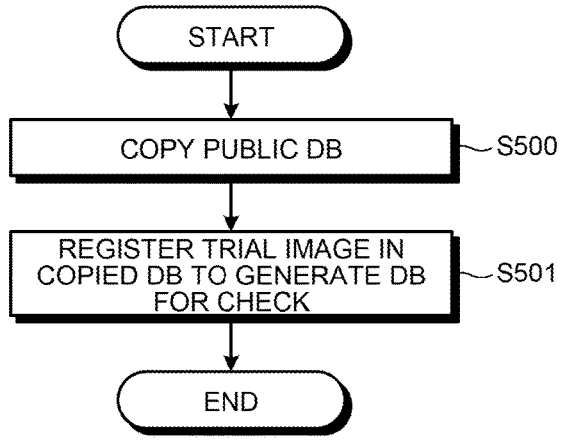
FIG. 34 is an exemplary flowchart illustrating processing of the management server according to the first example of the trial-version process.
Figure 35:
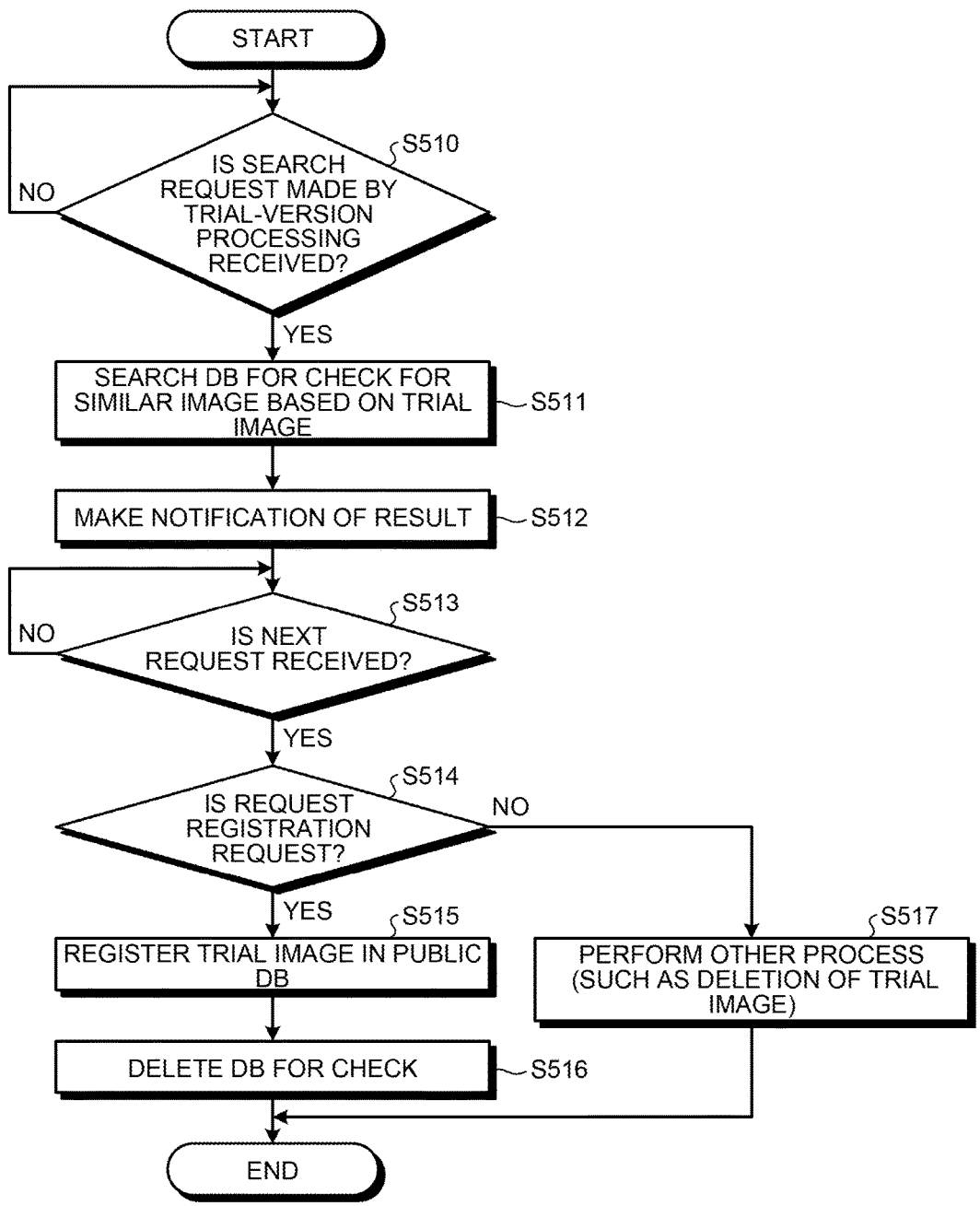
FIG. 35 is another exemplary flowchart illustrating the processing of the management server according to the first example of the trial-version process.

The processing of the management server 101 according to the first example of the trial-version process will be more specifically described using flowcharts of FIGS. 34 and 35. FIG. 34 is a flowchart illustrating an example of preprocessing for the trial-version process in the management server 101.

Prior to this process according to the flowchart of FIG. 34, for example, the business operator 43a prepares the trial image 60, and transmits the prepared trial image 60 to the management server 101 to notify the management server 101 to perform the trial-version process. The business operator 43a uses, for example, the registration terminal 20 to transmit the trial image 60 to the management server 101.

After receiving the trial image 60 from the business operator 43a, the management server 101 copies the image search DB 112b serving as a public DB so as to generate the image search DB 112b' at Step S500 in the flowchart of FIG. 34.

As described above, the image search DB 112b includes the ordinary DB 111b and the exclusive DBs $110b_1$, $110b_2$, . . . . The management server 101 selects a DB specified by the business operator 43a from among the ordinary DB 111b and the exclusive DBs $110b_1$, $110b_2$, . . . included in the image search DB 112b, and copies the specified DB. In the following description, unless otherwise stated, the image search DB 112b will be mentioned as a representative of the DB specified by the business operator 43a among the ordinary DB 111b and the exclusive DBs $110b_1$, $110b_2$, . . . . The same applies to the image search DB 112b'.

At the next step S501, the management server 101 requests the registration server 104 to register the trial image 60 transmitted from the business operator 43a in the copied image search DB 112b'. In response to this request, the registration server 104 registers the trial image 60 in the image search DB 112b' so that the image search DB 112b' set to be the DB for check, and thus the DB for check is generated.

The processing according to the flowchart of FIG. 35 is performed in the management server 101 after the DB for check is generated by the processing of the flowchart of FIG. 34 described above. At Step S510, the management server 101 determines whether a search request made by the trial-version process is received from the business operator terminal 40a operated by the business operator 43a who has registered the trial image 60.

For example, the business operator 43*a* creates a print medium on which the trial image 60 is printed. The business operator 43*a* uses the business operator terminal 40*a* to image the print medium on which this trial image 60 is printed, and transmits the search request including the captured image including the image of the print medium, the module ID 4021, and the type information 4030 from the business operator terminal 40*a* to the management server 101.

If, at Step S510, the search request is determined to be not received from the business operator terminal 40*a* ("No" at Step S510), the management server 101 repeats the process of Step S510. If, instead, the search request is received from the business operator terminal 40*a*, the management server 101 determines, based on the module ID 4021 and the type information 4030 included in the received search request, whether the search request is a search request made by the trial-version process. If the search request is determined to be a search request made by the trial-version process ("Yes" at Step S510), the management server 101 shifts the process to Step S511.

For example, the management server 101 acquires, from the contract information DB 107, a contract type corresponding to the module ID 4021 included in the search request received from the business operator terminal 40*a*. As described above, if the acquired contract type is the formal contract type and the type information 4030 included in the search request indicates the "trial version", the management server 101 determines that the search request is a search request made by the trial-version process.

If the contract type is not the formal contract type, or if the type information 4030 does not indicate the "trial version", the management server 101 determines that the search process is not a search request made by the trial-version process. In this case, for example, the processing at Step S406 or Step S411 in the flowchart of FIG. 29 can be performed according to the contract type.

At Step S511, the management server 101 requests the registration server 104 to search the DB for check generated at Step S501 of FIG. 34 for a similar image based on the trial image 60. More specifically, the management server 101 requests the registration server 104 to search the DB for check for an image similar to the captured-image that has been obtained by imaging the print medium on which the trial image 60 is printed and that is included in the received search request. The registration server 104 transfers the result of the image search at Step S511 to the management server 101. The management server 101 transmits the result of the image search to the business operator terminal 40*a* that is the transmission source of the search request so as to make notification of the search result (Step S512).

After transmitting the notification of the search result at Step S512, the management server 101 shifts the process to Step S513. At Step S513, the management server 101 determines whether the next request is received from the business operator terminal 40*a*, and if the next request is determined to be not present ("No" at Step S513), repeats the process of Step S513. If, instead, the next request is determined to be received from the business operator terminal 40*a* ("Yes" at Step S513), the management server 101 shifts the process to Step S514.

At Step S514, the management server 101 determines whether the request received from the business operator terminal 40*a* is a registration request, and if the received request is determined to be a registration request ("Yes" at Step S514), shifts the process to Step S515. At Step S515, the management server 101 requests the registration server 104 to register the trial image 60 in the image search DB 112*b* serving as a public DB. In response to this request, the registration server 104 registers the trial image 60 in the image search DB 112*b*.

At the next step S516, the management server 101 deletes the DB for check (that is, the image search DB 112*b*') generated at Step S501 of the flowchart of FIG. 34.

If, instead, the request received at Step S514 is determined to be not a registration request ("No" at Step S514), the management server 101 shifts the process to Step S517 to perform processing other than the processing of registering the trial image 60. For example, the management server 101 requests the registration server 104 to delete the trial image 60 registered in the copied image search DB 112*b*' at Step S501 of FIG. 34 from the image search DB 112*b*'.

When the processing at Step S516 or Step S517 is completed, the sequence of processes according to the flowchart of FIG. 35 ends.

Second Example of "Trial-Version" Process According to Embodiments

The following describes a second example of the trial-version process of Step S420 in the flowchart of FIG. 29 explained above. In this second example, in the same manner as in the first example described above, regarding the trial-version process of Step S420 in the flowchart of FIG. 29 described above, an image to be registered in the image search system 10 can be checked whether being correctly found, before the image is disclosed in the image search system 10.

In the second example of the trial-version process, the trial image 60 is registered in a private DB. The private DB with the trial image 60 registered therein is regarded as a DB that approximates a state in which the trial image 60 is registered in a public DB, and is used as a DB for check to perform the similarity search based on the trial image 60.

Figure 36:
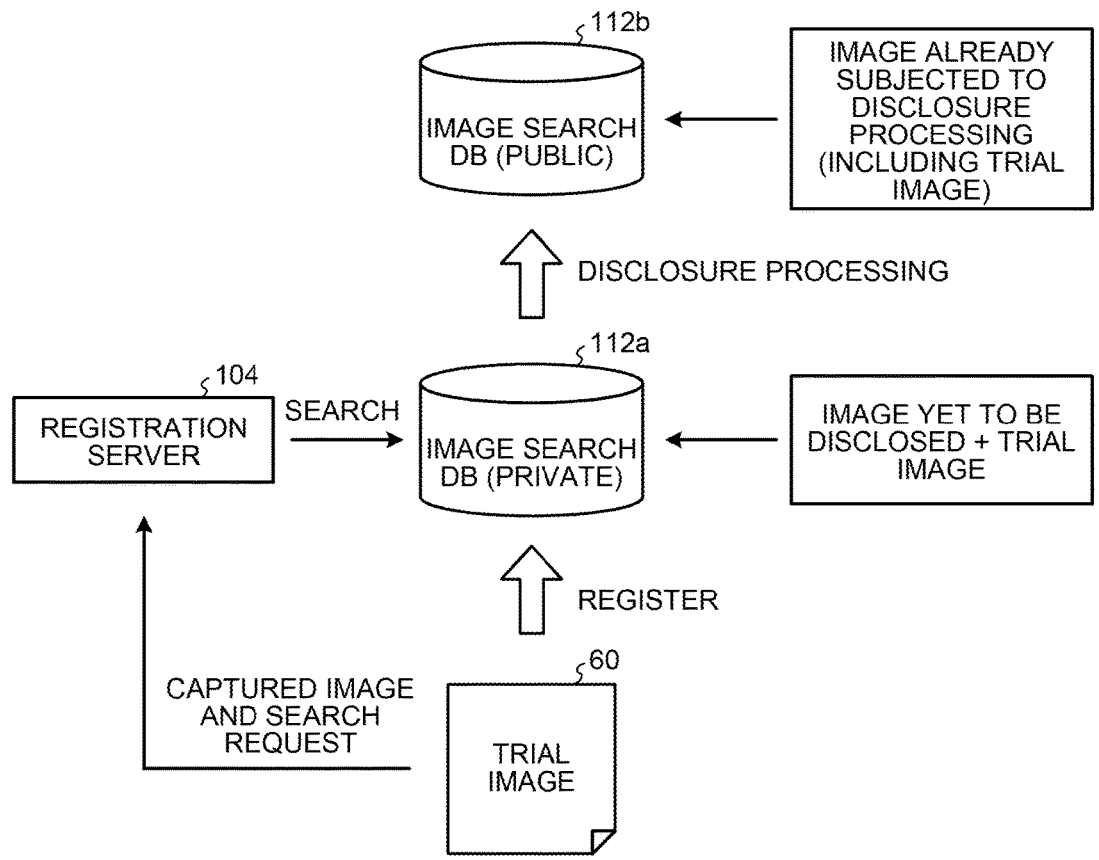
FIG. 36 is a diagram for explaining processing in a second example of the trial-version process according to the embodiments.

The processing in the second example of the trial-version process will be brief described using FIG. 36. In FIG. 36, the same reference numerals are assigned to components corresponding to those in FIG. 3 explained above, and detailed description thereof will be omitted. The configuration of the management server 101 explained using FIG. 6 is also applicable to this second example. In this case, the function of the generation unit 1105 differs from that of the first example in that the DB for check is generated by copying the public DB and registering the trial image 60 in the copied DB in the first example described above, whereas the DB for check is generated by registering the trial image 60 in the private DB in this second example.

In FIG. 36, as described above, the image search DB 112*a* is a private DB, and prohibits any search for registered images from the search terminal 30 by the general user. Disclosure flags are set for the images registered in the image search DB 112*a* on a campaign-by-campaign basis. An image with the value of a disclosure flag set to "Public" is moved to the image search DB 112*b* serving as a pubic DB at predetermined timing.

Also in this description, the image search DB 112*b* is mentioned as a representative of the DB specified by the business operator 43*a* among the ordinary DB 111*b* and the exclusive DBs 110*b*$_1$, 110*b*$_2$, . . . , in the same manner as described above. The same applies to the image search DB 112*a*.

In a second embodiment, the management server 101 controls the registration server 104 to generate the DB for check. More specifically, the management server 101 requests the registration server 104 to register the trial image 60 in the private image search DB 112a so as to generate the DB for check. In response to the search request based on a captured image obtained by capturing the trial image 60, the registration server 104 searches the image search DB 112a serving as the DB for check for an image similar to the captured image.

Figure 37:
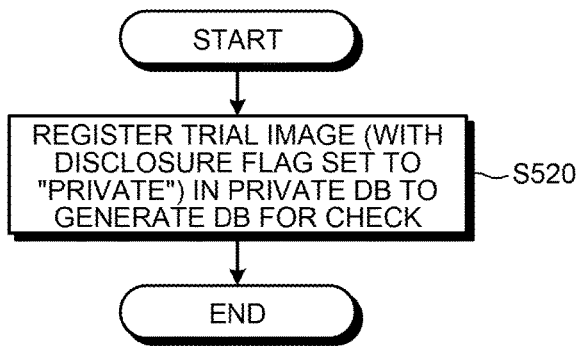
FIG. 37 is an exemplary flowchart illustrating processing of the management server according to the second example of the trial-version process.
Figure 38:
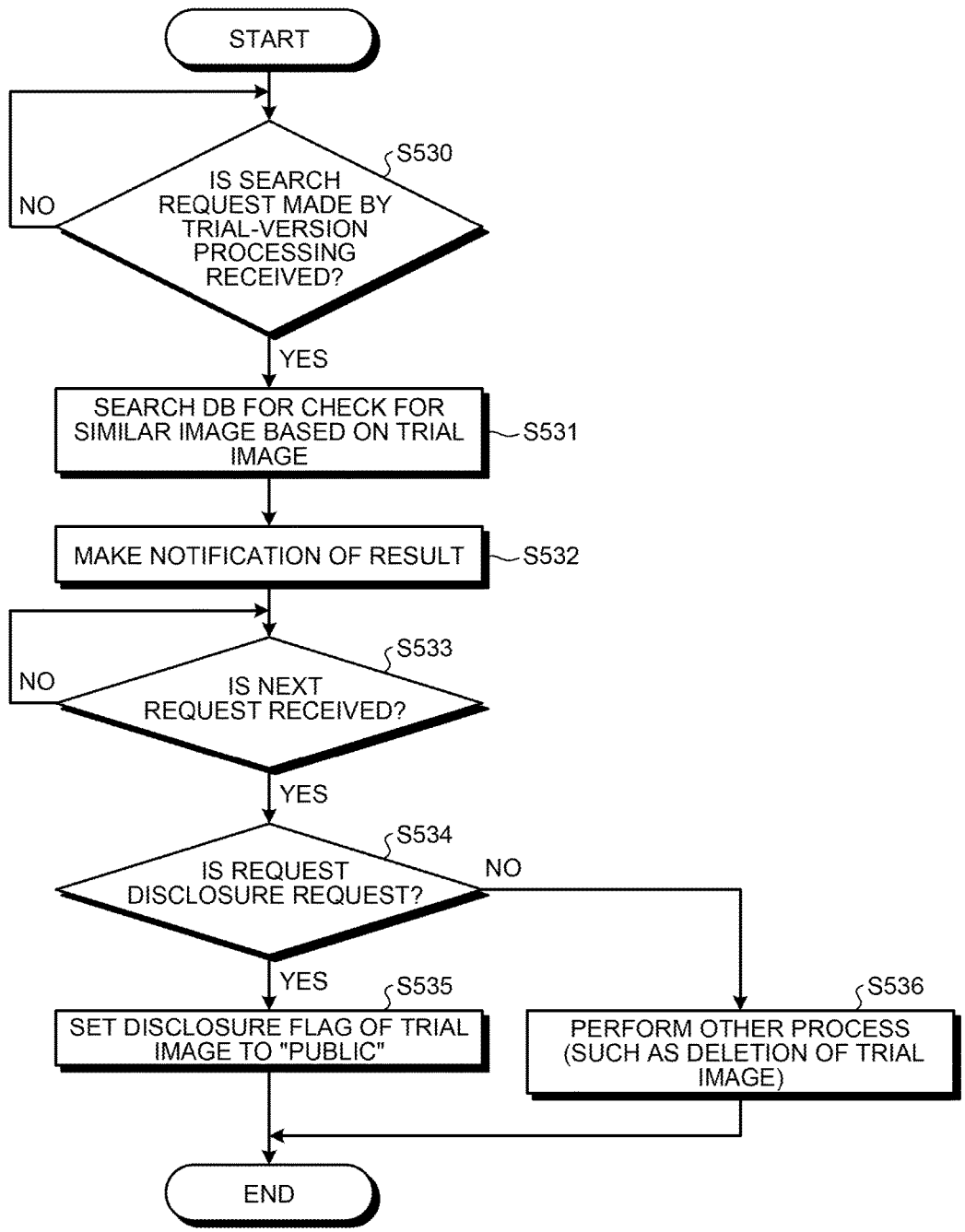
FIG. 38 is another exemplary flowchart illustrating the processing of the management server according to the second example of the trial-version process.

The processing of the management server 101 according to the second example of the trial-version process will be more specifically described using flowcharts of FIGS. 37 and 38. FIG. 37 is a flowchart illustrating an example of preprocessing for the trial-version process in the management server 101.

Prior to this process according to the flowchart of FIG. 37, for example, the business operator 43a prepares the trial image 60, and transmits the prepared trial image 60 to the management server 101 to notify the management server 101 to perform the trial-version process. The business operator 43a uses, for example, the registration terminal 20 to transmit the trial image 60 to the management server 101.

After receiving the trial image 60 from the business operator 43a, the management server 101 sets the value of the disclosure flag of the received trial image 60 to "Private", and requests the registration server 104 to register the trial image 60 in the image search DB 112a serving as a private DB at Step S520 in the flowchart of FIG. 37. In response to this request, the registration server 104 registers the trial image 60 in the image search DB 112a so that the image search DB 112a is set to be the DB for check, and thus the DB for check is generated.

The processing according to the flowchart of FIG. 38 is performed in the management server 101 after the DB for check is generated by the processing of the flowchart of FIG. 37 described above. At Step S530, the management server 101 determines whether a search request made by the trial-version process is received from the business operator terminal 40a operated by the business operator 43a who has registered the trial image 60.

For example, the business operator 43a creates a print medium on which the trial image 60 is printed, and uses the business operator terminal 40a to image the print medium on which this trial image 60 is printed. The business operator 43a transmits the search request including the captured image including the image of the print medium, the module ID 4021, and the type information 4030 from the business operator terminal 40a to the management server 101.

If, at Step S530, the search request is determined to be not received from the business operator terminal 40a ("No" at Step S530), the management server 101 repeats the process of Step S530. If, instead, the search request is received from the business operator terminal 40a, the management server 101 determines, based on the module ID 4021 and the type information 4030 included in the received search request, whether the search request is a search request made by the trial-version process. If the search request is determined to be a search request made by the trial-version process ("Yes" at Step S530), the management server 101 shifts the process to Step S531.

At Step S530, in the same manner as at Step S510 of FIG. 35, the management server 101 acquires, from the contract information DB 107, a contract type corresponding to the module ID 4021 included in the search request received from the business operator terminal 40a, and if the acquired contract type is the formal contract type and the type information 4030 indicates the "trial version", determines that the search request is a search request made by the trial-version process. If the search request is determined to be not a search request made by the trial-version process, the management server 101 can perform, for example, the processing at Step S406 or Step S411 in the flowchart of FIG. 29, according to the contract type.

At Step S531, in the same manner as at Step S511 of FIG. 35, the management server 101 requests the registration server 104 to search the DB for check generated at Step S520 of FIG. 37 for a similar image based on the trial image 60. The registration server 104 transfers the result of the image search at Step S531 to the management server 101. The management server 101 transmits this result of the image search to the business operator terminal 40a that is the transmission source of the search request so as to make notification of the search result (Step S532).

After transmitting the notification of the search result at Step S532, the management server 101 shifts the process to Step S533. At Step S533, the management server 101 determines whether the next request is received from the business operator terminal 40a, and repeats the process of Step S533 if the next request is determined to be not present ("No" at Step S533), or shifts the process to Step S534 if the next request is determined to be received from the business operator terminal 40a ("Yes" at Step S533).

At Step S534, the management server 101 determines whether the request received from the business operator terminal 40a is a disclosure request, and if the received request is determined to be a disclosure request ("Yes" at Step S534), shifts the process to Step S535. At Step S535, the management server 101 sets the disclosure flag of the trial image 60 to "Public" for the registration server 104. By this setting, the trial image 60 is moved at predetermined timing to the image search DB 112b serving as a pubic DB, and becomes searchable from the search terminal 30 by the general user.

If, instead, the request received at Step S534 is determined to be not a disclosure request ("No" at Step S534), the management server 101 shifts the process to Step S536 to perform processing other than the processing of disclosing the trial image 60. For example, the management server 101 requests the registration server 104 to delete the trial image 60 registered in the image search DB 112a at Step S520 of FIG. 37 from the image search DB 112a.

When the processing at Step S535 or Step S536 is completed, the sequence of processes according to the flowchart of FIG. 38 ends.

In this manner, in the second example of the trial-version process, the DB for check is generated by registering the trial image 60 in the image search DB 112a serving as a private DB, and this DB for check is searched for the similar image based on the trial image 60. As a result, the check can be made as to whether the search is correctly performed based on the trial image 60 before the trial image 60 is disclosed.

In the second example of the trial-version process, although the image search DB 112a is not exactly the same as the image search DB 112b serving as a public DB, the search can be checked in an approximate manner. In the first example of the trial-version process described above, the public DB needs to be copied for each trial image 60. In contrast, in the second example, the trial image 60 is registered in the (private) DB before being disclosed, so that the DB before being disclosed is regarded as a public DB with the trial image 60 registered therein. As a result, no DB needs to be newly generated for the trial image 60.

First Example of Similar Image Check According to Embodiments

The following describes a first example of the similar image check according to the embodiments. This first example allows the similar image check to be more accurately performed when Steps S130 and S131 of FIG. 13 described above are executed, and when the button 4888 on the edit screen 480 illustrated in FIG. 22 is operated.

That is, in the configuration described above, if an image is intended to be registered in a DB intended to be disclosed among the DBs (the ordinary DB 111b and the exclusive DBs $110b_1$, $110b_2$, . . . ) included in the image search DB 112b and an image having feature information similar to that of the image to be registered has been registered in the DB, the search server 100 may make erroneous recognition during the image search. Hence, in the case of registering the image from the registration terminal 20 into the registration server 104 using the registration tool 21, a check is preferably made as to whether an image similar to the image has already been registered in the search server 100. According to the check result, for example, the image to be registered is changed on the registration terminal 20.

Figure 39A:
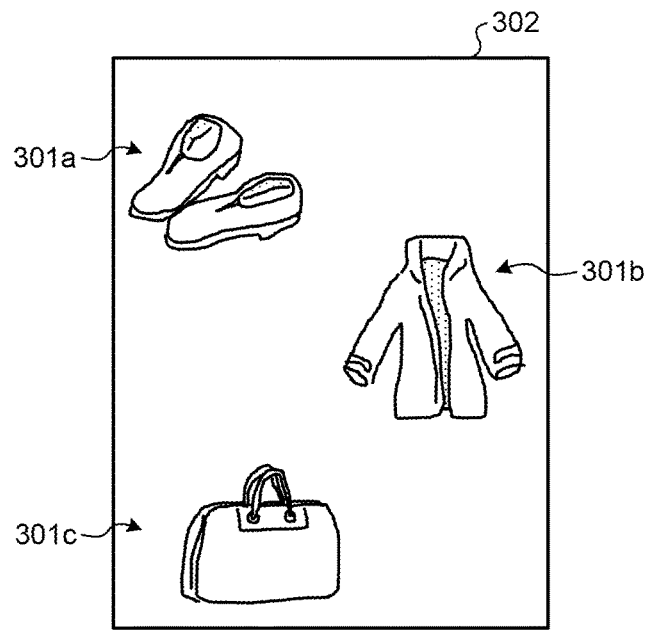
FIG. 39A is a diagram for explaining similar image check using a conventional technique.
Figure 39B:
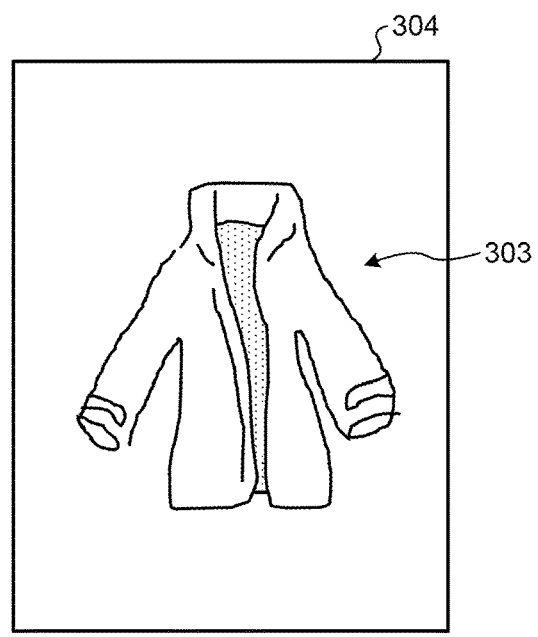
FIG. 39B is another diagram for explaining the similar image check using the conventional technique.

The similar image check using a conventional technique will be brief described using FIGS. 39A and 39B. As an example, consider a case where, for example, the business operator 43a uses the registration tool 21 to register an image 302 including a plurality of objects 301a, 301b, and 301c illustrated in FIG. 39A in the registration server 104, and moves the image 302 to the search server 100 through the disclosure processing. At this time, the search server 100 is assumed to have already registered therein an image 304 including only an object 303 illustrated in FIG. 39B that is highly similar to the object 301b.

In this case, the business operator 43a uses the registration tool 21 to transmit the image 302 from the registration terminal 20 to the search server 100 via the registration server 104, and requests the search server 100 to perform the similar image check for the image 302. The search server 100 returns information indicating the image 304 including the object 303 highly similar to the object 301b included in a partial region in the image 302 transmitted by the registration tool 21, as a search result to the registration terminal 20. Consequently, the business operator 43a can find from the determination result of the registration tool 21 that the image similar to the image 302 has already been registered in the search server 100.

If competitors (such as the business operators 43b, 43c, . . . ) have also registered images in the registration destination DB of the image 302, these images registered by the competitors may be determined to be highly similar to the image 302 intended to be registered by the business operator 43a in the similar image check. In this case, if one of the images registered by the competitors itself, that is, an image based on image data extracted from the feature information is presented as a result of the similar image check, trouble may occur between the business operators.

For that reason, in the conventional technique described above, the result of the similar image check can indicate only the presence or absence of a similar image, and the business operator 43a cannot easily find, for example, which of the objects 301a, 301b, and 301c included in the image 302 is determined to be the similar image present. The first embodiment aims at providing the information processing system that enables accurate execution of the similar image check.

Figure 40:
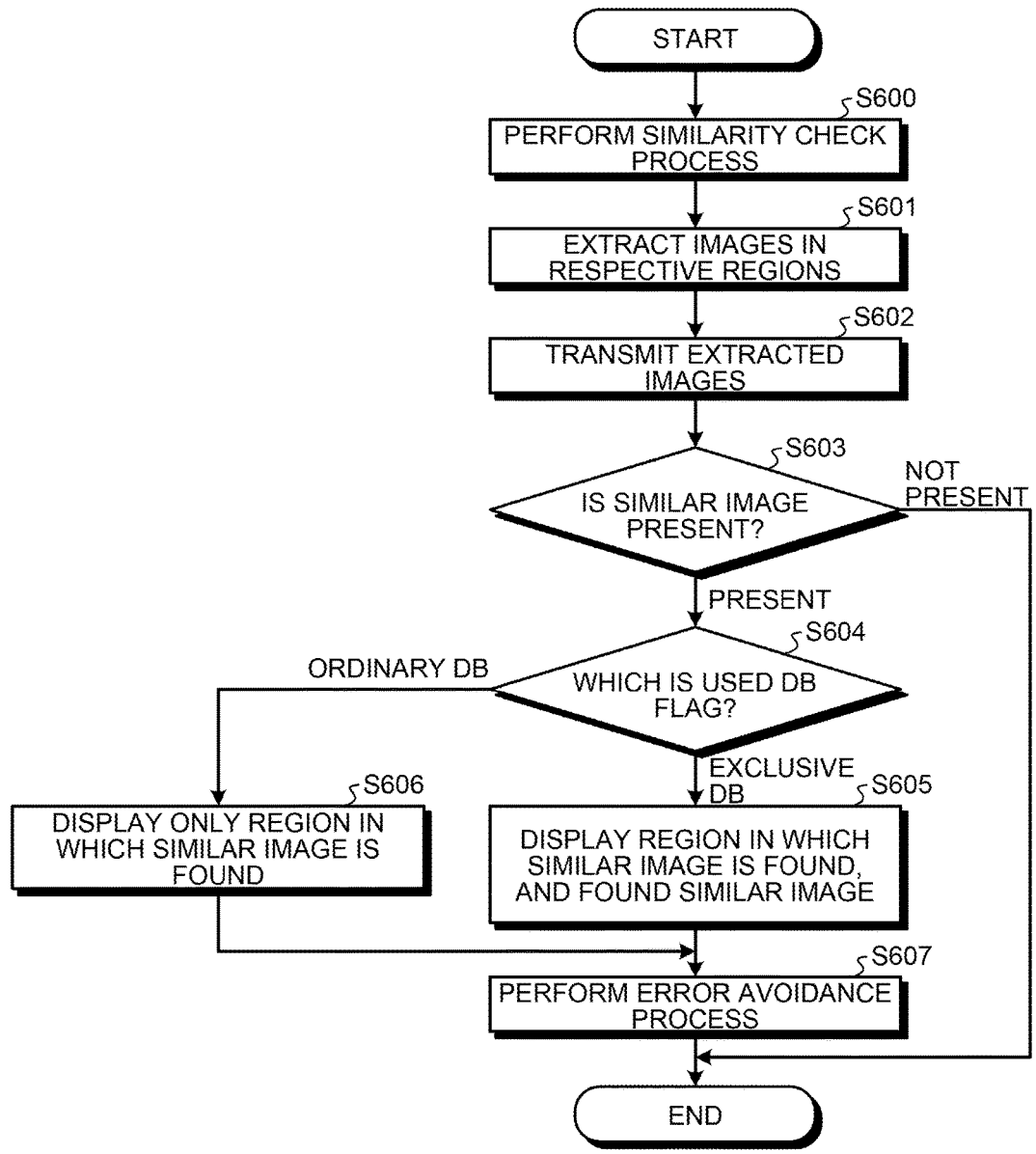
FIG. 40 is an exemplary flowchart illustrating similarity check processing according to a first example of the similar image check according to the embodiments.

FIG. 40 is an exemplary flowchart illustrating similarity check processing according to the first example of the similar image check. This flowchart of FIG. 40 corresponds to the processing at Steps S130 and S131 of FIG. 13 explained above, or to the processing performed when the button 4888 for instructing the similar image check is operated, the button 4888 being provided on the toolbar 488 of the edit screen 480 described using FIG. 22. Each process is performed in the registration tool 21 on the registration terminal 20.

Hereinafter, the business operator 43a is assumed to operate the registration terminal 20 to cause the registration tool 21 to perform the similar image check. That is, the user ID and the password are set after the contract is made with the service provider, and the business operator 43a uses the user ID and the password to log in to the registration tool 21. As described above, the user ID and the password have been registered in the user DB 106 in association with the client ID according to the operation to the client registration/edit screen 510 illustrated in FIG. 16.

At Step S600, the registration tool 21 performs the similarity check processing on a check target image to be subjected to the similarity check. The check target image is an image included in the campaign displayed on the edit screen 480. At the next step S601, the registration tool 21 sets certain regions in the check target image, and extracts images included in the certain regions from the check target image. More specifically, the registration tool 21 divides the check target image, and extracts the images included in the divided segment regions.

Figure 41A:
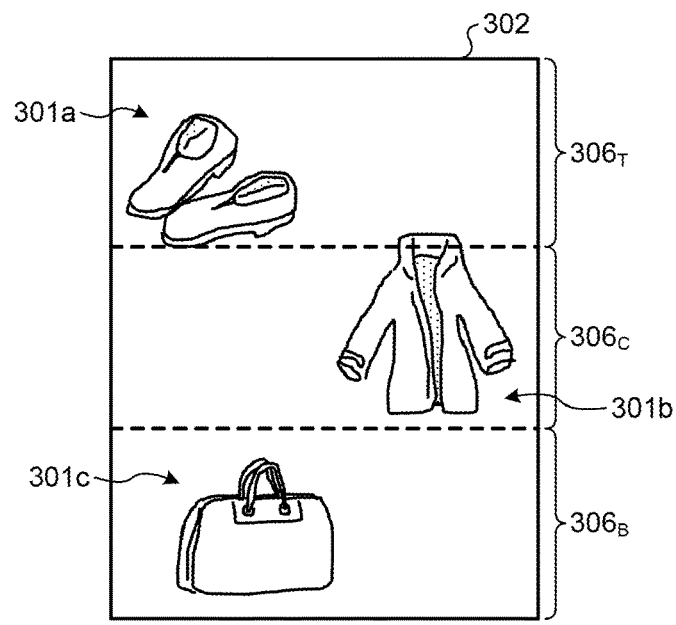
FIG. 41A is a diagram illustrating an example of a method for dividing a check target image according to the first example of the similar image check according to the embodiments.
Figure 41B:
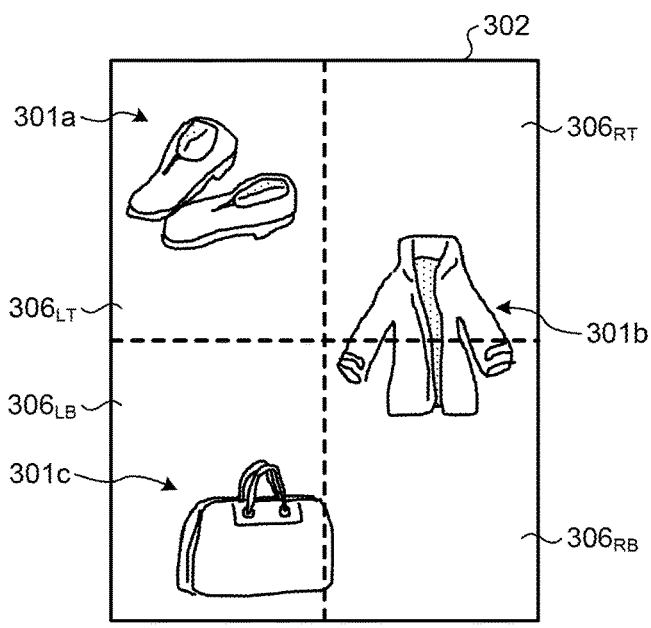
FIG. 41B is a diagram illustrating an example of another method for dividing the check target image according to the first example of the similar image check according to the embodiments.

FIGS. 41A and 41B illustrate examples of methods for dividing the check target image applicable to the first example of the similar image check. The following description assumes that the image 302 illustrated in FIG. 39A is the check target image. FIG. 41A illustrates an example in which the image 302 as the check target is vertically divided into three regions to form segment regions $306_T$, $306_C$, and $306_B$ in the order from the top. FIG. 41B illustrates an example in which the image 302 is divided in a grid-like manner into four regions to form a segment region $306_{LT}$ at the upper left, a segment region $306_{RT}$ at the upper right, a segment region $306_{LB}$ at the lower left, and a segment region $306_{RB}$ at the lower right.

The dividing positions and the number of divisions of the image 302 as the check target are not limited. The registration tool 21 may set the dividing positions to positions specified by user operations, or may set the dividing positions according to the content of the image 302. The dividing positions may naturally be set in a fixed manner, as illustrated in the examples of FIGS. 41A and 41B. The following description assumes that the image 302 is divided in a grid-like manner into four regions, as illustrated in FIG. 41B.

At the next step S602, the registration tool 21 transmits the images of the segment regions $306_{LT}$, $306_{RT}$, $306_{LB}$, and $306_{RB}$ extracted from the image 302 as the check target to the search server 100 via the registration server 104, and requests the search server 100 to search for similar images similar to the respective images.

At this time, the registration tool 21 transmits the campaign information on the campaign including the image 302 as the check target to the management server 101. Based on pieces of information included in the campaign information, the management server 101 selects a DB for searching for the similar images from among the ordinary DB 111b and the exclusive DBs $110b_1$, $110b_2$, . . . included in the search server 100, and switches the switch unit 120b in accordance with the selected DB.

According to the search request from the registration tool 21, the search server 100 performs the search processing for similar images similar to the respective images in these segment regions $306_{LT}$, $306_{RT}$, $306_{LB}$, and $306_{RB}$. That is, the search server 100 uses the analysis unit 12 to extract pieces of feature information from the respective images in the segment regions $306_{LT}$, $306_{RT}$, $306_{LB}$, and $306_{RB}$.

The search unit 13 searches the DB selected by the switch unit 120b from among the ordinary DB 111b and the exclusive DBs $110b_1$, $110b_2$, . . . for feature information similar to the extracted pieces of feature information. The search results are transmitted from the search server 100 to the registration terminal 20, and received by the registration tool 21. At this time, if the similar feature information has been found, the search server 100 acquires image data of the images associated with the feature information from the searched DB, and appends the acquired image data to the search results to transmit the image data to the registration terminal 20.

At Step S603, the registration tool 21 determines, based on the search results returned from the search server 100, whether similar images similar to the respective images in the segment regions $306_{LT}$, $306_{RT}$, $306_{LB}$, and $306_{RB}$ of the image 302 as the check target have been registered in the search server 100.

If the registration tool 21 determines that no images similar to the images in the segment regions $306_{LT}$, $306_{RT}$, $306_{LB}$, and $306_{RB}$ have been registered in the search server 100 ("Not present" at Step S603), the registration tool 21 ends the sequence of processes in the flowchart of FIG. 40. If the processing according to the flowchart of FIG. 40 corresponds to the processing of Step S130 in FIG. 13, the registration tool 21 shifts the process to Step S131. If the processing according to the flowchart has been executed by the operation of the button 4888 on the edit screen 480, the registration tool 21 displays the edit screen 480, for example, after displaying the determination result.

If, at Step S603, the registration tool 21 determines that the similar images have been registered in the search server 100 ("Present" at Step S603), the registration tool 21 shifts the process to Step S604.

Figure 42:
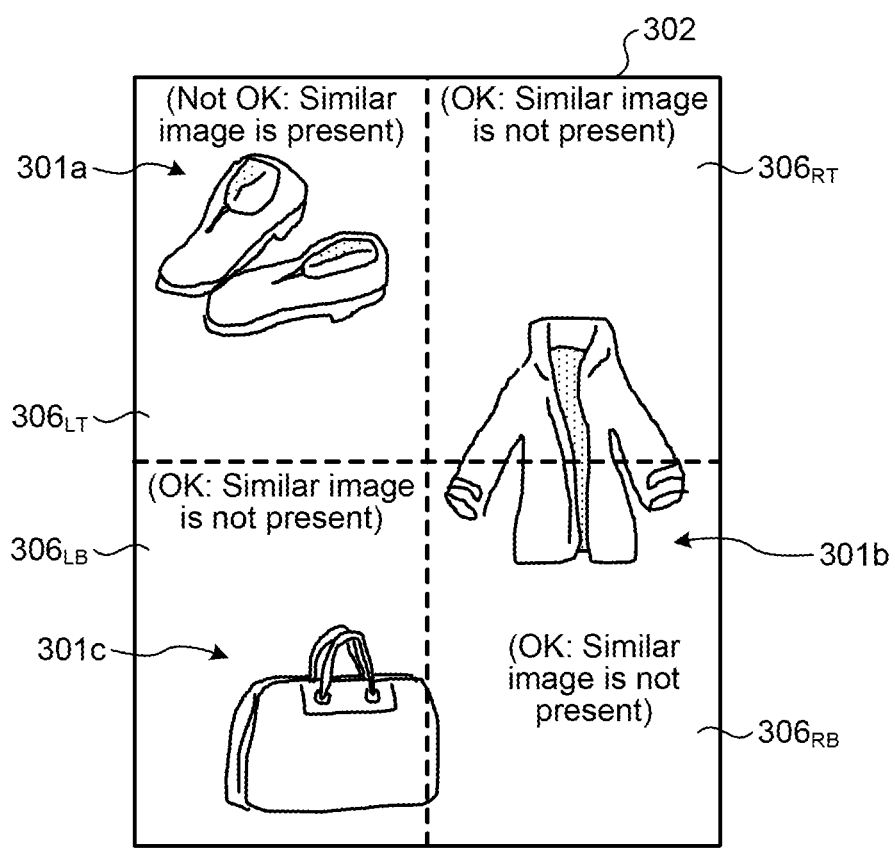
FIG. 42 is a diagram for explaining a method according to the embodiments for outputting a search result based on a changed similarity.

For example, the registration tool 21 is assumed to determine, based on the search results, that a similar image similar to the image in the segment region $306_{LT}$ at the upper left of the image 302 has already been registered in the search server 100 (not OK), as illustrated in FIG. 42. The registration tool 21 is also assumed to determine, using a determining unit 203, that no similar images similar to the respective images in the other segment regions $306_{RT}$, $306_{LB}$, and $306_{RB}$ have been registered in the search server 100 (OK).

At Step S604, the registration tool 21 acquires the used DB flag associated with the campaign including the image 302 as the check target, and determines whether the value of the acquired used DB flag is "Ordinary" or "Exclusive". The registration tool 21 shifts the process to Step S605 if the value of the used DB flag is determined to be "Exclusive" ("Exclusive DB" at Step S604), or shifts the process to Step S606 if the value of the used DB flag is determined to be "Ordinary" ("Ordinary DB" at Step S604). At each of Steps S605 and S606, the registration tool 21 displays, on the registration terminal 20, an error screen indicating that the similar image has already been registered.

The following describes a process according to Step S605 in the case where the value of the used DB flag is "Exclusive". At Step S605, the registration tool 21 displays the region (assumed to be the segment region $306_{LT}$), among the segment regions $306_{LT}$, $306_{RT}$, $306_{LB}$, and $306_{RB}$ of the image 302 as the check target, in which the similar image has been found, and displays the found similar image, on the error screen.

FIGS. 43A and 43B illustrate examples of error screens that are applicable to the first example of the similar image check and are displayed by the registration tool 21 at Step S605. In FIG. 43A, a message display region 321, a region display region 322a, a detected image display region 324, and a "Close" button 325 are arranged on an error screen 320a. In the example of FIG. 43A, the message display region 321 displays a message indicating that an image similar to the image 302 as the check target has already been registered in the search server 100, and that the position in the image 302 where the similar image has been found and the found similar image are displayed.

The region display region 322a displays information indicating a region, among the segment regions $306_{LT}$, $306_{RT}$, $306_{LB}$, and $306_{RB}$ obtained by dividing the image 302 as the check target, for which a similar image similar to an image included therein is determined to have been registered in the search server 100. In the example of FIG. 43A, if an image similar to the image in the segment region $306_{LT}$ at the upper left is found (refer to FIG. 42), a region 323 at the upper left of the region display region 322a is displayed in a highlighted manner (indicated by shading with diagonal lines in FIG. 43A) corresponding to the position of the segment region $306_{LT}$ in the check target image 302.

The detected image display region 324 displays a similar image 330 found from the search server 100. More specifically, the registration tool 21 displays an image based on the image data appended to the search results that have been transmitted from the search server 100 to the registration terminal 20 in response to the transmission of the image at Step S602 described above, that is, based on the image data associated with the feature information found as similar, as the similar image 330 in the detected image display region 324. This makes it easy to find out what kind of the similar image 330 has been found for the check target image 302, and enables more accurate execution of the similar image check.

That is, if the search target DB for the similar image is, for example, the exclusive DB $110b_1$ contracted by the business operator 43a performing the similar image check, images are registered by the business operator 43a, but not registered by other business operators, such as the competing business operators 43b, 43c, . . . in this exclusive DB $110b_1$. Consequently, no problem occurs when the similar image 330 found from the exclusive DB $110b_1$ is displayed to be presented to the business operator 43a.

FIG. 43B illustrates another exemplary error screen displayed by the registration tool 21 at Step S605. An error screen 320b illustrated in FIG. 43B is an example in which the image 302 as the check target is displayed in a region display region 322b corresponding to the region display region 322a described above. The region 323 in which the similar image has been found is also displayed in a highlighted manner in FIG. 43B in the same manner as in FIG. 43A. In this manner, the image 302 as the check target is displayed simultaneously with the region 323 in which the similar image has been found, so that the business operator 43a can easily find out which of the objects 301a, 301b, and 301c included in the check target image 302 has been found to be the similar image, and can more accurately perform the similar image check.

The following describes a process according to Step S606 in the case where the value of the used DB flag is "Ordinary". At Step S606, the registration tool 21 displays the region (assumed to be the segment region $306_{LT}$), among the segment regions $306_{LT}$, $306_{RT}$, $306_{LB}$, and 306 of the check target image 302, in which the similar image has been found. Unlike at Step S605 described above, the found similar image is not displayed.

Figure 44:
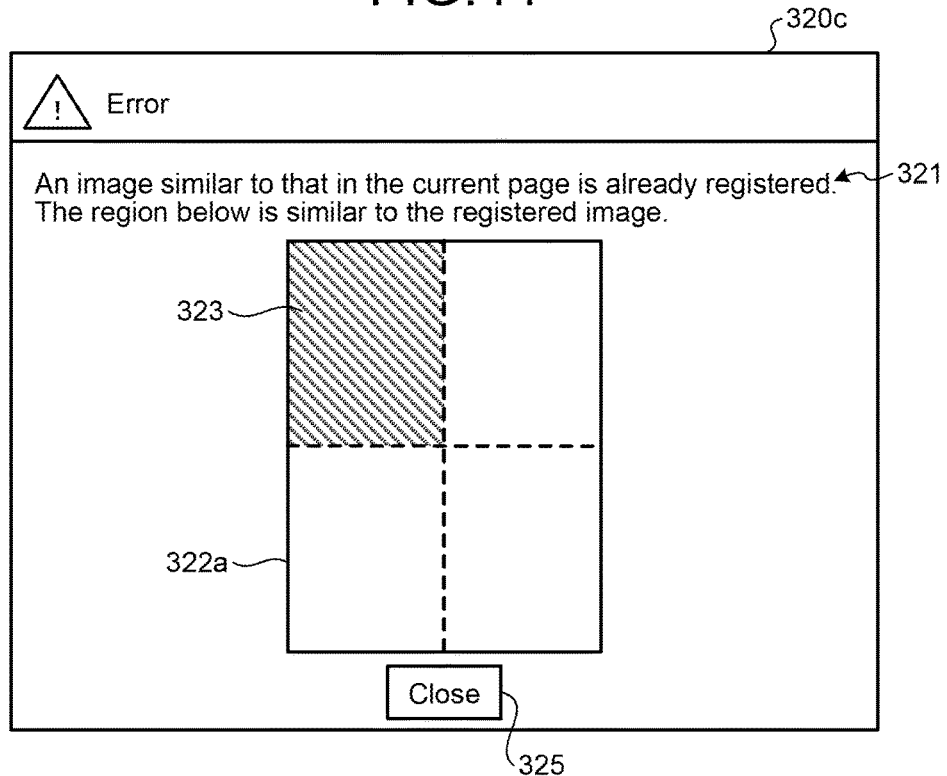
FIG. 44 is a diagram illustrating an example of still another error screen applicable to the first example of the similar image check according to the embodiments.

FIG. 44 illustrates still another exemplary error screen applicable to the first example of the similar image check displayed at Step S606 by the registration tool 21. In FIG. 44, the message display region 321, the region display region 322a, and the "Close" button 325 are arranged on an error screen 320c. In the example of FIG. 44, the message display region 321 displays a message indicating that an image similar to the image 302 as the check target has already been registered in the search server 100, and that the position in the image 302 where the similar image has been found is displayed.

In the same manner as in FIG. 43A, the region display region 322a displays information indicating a region, among the segment regions $306_{LT}$, $306_{RT}$, $306_{LB}$, and $306_{RB}$ obtained by dividing the check target image 302, for which a similar image similar to an image included therein is determined to have been registered in the search server 100. The highlighted display of the region display region 322a and the region 323 is the same as that of FIG. 43A explained above, so that description thereof will be omitted here.

If the search target for the similar image is the ordinary DB 111b, images may have been registered by competitors, such as the business operators 43b, 43c, . . . . Consequently, trouble may occur if the similar image 330 found from the ordinary DB 111b is displayed to be presented to the business operator 43a. For that reason, at Step S606, only the region in which the similar image 330 has been found is indicated, and the similar image 330 is not displayed.

In the example of FIG. 44, the image 302 as the check target can also be displayed in the region display region 322a, in the same manner as in FIG. 43B.

The description refers back to FIG. 40. If the "Close" button 325 is operated on the error screen 320a or 320b at Step S605, or on the error screen 320c at Step S606, the process shifts to Step S607. At Step S607, the registration tool 21 can perform an error avoidance process to avoid any error caused by searching for a similar image according to an operation of the business operator 43a.

Figure 45:
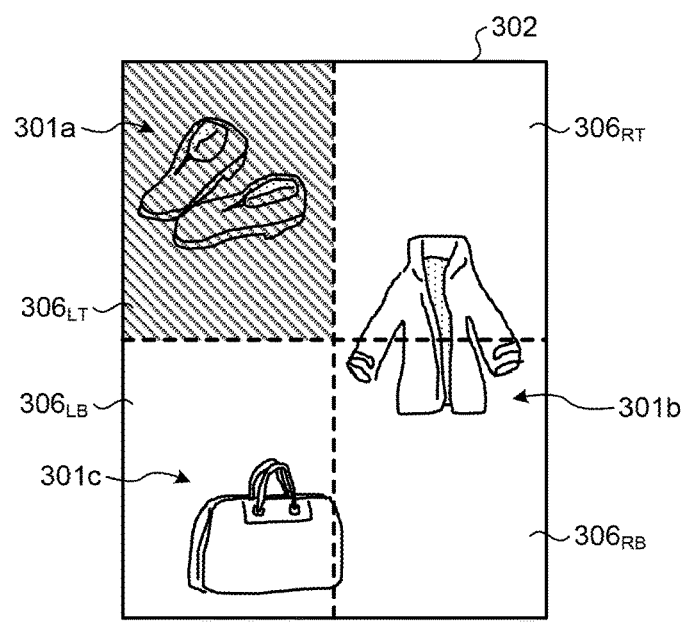
FIG. 45 is a diagram illustrating an example of setting a mask area for an image, the example being applicable to the first example of the similar image check according to the embodiments.

For example, the registration tool 21 tries the error avoidance by setting the mask area for the region of the check target image 302 in which the similar image has been found. FIG. 45 illustrates an example of setting the mask area for the image 302, the example being applicable to the first example of the similar image check. In this example, as indicated by shading with diagonal lines in FIG. 45, the mask area is set at the segment region $306_{LT}$ at the upper left for which the similar image has already been registered in the search server 100. As described above, the button 4885 (refer to FIG. 22) is operated, and thus, the registration tool 21 specifies the segment region $306_{LT}$ in the check target image 302 so as to set the segment region $306_{LT}$ to be the mask area.

If the mask area is set at an image as a search target, the search server 100 extracts the feature information on the image from an area other than this mask area. As a result, if this check target image 302 is registered in the search server 100, this check target image 302 is prevented from being output as a search result even if the image as a search target is an image similar to the image in the mask area. Thus, the accuracy of search for the similar image is improved.

Modification of First Example of Similar Image Check According to Embodiments

Figure 46:
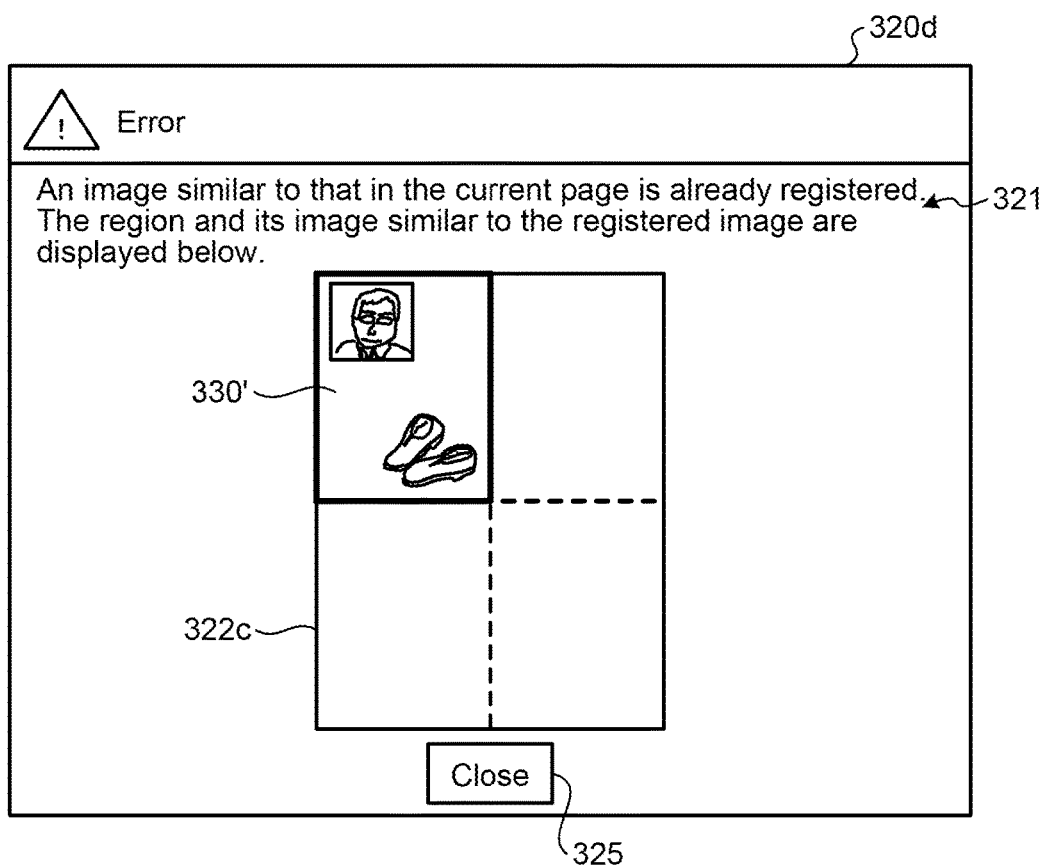
FIG. 46 is a diagram illustrating an example of an error display screen according to a modification of the first example of the similar image check according to the embodiments.

The following describes a modification of the first example of the similar image check according to the embodiments. In the modification of the first example of the similar image check, when the region of the check target image 302 in which the similar image has been found is displayed at Step S605 of the flowchart of FIG. 40 described above, the found similar image 330 is displayed in the region. FIG. 46 illustrates an example of an error display screen according to the modification of the first example of the similar image check. In FIG. 46, the message display region 321, a region display region 322c, and the "Close" button 325 are arranged on an error display screen 320d, in the same manner as on the error display screen 320a of FIG. 43A explained above. The error display screen 320d differs from the error display screen 320a illustrated in FIG. 43A in that the detected image display region 324 is not arranged.

In FIG. 46, the error display screen 320d displays the found similar image 330 in a region in which the similar image has been found in the image 302 as the check target, such as a region corresponding to the segment region $306_{LT}$ at the upper left in FIG. 42, in the region display region 322c. In the example of FIG. 46, the similar image 330 has a larger size than that of the region in which the similar image 330 has been found in the image 302, so that a reduced image 330' obtained by reducing the size of the similar image 330 to that of the region is displayed.

According also to this modification of the first example of the similar image check, the error display screen 320d displays the region in which the similar image 330 has been found in the image 302 as the check target, and also displays the reduced image 330' obtained by reducing the size of the similar image 330. This makes it easy to find out what kind of the similar image 330 has been found for which part of the check target image 302, and enables more accurate execution of the similar image check.

Second Example of Similar Image Check According to Embodiments

The following describes a second example of the similar image check according to the embodiments. In the first example of the similar image check described above, the determination is made based on the used DB flag as to whether the similar image found by the similar image check is displayed on the error display screen indicating that an image similar to the check target image has already been registered. In contrast, in the second example of the similar image check, the determination of whether to display the similar image found by the similar image check on the error display screen is made depending on the DB in which the image used as the subject of check is actually registered.

Figure 47:
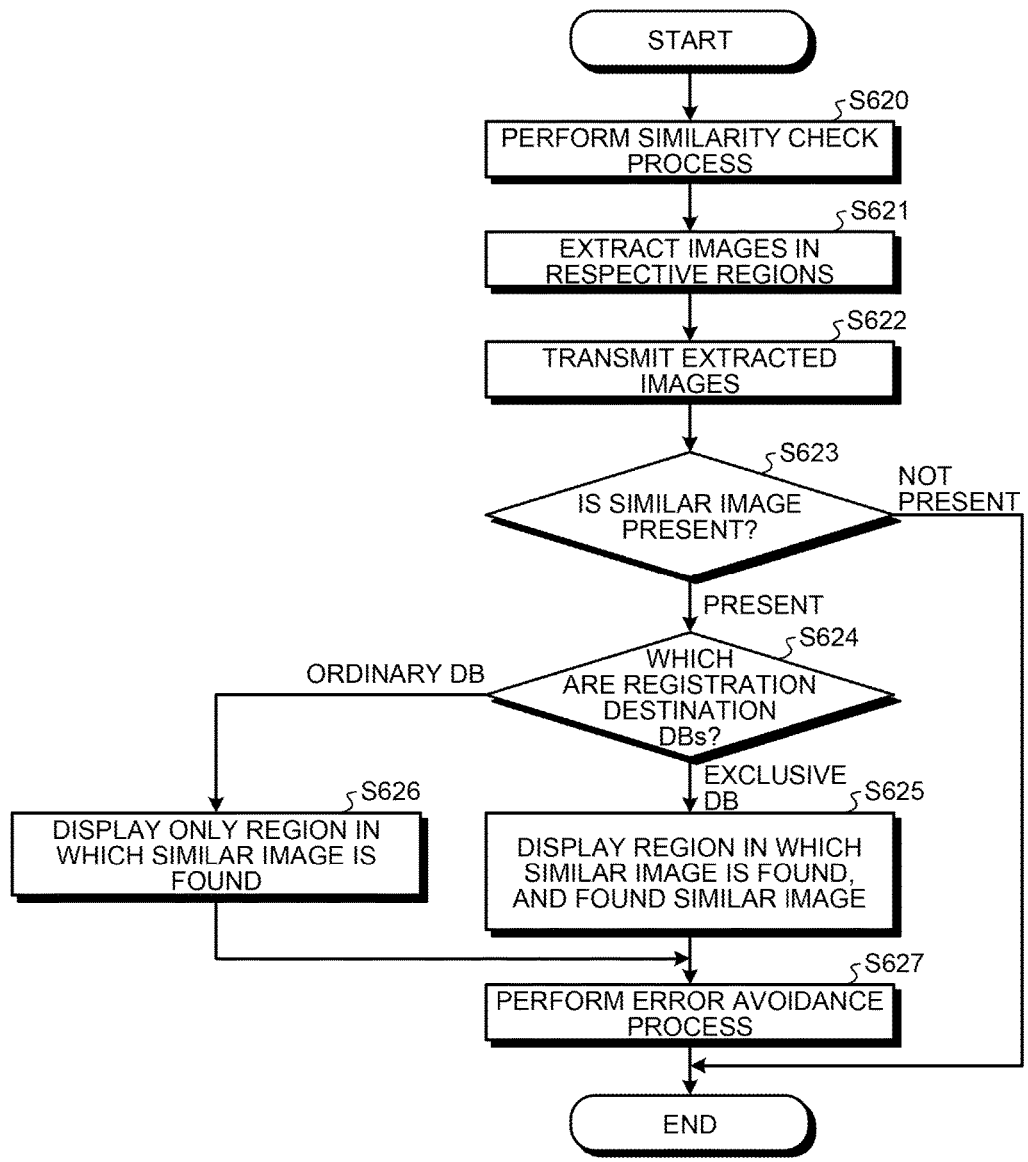
FIG. 47 is an exemplary flowchart illustrating similar image check processing according to a second example of the similar image check according to the embodiments.

FIG. 47 is an exemplary flowchart illustrating similar image check processing according to the second example of the similar image check. In the same manner as the flowchart of FIG. 27 explained above, this flowchart of FIG. 47 corresponds to the processing at Steps S130 and S131 of FIG. 13, or to the processing performed when the button 4888 for instructing the similar image check is operated, the button 4888 being provided on the toolbar 488 of the edit screen 480 described using FIG. 22. Each process is performed in the registration tool 21 on the registration terminal 20. Hereinafter, the business operator 43a is assumed to operate the registration terminal 20 to cause the registration tool 21 to perform the similar image check, in the same manner as described above.

Prior to execution of the process according to the flowchart of FIG. 47, the business operator 43a sets, for example, a campaign on the campaign registration screen 570 of FIG. 21, and enters the module ID 4021 into the input region 5703. A DB number has been specified for the module ID 4021, for example, by the input regions 5205 and 5206 on the module registration/edit screen 520 of FIG. 18. Therefore, by entering the module ID, a setting can be made as to which of the already specified pairs is selected as the registration destination of an image provided by the campaign, from among the pair of the ordinary DBs 111a and 111b (ordinary DBs) and the pairs of the exclusive DBs $110a_1$ and $110b_1$, $110a_2$ and $110b_2$, . . . (exclusive DBs).

At Step S620, the registration tool 21 performs the similarity check processing on a check target image to be subjected to the similarity check. At the next step S621, the registration tool 21 divides the check target image, and extracts images included in the divided segment regions. The following description assumes that the image 302 as the check target is divided in a grid-like manner into four regions, that is, the segment regions $306_{LT}$, $306_{RT}$, $306_{LB}$, and $306_{RB}$, as illustrated in FIG. 41B.

At the next step S622, the registration tool 21 transmits the images of the segment regions $306_{LT}$, $306_{RT}$, $306_{LB}$, and $306_{RB}$ extracted from the image 302 as the check target to the search server 100 via the registration server 104, and requests the search server 100 to search for similar images similar to the respective images.

At this time, the registration tool 21 transmits the campaign information on the campaign including the image 302 as the check target to the management server 101. Based on pieces of information included in the campaign information, the management server 101 selects a DB for searching for the similar images from among the ordinary DB 111b and the exclusive DBs $110b_1$, $110b_2$, . . . included in the search server 100, and switches the switch unit 120b in accordance with the selected DB.

According to the search request from the registration tool 21, the search server 100 performs the search processing for similar images similar to the respective images in these segment regions $306_{LT}$, $306_{RT}$, $306_{LB}$, and $306_{RB}$. The search results are transmitted from the search server 100 to the registration terminal 20, and received by the registration tool 21. At this time, if the similar feature information has been found, the search server 100 acquires image data of the images associated with the feature information from the searched DB, and appends the acquired images to the search results to transmit the images to the registration terminal 20.

At Step S623, the registration tool 21 determines, based on the search results returned from the search server 100, whether similar images similar to the respective images in the segment regions $306_{LT}$, $306_{RT}$, $306_{LB}$, and $306_{RB}$ of the check target image 302 have been registered in the search server 100, as described using FIG. 42. If no similar images are determined to have been registered ("Not present" at Step S623), the sequence of processes in the flowchart of FIG. 47 ends.

If, at Step S623, the registration tool 21 determines that the similar images have been registered in the search server 100 ("Present" at Step S623), the registration tool 21 shifts the process to Step S624. At the next step S624, the registration tool 21 determines which of the ordinary DBs and the exclusive DBs are set to be the registration destination described above. The registration tool 21 shifts the process to Step S625 if the registration destination DBs are determined to be the exclusive DBs ("Exclusive DBs" at Step S624), or shifts the process to Step S626 if the registration destination DBs are determined to be the ordinary DBs ("Ordinary DBs" at Step S624). At each of Steps S625 and S626, the registration tool 21 displays, on the registration terminal 20, an error screen indicating that the similar image has already been registered, in the same manner as at each of Steps S605 and S606 in the flowchart of FIG. 40.

That is, at Step S625, the registration tool 21 displays the region (assumed to be the segment region $306_{LT}$), among the segment regions $306_{LT}$, $306_{RT}$, $306_{LB}$, and $306_{RB}$ of the image 302 as the check target, in which the similar image 330 has been found, as described using FIGS. 43A and 43B, and the found similar image. The found similar image 330 may be displayed in a reduced size in the region in which the similar image 330 has been found in the image 302, as illustrated in FIG. 46.

At Step S626, the registration tool 21 displays the region, among the segment regions $306_{LT}$, $306_{RT}$, $306_{LB}$, and $306_{RB}$ of the image 302 as the check target, in which the similar image has been found, as described using FIG. 44. The similar image 330 is not displayed at Step S626.

After the processing at Step S625 or Step S626 ends, the registration tool 21 shifts the process to Step S627. A Step S627, the registration tool 21 can perform the avoidance process to avoid any error, in the same manner as at Step S607 in the flowchart of FIG. 40 explained above.

In this manner, according also to the second example of the similar image check, the region in which the similar image 330 has been found and the similar image 330 are displayed together, so that it is easy to find out what kind of the similar image 330 has been found for the image 302 as the check target, and the similar image check can be more accurately performed.

First Modification of Search Process According to Embodiments

The following describes a first modification of the search process according to the embodiments. In the first modification of the search process according to the embodiments, the image search system 10 sets an ROI in an image (called a searched image) registered in the image search DB 112b, and performs weighting by setting a weight value w for the ROI thus set. In the image search in the image search DB 112b based on an image (called a search target image) transmitted from the search terminal 30, the image search system 10 performs the image search by changing a similarity s between the search target image and the searched image based on the weight value set for the ROI.

In the first modification of the search process according to the embodiments, the weighted ROI is set in the searched image, and the similarity s to the search target image is changed based on the weight value w of the ROI, so that a portion to be particularly searched and a portion to be restrained from being searched can be set in the searched image.

The following describes in more detail the weighting process and the image search for the searched image according to the first modification of the search process according to the embodiments. First, description will be given of the setting of the ROI in the searched image and the weighting process for the ROI.

Figure 48:
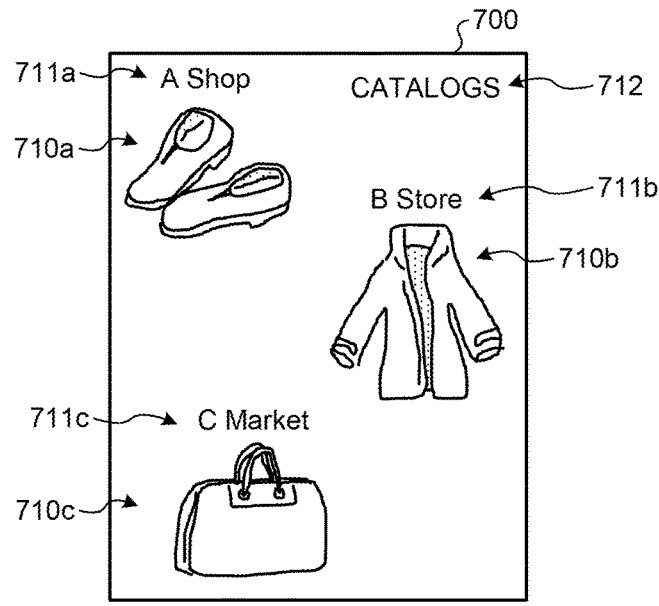
FIG. 48 is a diagram illustrating an example of a searched image applicable to the embodiments.

FIG. 48 illustrates an example of the searched image. In FIG. 48, a searched image 700 includes objects 710a to 710c, objects 711a to 711c, and an object 712. For example, the searched image 700 is a product catalog with a name indicated by the object 712. The objects 710a to 710c and the objects 711a to 711c represent products and sellers of the products, respectively. This searched image 700 is displayed on the edit screen 480 (refer to FIG. 22).

Figure 49:
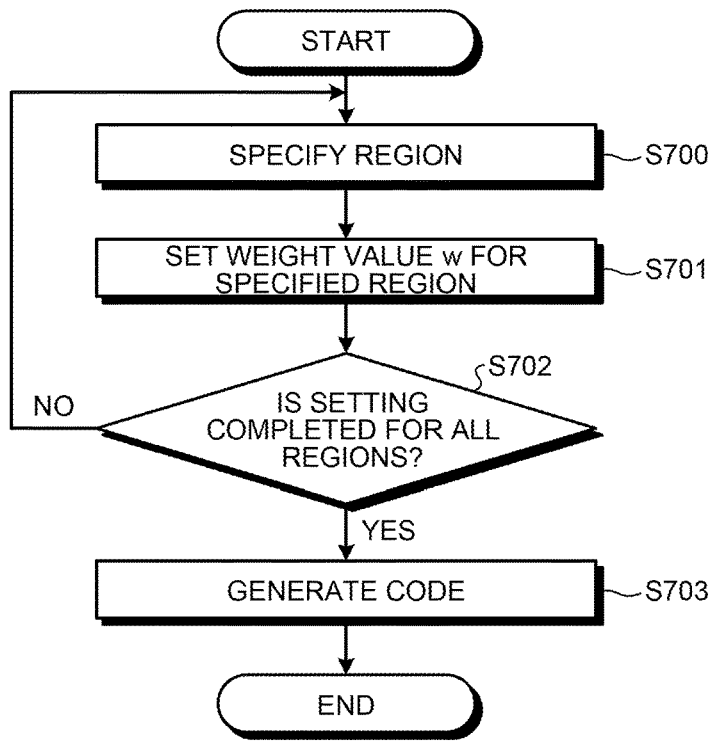
FIG. 49 is an exemplary flowchart illustrating processing of region-of-interest (ROI) setting and weighting according to a first modification of the search process according to the embodiments.

FIG. 49 is an exemplary flowchart illustrating the processing of ROI setting and weighting according to the first modification of the search process according to the embodiments. For example, when the button 4889 arranged on the toolbar 488 on the edit screen 480 described above is operated, the registration tool 21 starts the process according to the flowchart of FIG. 49.

At Step S700, the registration tool 21 specifies an area in the image to be set as the ROI according to a user operation. For example, when the input device 2008 serving as a pointing device is used to make a drag operation between any two points in the searched image 700 displayed on the edit screen 480, the registration tool 21 can specify, as the ROI, a rectangle having diagonal vertices at the start point and the end point of the drag operation.

At the next step S701, the registration tool 21 sets the weight value w serving as a value indicating a weight for the ROI for which the range has been specified at Step S700. An example of a weight value input screen for setting the weight value w will be described later.

Figure 50:
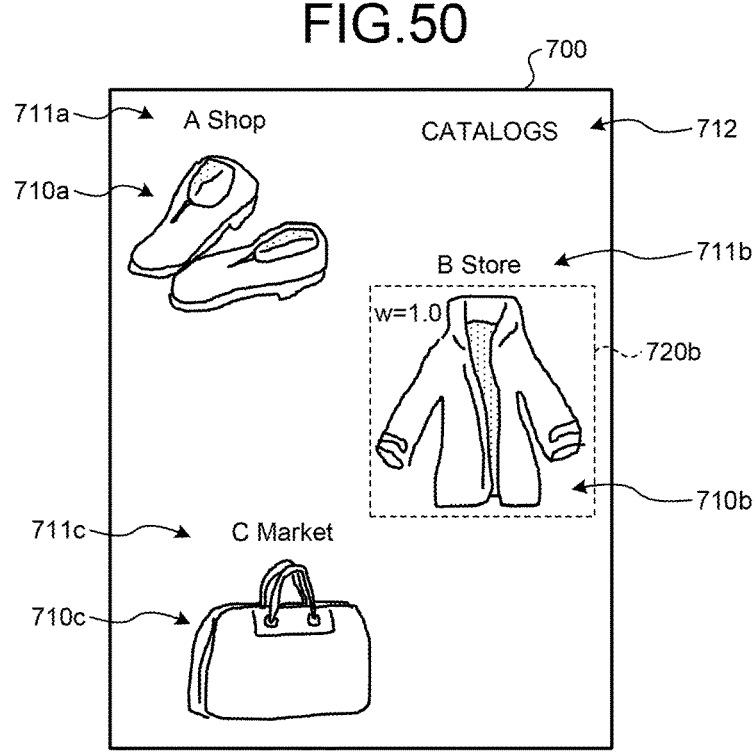
FIG. 50 is a diagram illustrating an example according to the first modification of the search process according to the embodiments in which a region of interest (ROI) and a weight value w are set for the searched image.

FIG. 50 illustrates an example in which the ROI and the weight value w are set in the searched image 700. In the example of FIG. 50, an ROI 720b is set so as to include the object 710b included in the searched image 700, and the weight value w=1.0 is set for the ROI 720b. The similarity s has a value in the range $0 \leq s \leq 1$, and the weight value w is settable within the range $-1.0 \leq w \leq 1.0$.

At the next step S702, the registration tool 21 determines whether the setting has been completed for all ROIs in the searched image 700 in response to the user operation to the input device 2008. If the setting for the ROIs is determined to not have been completed ("No" at Step S702), the registration tool 21 returns the process to Step S700 and accepts the setting for the next ROI. That is, the registration tool 21 can set a plurality of ROIs and weight values w in one searched image 700.

Figure 51:
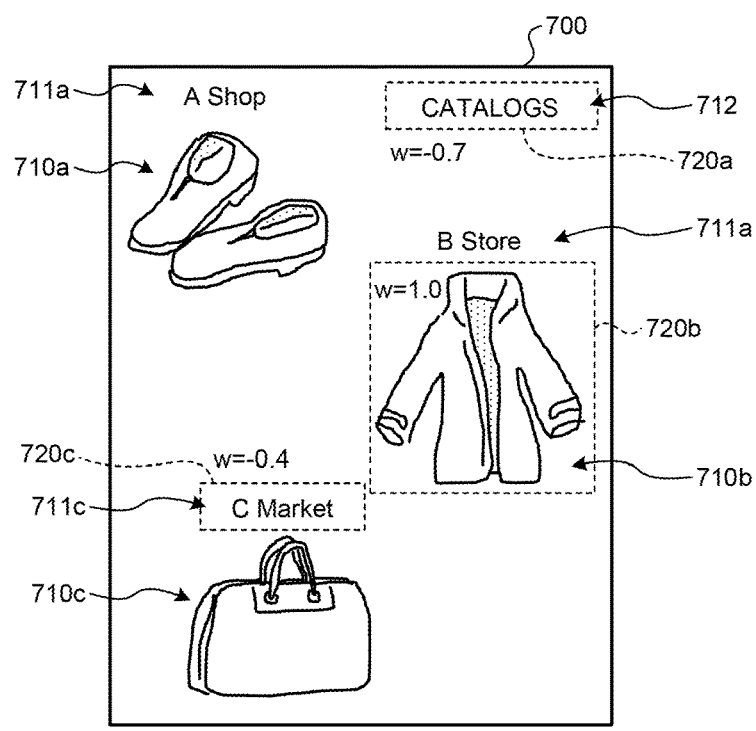
FIG. 51 is a diagram illustrating an example according to the first modification of the search process according to the embodiments in which a plurality of ROIs and weight values w are set for the searched image.

FIG. 51 illustrates an example in which a plurality of ROIs and a plurality of weight values w are set in the searched image 700. In the example of FIG. 51, an ROI 720a including the object 712 and an ROI 720c including the object 711c are set in addition to the ROI 720b illustrated in FIG. 50. The weight value w=−0.7 is set for the ROI 720a, and the weight value w=−0.4 is set for the ROI 720c.

If, at Step S702, the setting for all the ROIs is determined to have been completed for the searched image 700 ("Yes" at Step S702), the registration tool 21 shifts the process to Step S703. At Step S703, the registration tool 21 generates an XML code describing information indicating the ROIs and the weight values w. After the XML code is generated, the sequence of processes of the ROI setting and the weighting ends.

FIGS. 52A and 52B illustrate examples of the XML code generated at Step S703 by the registration tool 21. For example, as illustrated in FIG. 52A, the registration tool 21 can generate an XML code 141a in which coordinate information indicating a range in the searched image 700 is associated with the weight value w for each of the ROIs. In the example of FIG. 52A, in the same manner as the XML code 140 illustrated in FIG. 26, the XML code 141a defines a page (searched image 700) by the section (from the first line to the 14th line) interposed between the outermost tags "" and "". In each of the ranges from the second line to the fifth line, from the sixth line to the ninth line, and from the 10th line to the 13th line, one ROI is defined by a section interposed between tags "<weightarea>" and "</weightarea>".

On the third line in the range from the second line to the fifth line, a section interposed between tags "<area>" and "</area>" defines the range in the page of the ROI indicated from the second line to the fifth line, using, for example, coordinates (x3,y3) of the upper left corner and coordinates (x4,y4) of the lower right corner. In addition, on the fourth line, a section interposed between tags "<weight>" and "</weight>" defines the weight value w set for the ROI indicated from the second line to the fifth line. The same applies to the ranges from the sixth line to the ninth line and from the 10th line to the 13th line.

In the same manner as, for example, the XML code 140 described above, this XML code 141a illustrated in FIG. 52A is transmitted to the registration server 104 in association with the image identification information on the corresponding image.

In the example of FIG. 52A, the XML code 141a describing the information indicating the ROIs and the weight values w is generated independently from the XML code 140 indicating the target area. However, the XML code is not limited to this example. For example, as illustrated in FIG. 52B, the registration tool 21 can also generate an XML code 141b in which the information indicating the ROIs and the weight values w is embedded in an XML code indicating the target area.

In the example of FIG. 52B, lines from the second line to the 15th line correspond to the section interposed between tags "" and "" of the XML code 140 in FIG. 26, and define the target area. Lines from the 16th line to the 27th line correspond to lines from the second line to the 13th line in FIG. 52A, and define the ROIs and the weight values w. The XML code 141b collectively interposes the lines from the second line to the 15th line and from the 16th line to the 27th line between the tags "" and "" so as to define the target area, the ROIs, and the weight values w of the page.

Figure 53:
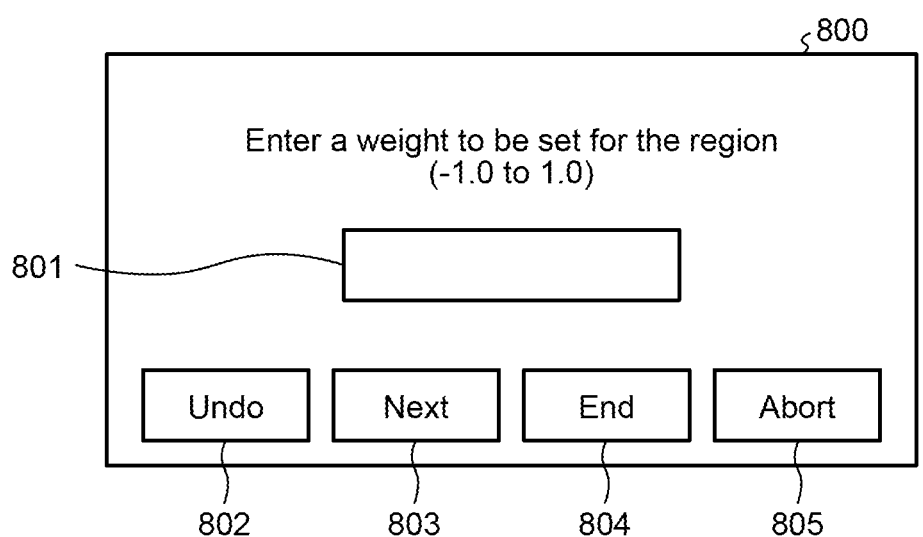
FIG. 53 is a diagram illustrating an example of a weight value input screen according to the first modification of the search process according to the embodiments.

FIG. 53 illustrates the example of the weight value input screen related to Steps S701 and S702 in the flowchart of FIG. 49 explained above. In FIG. 53, an input region 801 and buttons 802 to 805 are arranged on a weight input screen 800. The input region 801 is a region for entering the weight value w to be set for the range specified at Step S700. In this example, a value in the range $-1.0 \leq w \leq 1.0$ can be entered as the weight value w into the input region 801.

The button 802 is a button for retrying the specification of the range. Operating the button 802 cancels the range specification made at the immediately preceding step S700, and waits for the range specification operation to be made again at Step S700.

The button 803 is a button for determining the weight value w immediately previously entered into the input region 801 (at Step S701 of FIG. 49), and returning the process to Step S700 to shift the process to that for the setting the next ROI in the searched image 700 ("No" at Step S702 of FIG. 49). For example, if the button 803 is operated, the registration tool 21 temporarily stores the weight value w immediately previously entered into the input region 801, for example, in the RAM 2003 in association with information indicating the range of the ROI.

The button 804 is a button for determining the weight value w immediately previously entered into the input region 801 (at Step S701 of FIG. 49), and ending the setting of the ROIs in the searched image 700 ("Yes" at Step S702 of FIG. 49). The button 805 is a button for aborting the setting processing of the ROIs in the searched image 700. If the button 805 is operated, the registration tool 21, for example, discards the information indicating the ranges of the ROIs and the weight values w that have been set in the sequence of processes according to the flowchart of FIG. 49, and ends the setting processing of the ROIs and the weight values w.

Figure 54:
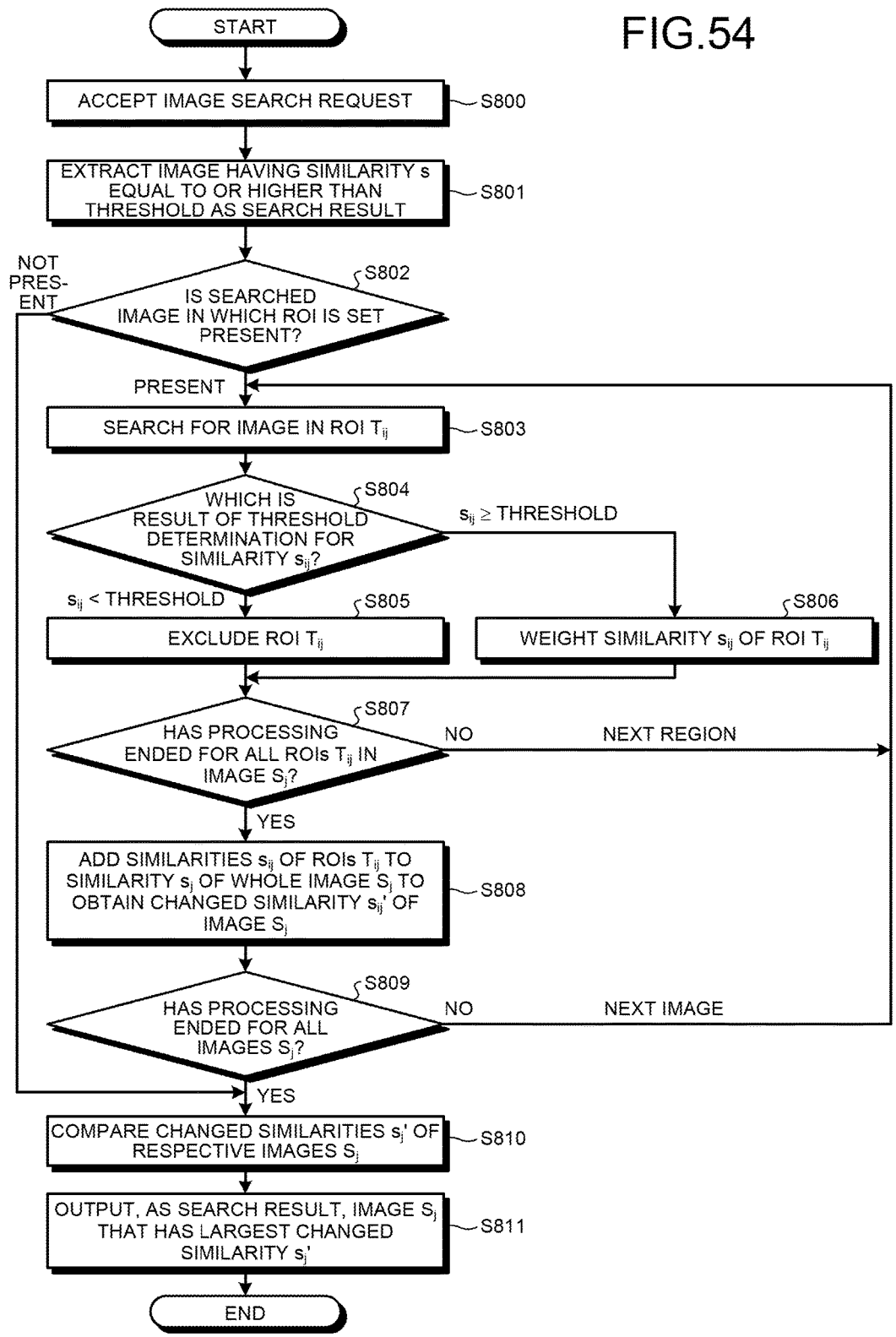
FIG. 54 is an exemplary flowchart illustrating an image search process according to the first modification of the search process according to the embodiments.

The following describes in more detail the first modification of the search process according to the embodiments. FIG. 54 is an exemplary flowchart illustrating an image search process in the image search system 10 according to the first modification of the search process according to the embodiments. The search terminal 30 transmits the captured image obtained by capturing the photographic subject 50 and the image search request based on the captured image to the image search system 10.

The image search system 10 uses the communication unit 16 to receive the captured image and the image search request transmitted from the search terminal 30. The communication unit 16 transfers the captured image and the image search request thus received to the search unit 13. The search unit 13 receives the captured image and the image search request from the communication unit 16, and accepts the image search request from the search terminal 30 (Step S800).

At the next step S801, according to the accepted image search request, the search unit 13 searches the image search DB 112b using the captured image received from the communication unit 16 at Step S800 as the search target image, and extracts, as a search result, a searched image having the similarity s to the search target image equal to or higher than a first threshold, from among searched images registered in the image search DB 112b. The similarity s takes a value in the range 0≤s≤1, and the threshold is set, for example, at s=0.5. The image search system 10 can extract a plurality of searched images as search results of this process.

At the next step S802, the search unit 13 determines whether a searched image in which a weighted ROI is set is present among the searched images extracted at Step S801. For example, if the image identification information on the searched image extracted at Step S801 is associated with the XML code 141a describing the information on the ROI, the search unit 13 determines that the weighted ROI is set in the searched image.

If the search unit 13 determines that the searched image in which a weighted ROI is set is not present among the searched images extracted at Step S801 ("Not present" at Step S802), the search unit 13 shifts the process to Step S810.

If, instead, the search unit 13 determines that the searched image in which a weighted ROI is set is present among the searched images extracted at Step S801 ("Present" at Step S802), the search unit 13 shifts the process to Step S803.

Subsequently, processing of Steps S803 to S809 is executed for each of the searched images extracted at Step S801. Assume that m searched images have been extracted at Step S801, and the processing of Steps S803 to S809 is executed for a jth searched image (1≤j≤m) among the m searched images. The processing of Steps S803 to S807 is executed for each of the ROIs included in one searched image. Let n denote the number of the ROIs included in one searched image, and assume that the processing of Steps S803 to S807 is executed for an ith ROI (1≤i≤n) among the n ROIs.

At Step S803, the search unit 13 performs the image search based on the search target image for an ith ROI $T_{ij}$ included in a jth searched image $S_j$ extracted at Step S801. For example, the search unit 13 clips an image in the range of the ROI $T_{ij}$ from the searched image $S_j$, and obtains a similarity $s_{ij}$ between the clipped image and the search target image.

Figure 55:
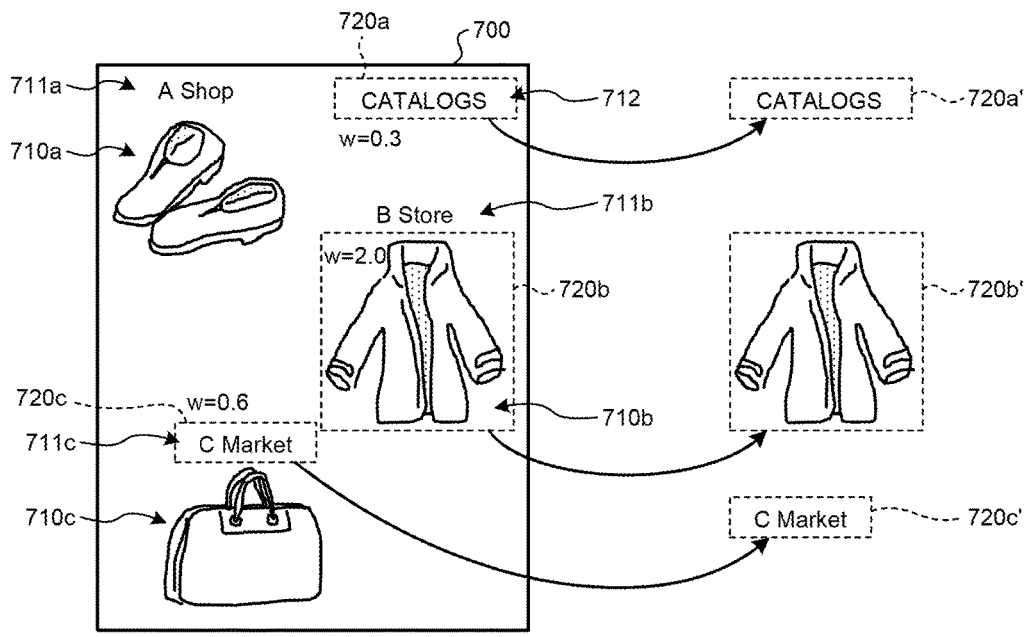
FIG. 55 is a diagram for explaining an image clipping process according to the first modification of the search process according to the embodiments.

A more specific description will be given of the processing to clip the image in the range of the ROI from the searched image according to the first modification of the search process according to the embodiments, using FIG. 55. In FIG. 55, the same reference numerals are assigned to components common to those in FIG. 51 explained above, and detailed description thereof will be omitted.

As an example, the searched image 700 in FIG. 55 is assumed to be the searched image $S_j$ that is currently subjected to the processing. The search unit 13 clips images in the ranges of the ROIs 720a, 720b, and 720c set in this searched image 700, and stores the clipped images as images 720a', 720b', and 720c', respectively, for example, in the RAM 1013. These images 720a', 720b', and 720c' are actually the feature information on the images.

At Step S803, if, for example, i=1, so that the ROI 720a is a first ROI $T_{1j}$, the search unit 13 obtains a similarity $s_{1j}$ between the image 720a' corresponding to the ROI 720a stored in the RAM 1013 and the search target image.

In the description above, the search unit 13 clips the images in the ranges of the respective ROIs from the searched image in response to the image search request transmitted from the search terminal 30. However, the images in the ranges of the respective ROIs are not limited to this example. For example, it is conceivable to prepare in advance the images in the ranges of the respective ROIs set in the searched image.

Figure 56:
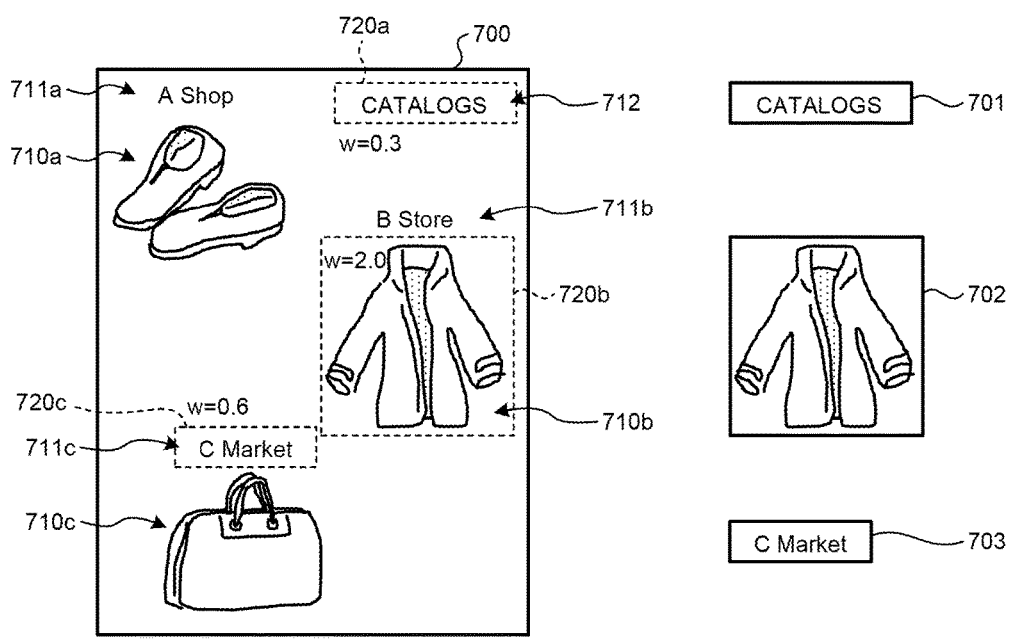
FIG. 56 is a diagram for explaining an example according to the first modification of the search process according to the embodiments in which images in the respective ROIs are stored in advance in an image DB in association with searched images.

More specifically, as exemplified in FIG. 56, the image search system 10 stores in advance images 701, 702, and 703 in the ranges of the ROIs 720a, 720b, and 720c, respectively, set in the searched image 700 in association with the searched image 700, for example, in the image DB 14. At Step S803, the image search is performed for the respective images 701, 702, and 703 stored in this image DB 14.

In this method of preparing in advance the images in the respective ranges of the ROIs, the image in the range the ROI need not be clipped each time the image search is requested from the search terminal 30, so that the quicker search processing can be expected than that using the above-described method of clipping the image each time the image search is requested from the search terminal 30. In this method of preparing in advance the images in the respective ranges of the ROIs, however, the images of the respective ROIs set in the respective searched images are stored in advance in the image DB 14, so that the image DB 14 needs a larger capacity than in the case of using the above-described method of clipping the image each time the image search is requested from the search terminal 30.

Returning to the description of FIG. 54, at the next step S804, the search unit 13 determines whether the similarity $s_{ij}$ obtained at Step S803 is equal to or higher than a second threshold. If the similarity $s_{ij}$ is determined to be lower than the second threshold ("$s_{ij}$<threshold" at Step S804), the search unit 13 shifts the process to Step S805, and the search unit 13 excludes the ROI $T_{ij}$ corresponding to this similarity $s_{ij}$ from the target of processing. Then, the process shifts to Step S807.

In contrast, if, at Step S804, the similarity $s_{ij}$ is determined to be equal to or higher than the second threshold ("$s_{ij}$≥threshold" at Step S804), the search unit 13 transfers this similarity $s_{ij}$ and information on the ROI $T_{ij}$ to the change unit 17, and shifts the process to Step S806. At Step S806, based on the information transferred from the search unit 13, the change unit 17 weights the similarity $s_{ij}$ of the ROI $T_{ij}$ with a weight value $w_{ij}$ set for the ROI $T_{ij}$. For example, the change unit 17 obtains a value by adding the weight value $w_{ij}$ to the similarity $s_{ij}$ as a changed similarity $s_{ij}$ of the ROI $T_{ij}$. Then, the process shifts to Step S807.

At Step S807, the search unit 13 determines whether the processing has ended for all the ROIs $T_{ij}$ set in the searched image $S_j$ that is currently subjected to the processing. If the processing is determined to have not ended ("No" at Step S807), the search unit 13 returns the process to Step S803 to perform the processing for the next ROI $T_{(i+i)j}$ set in the searched image $S_j$. In the example of FIG. 55, if, for example, the ROI 720b is a second ROI $T_{2j}$, a similarity $s_{2j}$ is obtained between the image 720b' obtained by clipping the image in the range of this ROI 720b and the search target image.

If, instead, the processing is determined to have ended for all the ROIs $T_{ij}$ set in the searched image $S_j$ ("Yes" at Step S807), the search unit 13 shifts the process to Step S808.

At Step S808, the change unit 17 adds the similarities $s_{ij}'$ (to which the weight values $w_{ij}$ have been added) of respective ROIs $T_{ij}$ not excluded at Step S805 among the ROIs $T_{ij}$ set in the searched image $S_j$ currently subjected to the processing to a similarity $s_j$ of the searched image $S_j$ to the search target image. The change unit 17 obtains a similarity $s_j'$ by the addition as a changed similarity of the searched image $S_j$.

Figure 57:
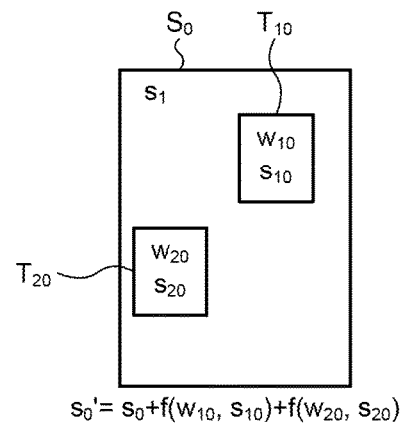
FIG. 57 is a diagram for explaining a method for obtaining the changed similarity according to the first modification of the search process according to the embodiments.

The processing of Step S808 will be more specifically described using FIG. 57. The example of FIG. 57 assumes that two ROIs $T_{10}$ and $T_{20}$ with weight values $w_{10}$ and $w_{20}$ set therefor, respectively, are set in a searched image $S_0$, and that the searched image $s_0$ has a similarity $s_0$ to the search target image, and the ROIs $T_{10}$ and $T_{20}$ have similarities $s_{10}$ and $s_{20}$, respectively, to the search target image.

In the first embodiment, Expression (1) below uses a predetermined function f to obtain a similarity $s_0'$ of the searched image $S_0$ that has been changed based on the weight values $w_{10}$ and $w_{20}$ set for the ROIs $T_{10}$ and $T_{20}$, respectively. In this example, the function f uses a calculation of adding elements in brackets. That is, the function $f(w_{10}, s_{10})=w_{10}+s_{10}$.

$$s_0'=s_0+f(w_{10},s_{10})+f(w_{20},s_{20}) \tag{1}$$

In this manner, in the first modification of the search process according to the embodiments, the change unit 17 obtains the changed similarity $s_j'$ by changing the similarity $s_j$ of the searched image $S_j$ including the ROIs $T_{ij}$ to the search target image based on the weight values $w_{ij}$ set for the respective ROIs $T_{ij}$.

In Expression (1), the function f is not limited to the calculation of adding the elements in the brackets. For example, the function f may apply a multiplication or still another calculation of the elements in the brackets.

If the function f applies the multiplication of the elements in the brackets, it is conceivable for example, to set the weight value w so that $0 \le w \le 2$.

At the next step S809, the search unit 13 determines whether the processing has ended for all the searched images $S_j$ extracted at Step S801. If the processing is determined to have not ended ("No" at Step S809), the search unit 13 returns the process to Step S803 to perform the processing for the next searched image $S_{j+1}$ extracted at Step S801.

That is, the search unit 13 obtains, for the next searched image $S_{j+1}$, similarities $s_{i(j+1)}$ of images in the ranges of respective ROIs $T_{i(j+1)}$ set in the searched image $S_{j+1}$ to the search target image. The change unit 17 obtains similarities $s_{i(j+1)}'$ by adding respective weight values $w_{i(j+1)}$ set for the respective ROIs $T_{i(j+1)}$ to these similarities $s_{i(j+1)}$ obtained for the searched image $S_{j+1}$. The change unit 17 adds the obtained $s_{i(j+1)}'$ to a similarity $s_{j+1}$ between the searched image $S_{j+1}$ and the search target image to obtain a changed similarity $s_{j+1}'$ of the searched image $S_{j+1}$.

In contrast, if, at Step S809, the processing is determined to have ended for all the searched images $S_j$ extracted at Step S801 ("Yes" at Step S809), the search unit 13 shifts the process to Step S810. At Step S810, the search unit 13 compares the changed similarities $s_j'$ obtained for the respective searched images $S_j$ by the processing of Steps S803 to S809 described above, with one another.

At the next step S811, the search unit 13 outputs, as a search result, the searched image $S_j$ that has the largest changed similarity $s_j'$ as a result of the comparison at Step S810.

Figure 58:
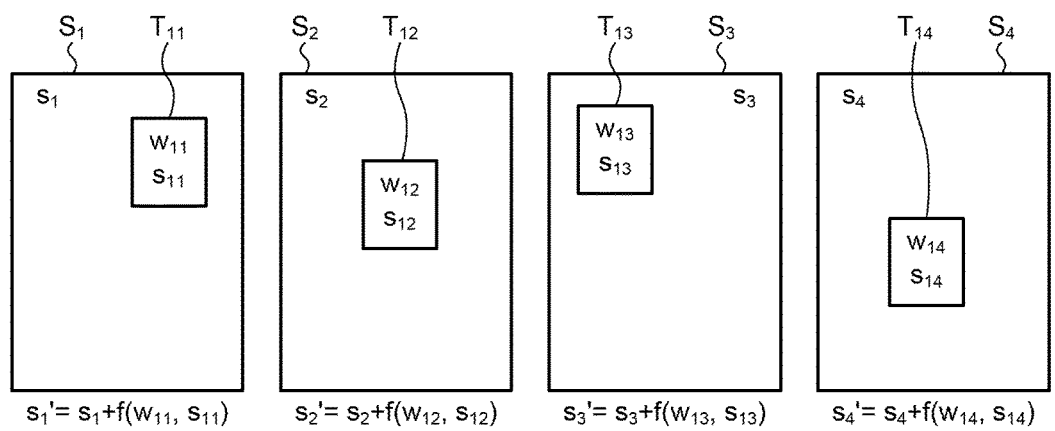
FIG. 58 is a diagram for explaining a method for outputting the search result based on the changed similarity according to the first modification of the search process according to the embodiments.

The processing of Steps S810 and S811 will be more specifically described using FIG. 58. In the example of FIG. 58, four searched images $S_1$, $S_2$, $S_3$, and $S_4$ are extracted at Step S801. ROIs $T_{11}$, $T_{12}$, $T_{13}$, and $T_{14}$ are set, one for each of the searched images $S_1$, $S_2$, $S_3$, and $S_4$, respectively, and weight values $w_{11}$, $w_{12}$, $w_{13}$, and $w_{14}$ are set for the ROIs $T_{11}$, $T_{12}$, $T_{13}$, and $T_{14}$, respectively. In the example of FIG. 58, the searched images $S_1$, $S_2$, $S_3$, and $S_4$ have similarities $s_1$, $s_2$, $s_3$, and $s_4$, respectively, to the search target image, and the ROIs $T_{11}$, $T_{12}$, $T_{13}$, and $T_{14}$ have similarities $s_{11}$, $s_{12}$, $s_{13}$, and $s_{14}$, respectively, to the search target image.

In the case of this example, changed similarities $s_1'$, $s_2'$, $s_3'$, and $s_4'$ of the searched images $S_1$, $S_2$, $S_3$, and $S_4$ obtained at Step S808 are represented as Expressions (2) to (5) given below. The meaning of the function f is the same as that of Expression (1) given above.

$$s_1'=s_1+f(w_{11},s_{11}) \tag{2}$$

$$s_2'=s_2+f(w_{12},s_{12}) \tag{3}$$

$$s_3'=s_3+f(w_{13},s_{13}) \tag{4}$$

$$s_4'=s_4+f(w_{14},s_{14}) \tag{5}$$

The search unit 13 compares the changed similarities $s_1'$, $s_2'$, $s_3'$, and $s_4'$ obtained by Expressions (2) to (5) (Step S810), and selects a similarity s' having the largest value from among the similarities $s_1'$, $s_2'$, $s_3'$, and $s_4'$. The search unit 13 outputs a searched image S corresponding to the selected similarity s' as the search result.

Consider, as an example, the following values for the searched images $S_1$ to $S_4$.

$S_1$: $s_1$=0.6, $w_{11}$=0.5, and $s_{11}$=0.7
$S_2$: $s_2$=0.7, $w_{12}$=−0.3, and $s_{12}$=0.7
$S_3$: $s_3$=0.8, $w_{13}$=0.3, and $s_{13}$=0.8
$S_4$: $s_4$=0.6, $w_{14}$=−0.7, and $s_{14}$=0.6

In this case, the changed similarities $s_1'$, $s_2'$, $s_3'$, and $s_4'$ of the searched images $S_1$ to $S_4$ are obtained by substituting the values listed above into Expressions (2) to (5) given above, as represented by Expressions (6) to (9) given below.

$$s_1'=s_1+w_{11}+s_{11}=0.6+0.5+0.7=1.8 \tag{6}$$

$$s_2'=s_2+w_{12}+s_{12}=0.7-0.3+0.7=1.1 \tag{7}$$

$$s_3'=s_3+w_{13}+s_{13}=0.8+0.3+0.8=1.9 \tag{8}$$

$$s_4'=s_4+w_{14}+s_{14}=0.6-0.7+0.6=0.5 \tag{9}$$

It is found from Expressions (6) to (9) that the similarity $s_3'$=1.9 of Expression (8) is the largest value among the similarities $s_1'$ to $s_4'$. Consequently, the search unit 13 outputs the searched image $S_3$ corresponding to the similarity $s_3'$ as a search result for the image search request made by the search terminal 30.

In this manner, according to the first modification of the search process according to the embodiments, the weighting is performed for the ROIs set in the searched image, and the similarity of the searched image to the search target image is changed according to the weighting. As a result, the ROIs set for important regions (portions intended to be searched) in the searched image are weighted with larger weight values, so that the search for the searched image including the important regions can be more accurately performed using the search target image including portions similar to images in the important regions. This allows the image search to more correctly reflect the intension of the user (provider of the searched image). Information on portions other than the ROIs is also used to perform the image search, so that any reduction in the search accuracy caused by exclusion of the portions other than the ROIs can be avoided.

Negative weight values may be set for the ROIs, as given above. This enables setting of a portion not intended to be searched (called a search inhibiting region) in the searched image. In this case, the searched image can be inhibited from being searched by performing the image search based on a search target image including an image similar to the image of the search inhibiting region.

Figure 59:
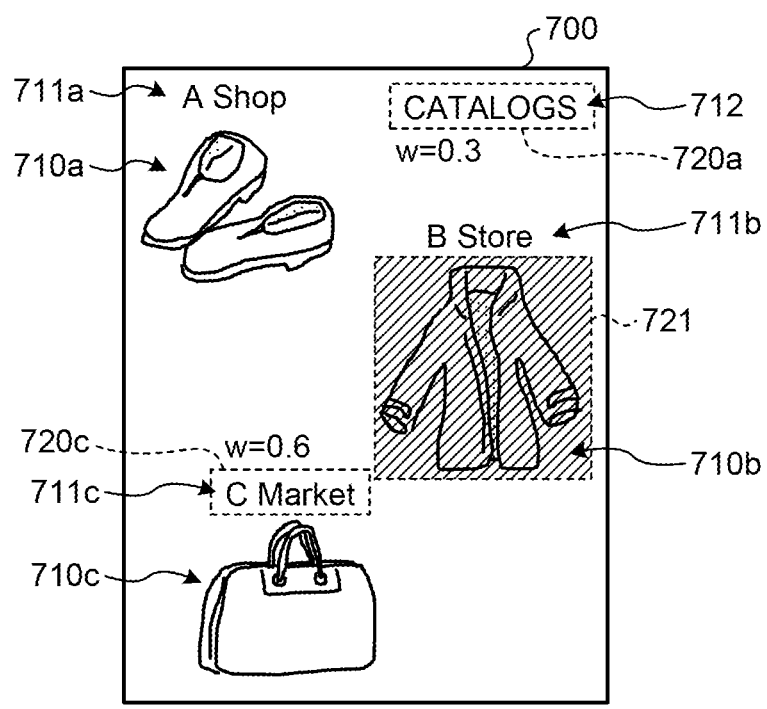
FIG. 59 is a diagram illustrating an example of masking a search inhibiting region according to the first modification of the search process according to the embodiments.

The search inhibiting region can be set as the mask area. FIG. 59 illustrates an example of masking the search inhibiting region in the first modification of the search process according to the embodiments. In FIG. 59, the same reference numerals are assigned to components common to those in FIG. 51 explained above, and detailed description thereof will be omitted.

In the example of FIG. 59, a mask area 721 is set by assuming the object 710*b* as the search inhibiting region. The registration tool 21 makes a setting, for example, so as to force the similarity s to be zero in the area specified as the mask area 721. As an example of such a setting, if the function f of Expression (1) given above is an addition calculation, a setting can be considered that adaptively generates, as the weight value w for the mask area 721, a value that has an absolute value equal to the similarity s obtained at Step S803 described above with an inverted plus/minus sign. If, for example, the function f of Expression (1) is a multiplication calculation, the weight value w can be considered to be set to zero.

The setting is not limited to these examples, but may be a setting of ignoring feature quantities in the mask area 721 during the image search.

In the description above, the weight values w are set for the searched image registered in the image search DB 112*b*. However, the weight values w are not limited to this example. For example, the weight values w can also be set for the searched image registered in the image search DB 112*a*. In this case, for example, the image having the weight values w set therefor and registered in the image search DB 112*a* serving as a private DB can continue to have the settings of the weight values w when moved to the image search DB 112*b* serving as a public DB.

Figure 60A:
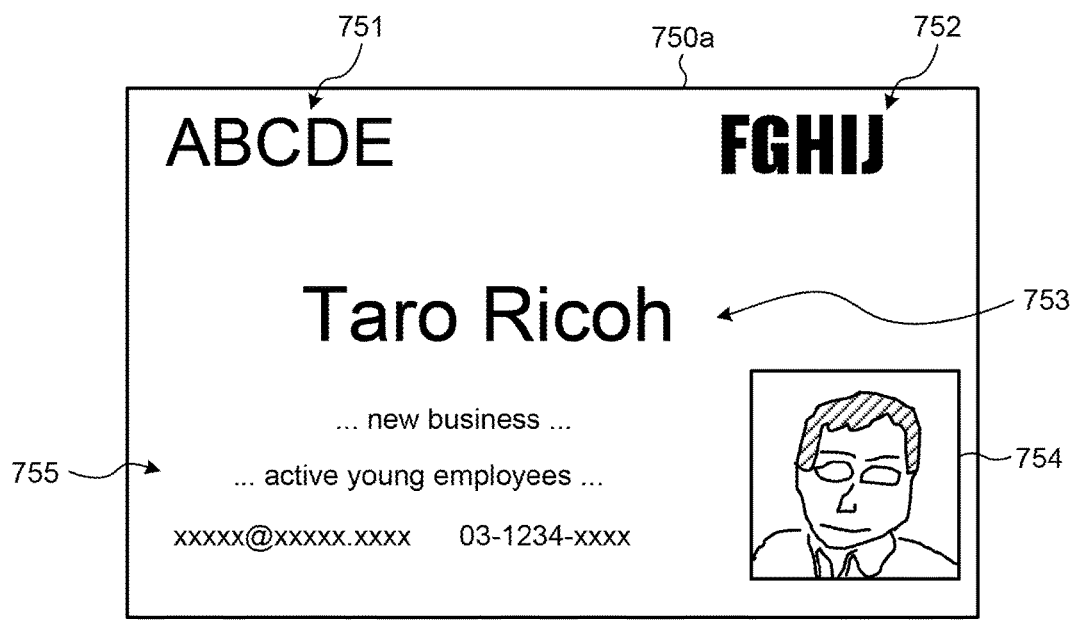
FIG. 60A is a diagram illustrating an example of a business card image.
Figure 60B:
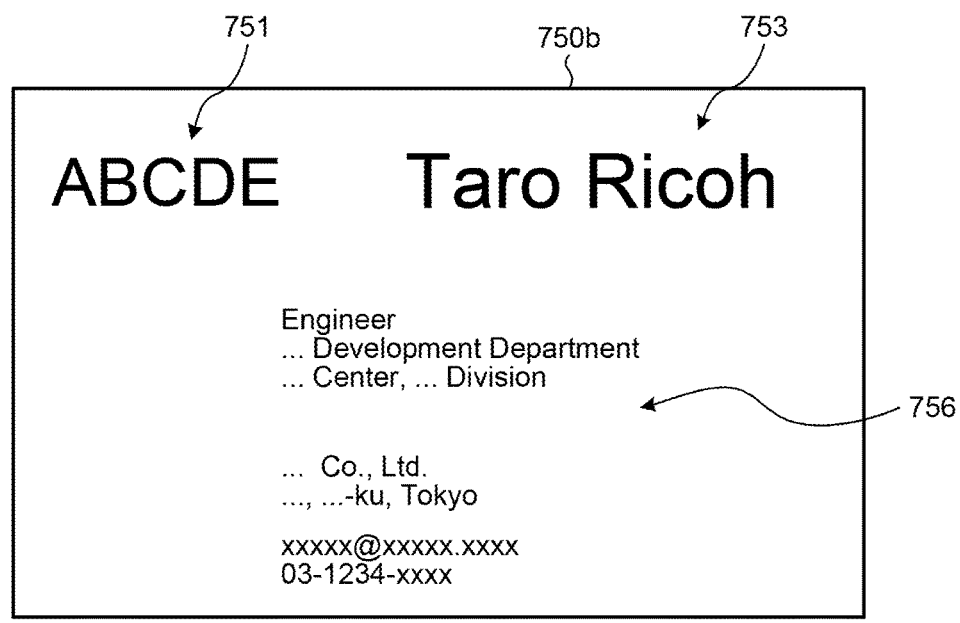
FIG. 60B is a diagram illustrating another example of the business card image.

Application Examples of First Modification of Search Process According to Embodiments The following describes application examples of the first modification of the search process according to the embodiments. Here, description will be given of examples of searching for a business card image using the image search system 10 according to the first modification of the search process according to the embodiments. FIGS. 60A and 60B illustrate examples of the business card image. FIG. 60A illustrates an example of a business card image 750*a* of a business card with a head shot. In the example of FIG. 60A, the business card image 750*a* includes objects 751 to 755. The objects are, for example, as follows: the object 751 is a corporate name logo image; the object 752 is a corporate name mark image; the object 753 is a character string image representing a full name; the object 754 is a head shot image; and the object 755 is another character string image.

FIG. 60B illustrates an example of a business card-image 750*b* without a head shot. In FIG. 60B, the same reference numerals are assigned to components common to those in FIG. 60A explained above, and detailed description thereof will be omitted. In the example of FIG. 60B, the business card image 750*b* includes the objects 751 and 753, and also includes an object 756. The object 756 is a character string image representing attributes, such as a department name and an address, associated with the corporate name and the full name.

In the image search DB 112*b* of the image search system 10, a plurality of business card images are assumed to have been registered, and in addition, information on a person-having a full name corresponding to that on each of the business card images is assumed to have been registered as the linkage information. As an example, the user is assumed to have obtained a real business card corresponding to the business card image 750*a* or 750*b*, and is assumed to want to acquire the information on the person described on the business card through the image search using the image search system 10 according to the first embodiment. In this case, the user images the business card using the search terminal 30 to acquire the business card image 750*a* or 750*b* as a captured image. The search terminal 30 transmits the acquired captured image to the image search system 10, together with an image search request requesting the image search based on the captured image.

As already described, the image search system 10 uses the captured image (that is, the business card image 750*a* or 750*b*) transmitted from the search terminal 30 as a search target image to extract a feature quantity from the search target image. Then, the image search system 10 obtains a similarity between the feature quantity extracted from the search target image and the feature quantity of each of the images registered in the image search DB 112*b*, and transmits, to the search terminal 30, the linkage information associated with the image identification information corresponding to a feature quantity having a high similarity.

In the business card image 750*a*, for example, the object 752 (corporate name mark image) is an important element of search. The object 754 serving as a head shot is also an important element of search. At this time, since the head shot includes more features than, for example, a character string image and a mark image, it is considered highly possible that another business card image including an image of a resembling face is found by the image search based on the business card image 750*a* taken from the business card with the head shot.

In the case of the business card image 750*b* that does not include the head shot, if a large number of business card images of employees of the same corporation, that is, a large number of business card images including the object 751 for the same corporate name logo image are registered in the image search DB 112*b*, the object 751 is considered to need to be masked.

Figure 61A:
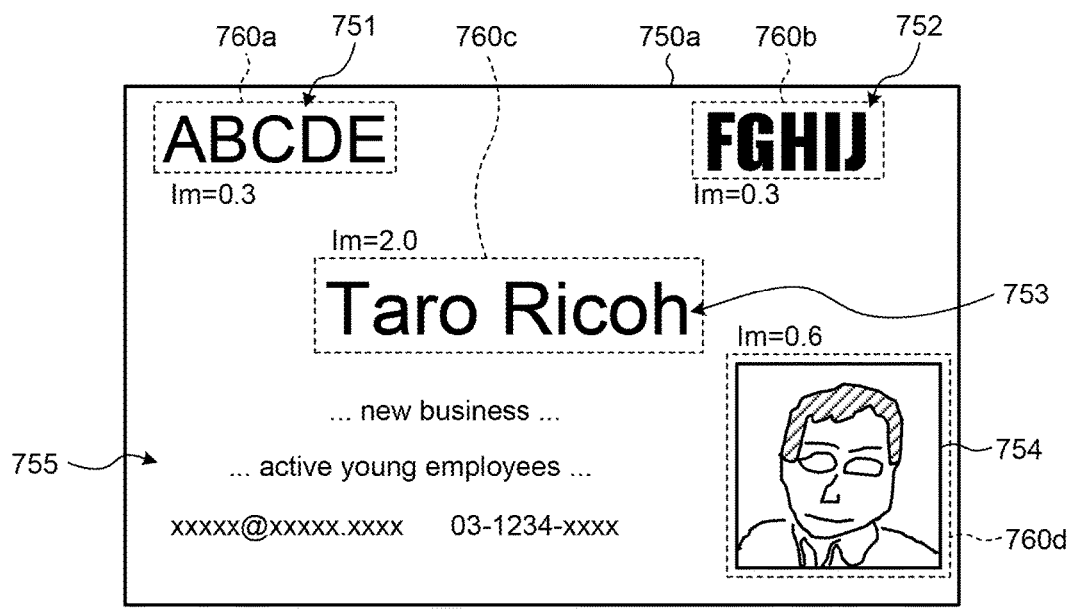
FIG. 61A is a diagram illustrating an application example of the weighting for the search based on the business card image according to the first modification of the search process according to the embodiments.
Figure 61B:
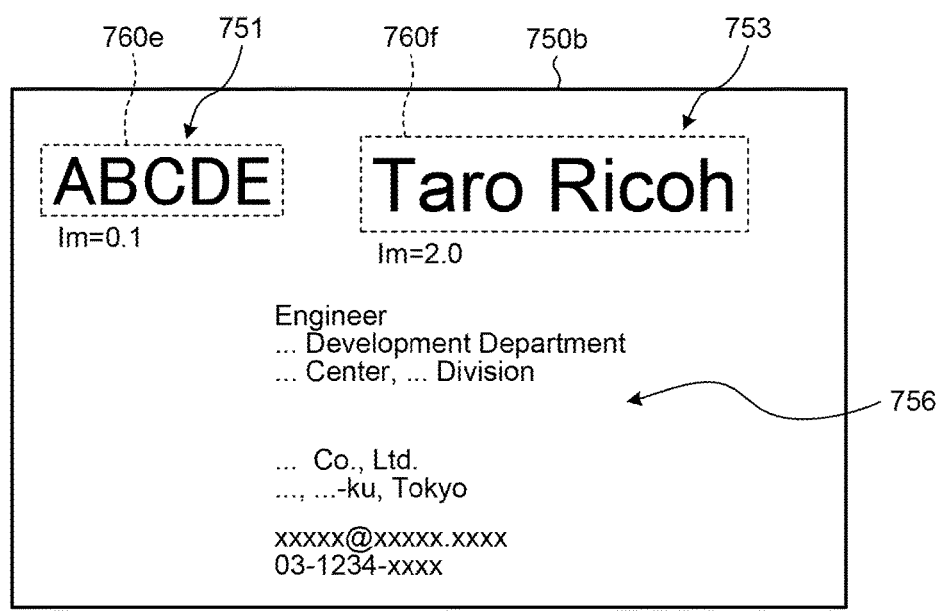
FIG. 61B is a diagram illustrating another application example of the weighting for the search based on the business card image according to the first modification of the search process according to the embodiments.

FIGS. 61A and 61B illustrate examples of the weighting for enabling more accurate search using the full name based on the business card image 750a or 750b. In FIGS. 61A and 61B, the weight value w is represented as an importance level Im. As represented by Expression (10), the importance level Im is a value obtained by adding 1 to the weight value w. When the weight value w is in the range −1≤w≤1, the importance level Im is represented as 0≤Im≤2. If the specified range is important in the search, the importance level Im is set to a value greater than 1. If the search based on the specified range is intended to be restrained, the importance level Im is set to a value smaller than 1. Using this importance level Im is considered to allow the weight value w to be set more intuitively.

$$Im = w + 1 \quad (10)$$

FIG. 61A illustrates an example of the weighting for the business card image 750a with the head shot. In this example, the importance level Im=2.0 is set for a region 760c including the object 753 represented by the character string image of the full name. The importance level Im=0.3 is set for portions where the search is intended to be restrained, that is, for regions 760a and 760b including the objects 751 and 752 of the corporate name logo image and the corporate name mark image, respectively, and the importance level Im=0.6 is set for a portion where the search is intended to be restrained, that is, for a region 760d including the object 754 represented by the head shot image.

Setting the importance levels Im of the regions 760a to 760d in this manner reduces influences of the head shot image, the corporate name logo image, and the corporate name mark image on the search, and emphasizes the character string image of the full name, so that the search using the character string image of the full name can be accurately performed. This allows the image search to more correctly reflect the intension of the user.

FIG. 61B illustrates an example of the weighting for the business card image 750b without the head shot. Also in this example, in the same manner as in the example of FIG. 61A explained above, the importance level Im=2.0 is set for a more important region 760f including the object 753 represented by the character string image of the full name. The importance level Im=1.0 is set for a region 760e including the object 751 of the corporate name logo image where the search is intended to be restrained. In the same manner as the example described above, this example also reduces the influence of the corporate name logo image on the search, and emphasizes the character string image of the full name, so that the search using the character string image of the full name can be accurately performed. This allows the image search to more correctly reflect the intension of the user.

Second Modification of Search Process According to Embodiments

The following describes a second modification of the search process according to the embodiments. In the second modification of the search process according to the embodiments, the above-described weighting according to the first modification of the search process according to the embodiments is applied to the similar image check performed at Step S124 or S130 of FIG. 13. That is, the second modification of the search process according to the embodiments is a third example of the similar image check as compared with the first and second examples of the similar image check described above.

As already described, if a plurality of images similar to one another have been registered in the image DB 14 of the image search system 10, the image search system 10 may make erroneous recognition during the image search. Hence, in the case of registering an image from the registration terminal 20 into the registration server 104 using the registration tool 21, a check is preferably made as to whether an image similar to the image has already been registered in the registration server 104. According to the check result, processing is performed on the registration terminal 20 to avoid the erroneous recognition during the image search.

In the case of determining the similarity using the feature information of the image, for example, an image partially similar to the check target image can be searched for as a similar image. As an example, consider a case where the image 302 including the objects 301a, 301b, and 301c illustrated in FIG. 39A is registered in registration server 104 using the registration tool 21. At this time, the registration server 104 is assumed to have already registered therein the image 304 including only the object 303 illustrated in FIG. 39B that is highly similar to the object 301b.

In this case, the registration tool 21 transmits the image 302 from the registration terminal 20 to the registration server 104, and requests the registration server 104 to perform the similar image check for the image 302. The registration server 104 returns information indicating the image 304 including the object 303 highly similar to the object 301b included in a partial region in the image 302 transmitted by the registration tool 21, as a search result to the registration terminal 20. Consequently, the registration tool 21 determines that the image similar to the image 302 has already been registered in the registration server 104.

It is difficult for the user operating the registration tool 21 to find out which of the objects 301a, 301b, and 301c included in the image 302 is the image determined to be similar to the image that have already been registered in the registration server 104. That is, the image is registered as the feature information in the image DB 14 of the registration server 104, and it is considered to be difficult for the user to get to know the original image from the feature information. For that reason, it may be very difficult for the user to determine what kind of edit is to be applied to the image 302 to avoid a determination that a similar image has been registered in the registration server 104.

Thus, in the second modification of the search process according to the embodiments, a check region is set in the check target image, and the similar image check is performed for an image in this check region thus set. Then, the weighting for restraining the search is performed for the check region according to the check result.

More specifically, the registration tool 21 clips the image in the set region from the check target image, and transmits the clipped image together with an image search request requesting the image search for the image to the registration server 104. In response to this image search request, the registration server 104 searches the image search DB 112a for an image having a similarity equal to or higher than a threshold to the image transmitted from the registration terminal 20, and transmits a search result to the registration terminal 20.

If, on the registration terminal 20, the search result transmitted from the registration server 104 indicates that an image having a similarity equal to or higher than the threshold has been registered, the registration tool 21 determines that an image similar to the image in the set region has already been registered in the registration server 104, and sets a negative weight value for the region to restrain the search of the region.

Figure 62:
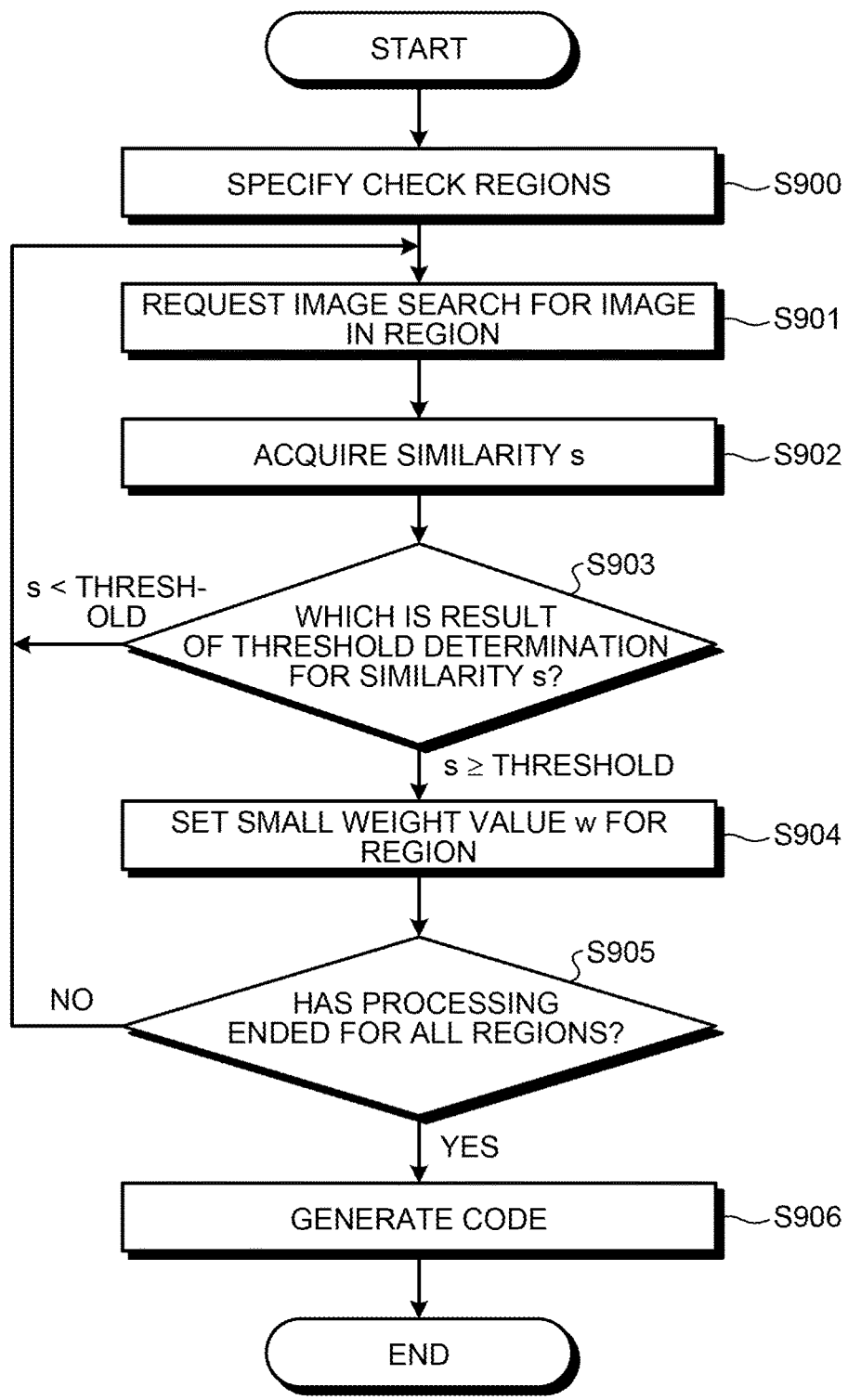
FIG. 62 is an exemplary flowchart illustrating the weighting process in the similar image check according to a second modification of the search process according to the embodiments.

FIG. 62 is an exemplary flowchart illustrating the weighting process in the similar image check according to the second modification of the search process according to the embodiments. For example, if, at Step S126 in the flowchart of FIG. 13, the campaign is determined to be newly registered, or if the button 4888 arranged on the edit screen 480 illustrated in FIG. 22 is operated to instruct the similar image check, the registration tool 21 starts the process according to the flowchart of FIG. 62.

Figure 63:
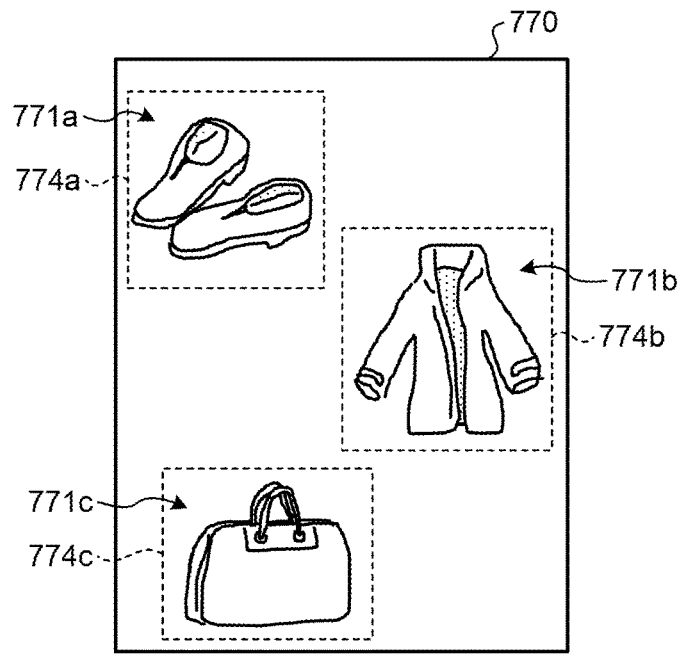
FIG. 63 is a diagram illustrating an example according to the second modification of the search process according to the embodiments in which a plurality of check regions are specified in the check target image.

An image to be subjected to the similar image check is assumed to have already been displayed in the page edit region 484 of the edit screen 480 prior to the start of the process according to the flowchart of FIG. 62. Hereinafter, an image 770 illustrated in FIG. 63 is assumed to be used as the image to be subjected to the similar image check. Hereinafter, the image 770 is called the check target image 770. The check target image 770 includes a plurality of objects 771*a*, 771*b*, and 771*c*, in the same manner as in FIG. 39A.

At Step S900, the registration tool 21 specifies, according to a user operation, an image region (called a check region) in the check target image 770 to be subjected to a determination on presence of a similar image. At this time, the registration tool 21 can specify a plurality of such check regions in the check target image 770. FIG. 63 illustrates an example in which a plurality of check regions 774*a*, 774*b*, and 774*c* including the objects 771*a*, 771*b*, and 771*c*, respectively, are specified in the check target image 770.

Subsequently, processing of Steps S901 to S905 is performed check region by check region. At Step S901, the registration tool 21 requests the registration server 104 to perform the image search for an image in one of the check regions specified at Step S900. For example, the registration tool 21 extracts an image in the check region 774*a* specified at Step S900, and transmits the extracted image together with the image search request for the image to the registration server 104.

The registration server 104 receives the image and the image search request transmitted from the registration terminal 20, and obtains, in response to the image search request, the similarities s between the image and respective images registered in the image search DB 112*a*. The registration server 104 transmits the highest similarity s of the obtained similarities s, as a search result to the registration terminal 20. The similarity s as the search result transmitted from the registration server 104 is received by the registration terminal 20, and acquired by the registration tool 21 (Step S902).

At the next step S903, the registration tool 21 makes a threshold determination by comparing the similarity s acquired at Step S902 with a third threshold. If the similarity s is determined to be lower than the third threshold ("s<threshold" at Step S903), the registration tool 21 returns the process to Step S901 to perform the processing for the next check region (such as the check region 774*b*).

In contrast, if, at Step S903, the similarity s is determined to be equal to or higher than the third threshold ("s≥threshold" at Step S903), the registration tool 21 shifts the process to Step S904. At Step S904, the registration tool 21 sets the weight value w to a negative value for the check region (such as the check region 774*a*) currently subjected to the processing to restrain the search therein. For example, the registration tool 21 sets the weight value w=−1 for the check region.

At the next step S905, the registration tool 21 determines whether the processing has ended for all the check regions specified at Step S900. If the processing is determined to have not ended for all the check regions ("No" at Step S905), the registration tool 21 returns the process to Step S901 to perform the processing for the next check region (such as the check region 774*b*).

If, at Step S905, the processing is determined to have ended for all the check regions ("Yes" at Step S905), the registration tool 21 shifts the process to Step S906. At Step S906, the registration tool 21 generates an XML code indicating the check regions and the weight values w. The code generated at Step S906 can be the same as, for example, the code 141*a* explained using FIG. 52A, so that detailed description thereof will be omitted here. After the XML code is generated, the sequence of processes of the similar image check ends.

Figure 64:
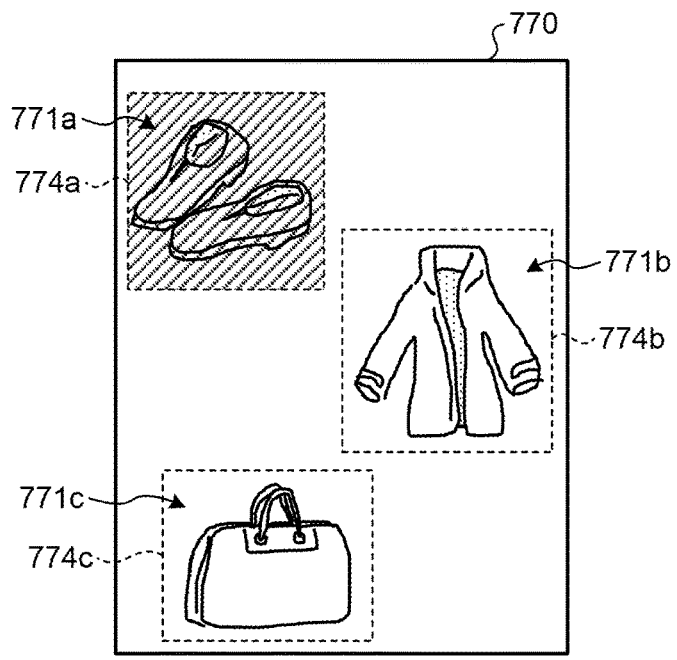
FIG. 64 is a diagram illustrating an example of a result of completion of the similar image check for the check target image according to the second modification of the search process according to the embodiments.

FIG. 64 illustrates an example of a result of completion of the similar image check for the check target image 770 according to the second modification of the search process according to the embodiments. The example of FIG. 64 is an example in which the threshold determination at Step S903 determines that the acquired similarity s is equal to or higher than the third threshold only in the check region 774*a*, and that the acquired similarity s is lower than the third threshold in the other check regions 774*b* and 774*c*. In this case, the weight value w is set to a negative value for the check region 774*a*, and no weight values w are set for the other check regions 774*b* and 774*c*.

In this manner, in the second modification of the search process according to the embodiments, the image search is performed for the images in the respective check regions specified in the check target image, and the similar image check is performed based on the similarities s obtained as the results of the image search. The check region having the high similarity s as a result of the similar image check is regarded to be similar to an already registered image, and the weight value to restrain the search is set for the check region.

Consequently, if an image including an image similar to an already registered image is newly registered, the newly registered image is restrained from being found redundantly with the already registered image. In this case, the newly registered image need not even be edited.

In the description above, the registration tool 21 sets the weight value w to a negative value for the check region when the similarity s thereof is determined to be equal to or higher than the third threshold at Step S903. However, the setting is not limited to this example. For example, as described above, the setting may be made so as to force the similarity s to be zero in the check region, or so as to the ignore feature quantities in the check region.

Another Example of Second Modification of Search Process According to Embodiments The following describes another example of the second modification of the search process according to the embodiments. In the second modification of the search process according to the embodiments described above, the weight value w to restrain the search is set for the check region having the similarity s equal to or higher than the threshold. In contrast, in the other example of the second modification of the search process according to the embodiments, another check region different from the check region having the similarity s equal to or higher than the threshold, that is, a check region having the similarity s lower than the threshold is determined to be an important region, and the weight value w for the important region is set to, for example, a positive value greater than 0. This can also restrain the search in regions that are regarded to include already registered similar images.

Figure 65:
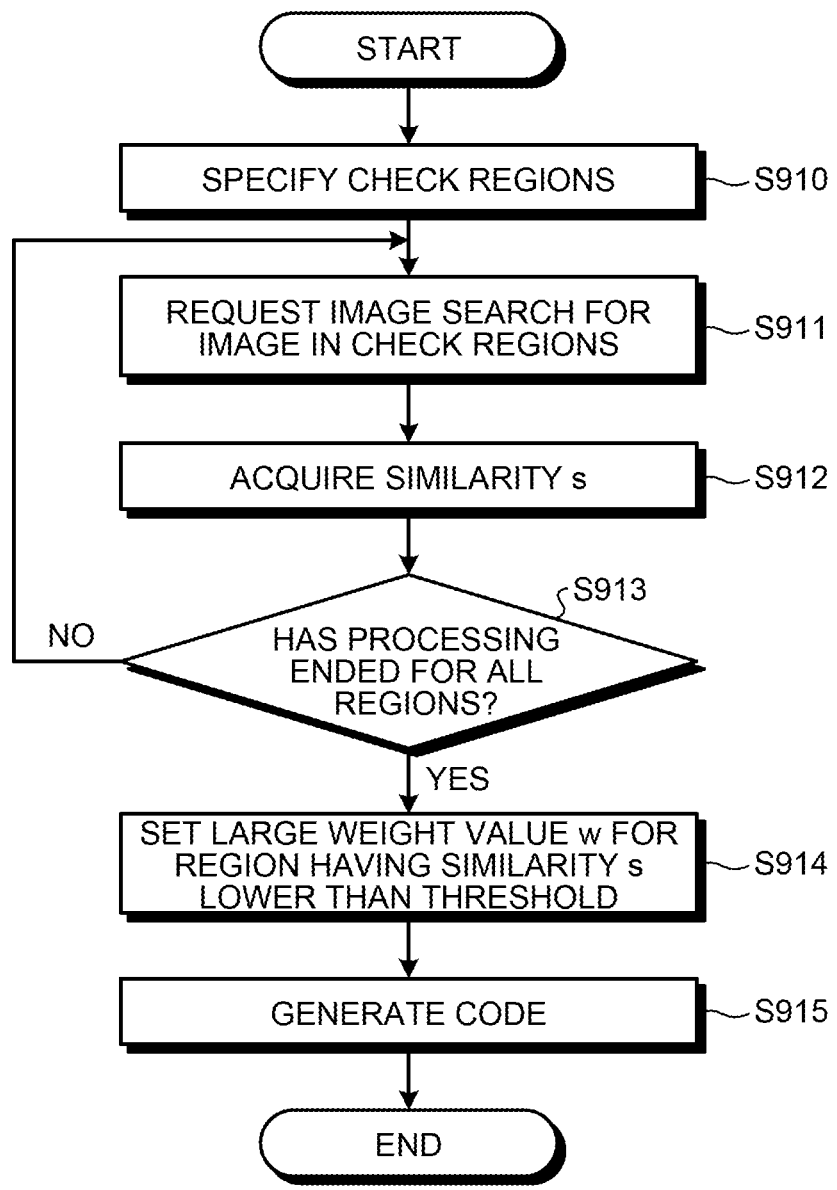
FIG. 65 is an exemplary flowchart illustrating the weighting process in the similar image check according to another example of the second modification of the search process according to the embodiments.

FIG. 65 is an exemplary flowchart illustrating the weighting process in the similar image check according to the other example of the second modification of the search process according to the embodiments. For example, if, at Step S126 in the flowchart of FIG. 13, the campaign is determined to be newly registered, or if the button 4888 arranged on the edit screen 480 illustrated in FIG. 22 is operated to instruct the similar image check, the registration tool 21 starts the process according to the flowchart of FIG. 65. An image (such as the check target image 770) to be subjected to the similar image check is assumed to have already been displayed in the page edit region 484 of the edit screen 480 prior to the start of the process according to the flowchart of FIG. 65.

At Step S910, the registration tool 21 specifies, according to a user operation, one or more check regions in the check target image 770.

Subsequently, processing of Steps S911 to S913 is performed check region by check region. At Step S911, in the same manner as at Step S901 described above, the registration tool 21 requests the registration server 104 to perform the image search for an image in one of the check regions specified at Step S910. According to the image and the image search request transmitted from the registration terminal 20, the registration server 104 obtains the similarities s between the image and respective images registered in the image search DB 112a, and transmits the highest similarity s of the obtained similarities s, as a search result to the registration terminal 20. This similarity s is received by the registration terminal 20, and acquired by the registration tool 21 (Step S912).

At the next step S913, the registration tool 21 determines whether the processing has ended for all the check regions specified at Step S910. If the processing is determined to have not ended for all the check regions ("No" at Step S913), the registration tool 21 returns the process to Step S911 to perform the processing for the next check region.

If, at Step S913, the processing is determined to have ended for all the check regions ("Yes" at Step S913), the registration tool 21 shifts the process to Step S914. At Step S914, the registration tool 21 makes threshold determinations for the respective check regions specified at Step S910 based on the respective similarities s acquired at Step S912, and extracts check regions having the similarity s lower than a fourth threshold. The registration tool 21 sets the weight value w to a positive value greater than 0 for each of the extracted check regions having the similarity s lower than the fourth threshold. At the next step S915, the registration tool 21 generates an XML code indicating the check regions and the weight values w.

In this example, the weight values w are collectively set for the check regions. However, the setting is not limited to this example. The method of sequentially setting the weight values w for the respective check regions has been described using the flowchart of FIG. 62 in the second modification of the search process according to the embodiments described above. This method is also applicable to the other example of the second modification of the search process according to the embodiments. In the same manner, the method of collectively setting the weight values w for the check regions according to the other example of the second modification of the search process according to the embodiments is applicable to the second modification of the search process according to the embodiments described above.

Figure 66A:
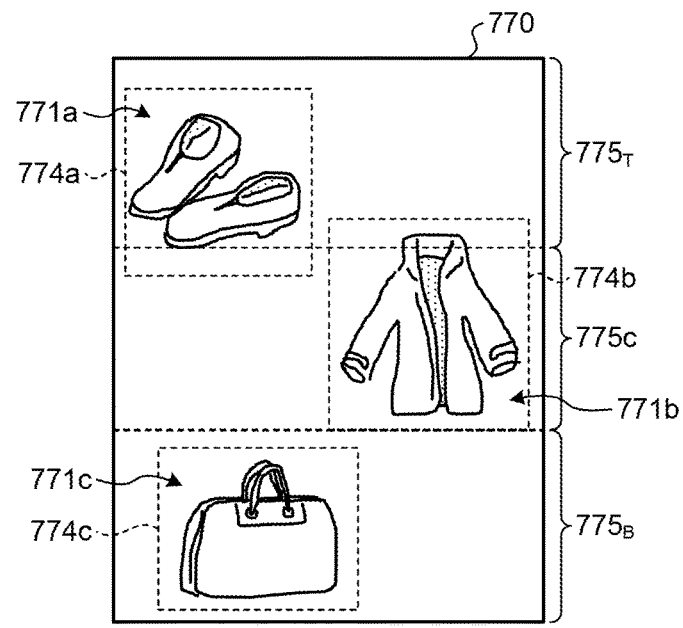
FIG. 66A is a diagram for explaining still another example of the second modification of the search process according to the embodiments.
Figure 66B:
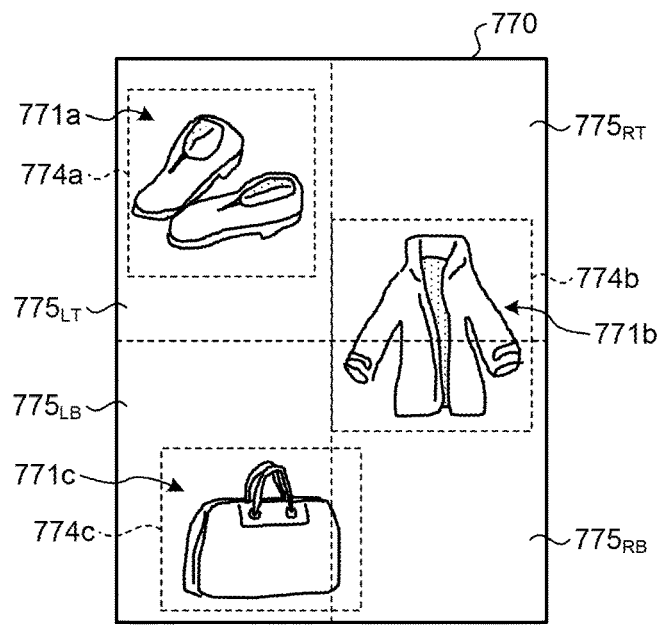
FIG. 66B is another diagram for explaining the still other example of the second modification of the search process according to the embodiments.
Figure 67:
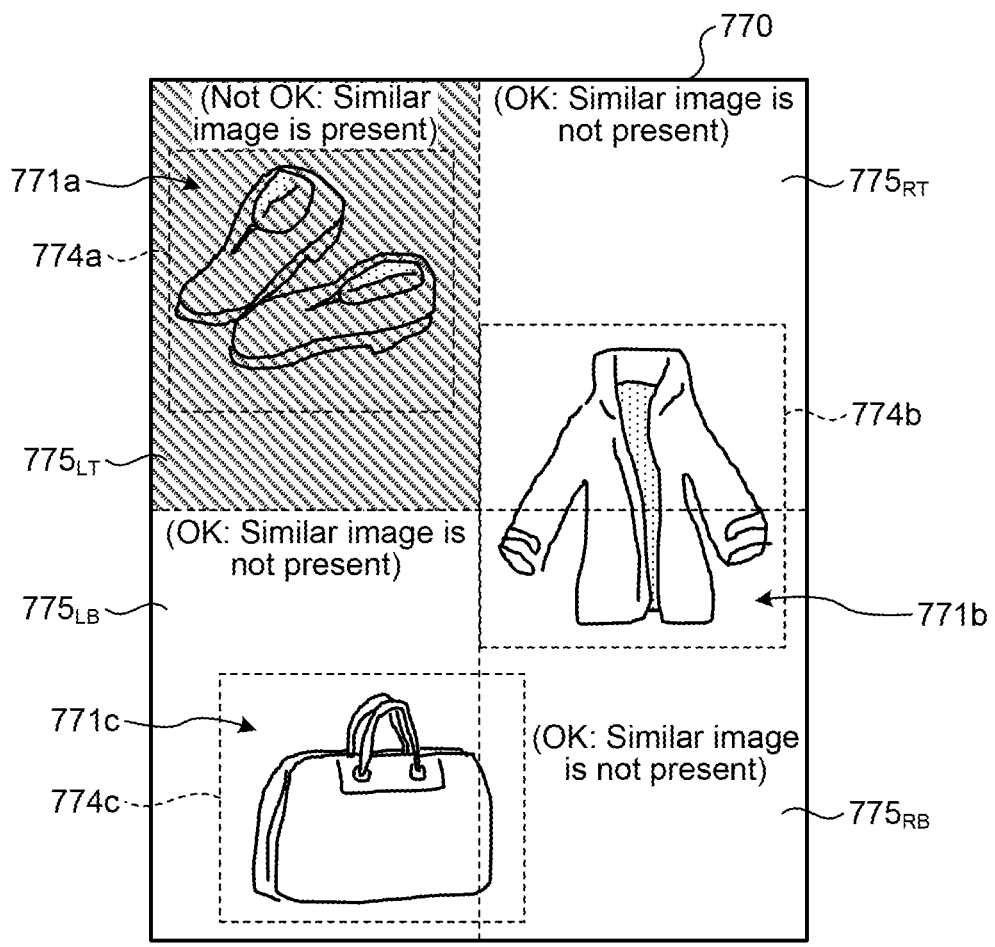
FIG. 67 is still another diagram for explaining the still other example of the second modification of the search process according to the embodiments.

Still Another Example of Second Modification of Search Process According to Embodiments The following describes still another example of the second modification of the search process according to the embodiments using FIGS. 66A, 66B, and 67. In FIGS. 66A, 66B, and 67, the same reference numerals are assigned to components common to those in FIG. 63 explained above, and detailed description thereof will be omitted.

In the still other example of the second modification of the search process according to the embodiment, in the same manner as in the first example of the similar image check described above, the segment regions obtained by dividing the check target image are determined to be check regions, and the similar image check is performed for the respective check regions. FIG. 66A corresponds to the FIG. 41A explained above, and illustrates an example in which the check target image 770 is vertically divided into three regions to form check regions $775_T$, $775_C$, and $775_B$ in the order from the top. FIG. 66B corresponds to the FIG. 41B explained above, and illustrates an example in which the check target image 770 is divided in a grid-like manner into four regions to form a check region $775_{LT}$ at the upper left, a check region $775_{RT}$ at the upper right, a check region $775_{LB}$ at the lower left, and a check region $775_{RB}$ at the lower right.

The dividing positions and the number of divisions of the check target image 770 are not limited. The registration tool 21 may set the dividing positions to positions specified by user operations, or may set the dividing positions according to the content of the check target image 770. The dividing positions may naturally be set in a fixed manner, as illustrated in the examples of FIGS. 66A and 66B. The following description assumes that the check target image 770 is divided in a grid-like manner into four regions, as illustrated in FIG. 66B.

For example, the registration tool 21 clips images in the check regions $775_{LT}$, $775_{RT}$, $775_{LB}$, and $775_{RB}$ from the image 770, and transmits the clipped images to the registration server 104, when the button 4888 is operated on the edit screen 480 to instruct the similar image check, or during the similar image check at Step S130 of FIG. 13.

The registration server 104 performs the search processing for similar images similar to the respective images in these check regions $775_{LT}$, $775_{RT}$, $775_{LB}$, and 775R, and obtains the similarities s of the images in the check regions $775_{LT}$, $775_{RT}$, $775_{LB}$, and $775_{RB}$ to respective images registered in the image search DB 112a. The registration server 104 obtains the maximum similarity s in each of the check regions $775_{LT}$, $775_{RT}$, $775_{LB}$, and $775_{RB}$. The registration server 104 transmits the maximum similarities s of the check regions $775_{LT}$, $775_{RT}$, $775_{LB}$, and $775_{RB}$, as search results to the registration terminal 20. The registration terminal 20 transfers the received search results to the registration tool 21.

The registration tool 21 makes threshold determinations for the similarities s indicated by the search results, and determines that images similar to images in the check regions corresponding to similarities s having values equal to or higher than the fourth threshold have already been registered in the image search DB 112a (not OK). The registration tool 21 determines that images similar to images in the check regions corresponding, as results of the threshold determinations, to similarities s having values lower than the fourth threshold are not registered in the image search DB 112*a* (OK).

For example, the registration tool 21 sets the weight value w to a negative value for a check region determined to include an image similar to an image already registered in the image search DB 112*a* to restrain the search in check region, and does set the weight values w for the other check regions. Alternatively, the registration tool 21 determines, for example, that a check region determined to include no image similar to any image already registered in the image search DB 112*a* is an important region, and sets the weight value w for the important region to, for example, a positive value greater than 0.

FIG. 67 illustrates an example of a result of completion of the similar image check for the check target image 770 according to the still other example of the second modification of the search process according to the embodiments. The example of FIG. 67 is an example in which the similarity s acquired for the check region $775_{LT}$ is determined to be equal to or higher than the fourth threshold, and the similarities s acquired for the other check regions $775_{RT}$, $775_{LB}$, and $775_{RB}$ are determined to be lower than the fourth threshold. In this case, the weight value w is set to a negative value for the check region $775_{LT}$, and no weight values w are set for the other check regions $775_{RT}$, $775_{LB}$, and $775_{RB}$.

Naturally, in this still other example of the second modification of the search process according to the embodiment, the weight values w may be set to positive values greater than 0 for the check regions $775_{RT}$, $775_{LB}$, and $775_{RB}$ having the similarities s lower than the fourth threshold, and the weight value w may be left unset for the check region $775_{LT}$ that is determined to have the similarity s equal to or higher than the fourth threshold, in the same manner as in the second modification of the search process according to the embodiments described above.

This still other example of the second modification of the search process according to the embodiment provides the effect of the second modification of the search process according to the embodiments described above, and, in addition, can reduce burden for the user operating the registration terminal 20 to perform the similar image check, by determining in advance the dividing positions of the check target image 770.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:
at least one terminal device, the at least one terminal device being one more of a back-end operator terminal device and a front-end client terminal device; and
an image search system including,
a memory configured to store therein image data, linkage information associated with the image data, and identification information identifying an image search program; and
a processor configured to:
partition the memory into a first storage area and a second storage area such that access to the first storage area is limited to only the back-end operator terminal device,
associate the identification information and setting information, the setting information indicating whether to search for the image data in the first storage area or the second storage area in the memory,
store the image data in one of the first storage area and the second storage area based on the setting information such that, when the image data is stored in the second storage area, the image data is not accessible by the front-end client terminal device,
receive, from the at least one terminal device, a search request for the image data,
accept the search request for the image data corresponding to a trial request received from the back-end operator terminal device,
reject the search request for the image data corresponding to the trial request received from the front-end operator terminal device,
determine whether the search request from the terminal device includes the identification information,
set a searchable storage area as one of the first storage area and the second storage area, based on the identification information and the setting information, in response to determining that the search request from the terminal device includes the identification information,
set the searchable storage area as the second storage area, in response to determining that the search request from the at least one terminal device does not include the identification information,
set a region specified for the image data stored in the memory and a weight of the region for search,
search the searchable storage area for the image data received from the at least one terminal device by reflecting the weight set for the region to generate a search result, and
transmit the search result to the at least one terminal device.

2. The information processing system according to claim 1, wherein the processor is configured to:
receive the image data of a trial image.

3. The information processing system according to claim 2, wherein the processor is configured to,
 search for the image data to be newly registered by,
  setting the image data that is stored in the memory as search targets, and
  searching for the image data to generate the search result.

4. The information processing system according to claim 1, wherein the back-end operator terminal device is a first back-end operator terminal associated with a first account, and the processor is configured to manage the first account associated with the back-end operator terminal device such that the processor is configured to distinguish the first account associated with the first back-end operator terminal from a second account associated with a second back-end operator terminal by,
 assigning a module ID to the first back-end operator terminal, and
 associating an application program installed in the front-end client terminal device with the module ID such that the module ID indicates that the application program is associated with the first account.

5. The information processing system according to claim 4, wherein the identification information included in the search request received from the at least one terminal device includes the module ID such that the processor is configured to set the searchable storage area based at least on the module ID.

6. An information processing method comprising:
 partitioning a memory into a first storage area and a second storage area such that, among at least one terminal device including a back-end operator terminal device and a front-end client terminal device, access to the first storage area is limited to only the back-end operator terminal device;
 associating identification information and setting information, the setting information indicating whether to search for image data in the first storage area or the second storage area in the memory associated with an image search system;
 storing the image data in one of the first storage area and the second storage area based on the setting information such that, when the image data is stored in the second storage area, the image data is not accessible by the front-end client terminal device;
 receiving, from the at least one terminal device, a search request for the image data;
 accepting the search request for the image data corresponding to a trial request received from the back-end operator terminal device;
 rejecting the search request for the image data corresponding to the trial request received from the front-end operator terminal device;
 determining whether the search request from the at least one terminal device includes the identification information;
 setting a searchable storage area as one of the first storage area and the second storage area based on the identification information and the setting information, in response to determining that the search request from the at least one terminal device includes the identification information;
 setting the searchable storage area as, in response to determining that the search request from the at least one terminal device does not include the identification information;
  setting a region specified for the image data stored in the memory and a weight of the region for search;
 searching the searchable storage area for the image data received from the at least one terminal device by reflecting the weight set for the region to generate a search result; and
 transmitting the search result to the at least one terminal device.

7. The information processing method according to claim 6, further comprising:
 receiving the image data of a trial image.

8. The information processing method according to claim 7, further comprising:
 searching for the image data to be newly registered by,
  setting the image data that is stored in the memory as search targets, and
  searching for the image data to generate the search result.

9. The information processing method according to claim 6, wherein the back-end operator terminal device is a first back-end operator terminal associated with a first account, and the method further comprises:
 managing the first account associated with the back-end operator terminal device to distinguish the first account associated with the first back-end operator terminal from a second account associated with a second back-end operator terminal by,
  assigning a module ID to the first back-end operator terminal, and
  associating an application program installed in the front-end client terminal device with the module ID such that the module ID indicates that the application program is associated with the first account.

10. The information processing method according to claim 9, wherein the identification information included in the search request received from the at least one terminal device includes the module ID such that the setting sets the searchable storage area based at least on the module ID.

11. An information processing apparatus configured to communicate with a back-end operator terminal device and a front-end client terminal device, the information processing apparatus comprising:
 a memory configured to store therein image data, linkage information associated with the image data, and identification information identifying an image search program; and
 a processor configured to:
  partition the memory into a first storage area and a second storage area such that, among the back-end operator terminal device and the front-end client terminal device, access to the first storage area is limited to only the back-end operator terminal device,
  associate the identification information and setting information, the setting information indicating to search for the image data in the first storage area or the second storage area in the memory,
  store the image data in one of the first storage area and the second storage area based on the setting information such that, when the image data is stored in the second storage area, the image data is not accessible by the front-end client terminal device,
  receive, from a terminal device, a search request for the image data, the terminal device being one of the back-end operator terminal device and the front-end client terminal device, accept the search request for the image data corresponding to a trial request received from the back-end operator terminal device, reject the search request for the image data corresponding to the trial request received from the front-end operator terminal device, determine whether the search request from the terminal device includes the identification information, set a searchable storage area as one of the first storage area and the second storage area based on the identification information and the setting information, in response to determining that the search request from the terminal device includes the identification information, set the searchable storage area as the second storage area, in response to determining that the search request from the terminal device does not include the identification information, set a region specified for the image data stored in the memory and a weight of the region for search, search the searchable storage area for the image data received from the terminal device by reflecting the weight set for the region to generate a search result, and transmit the search result to the terminal device.

12. The information processing apparatus according to claim 11, wherein the processor is configured to:
receive the image data of a trial image.

13. The information processing apparatus according to claim 12, wherein the processor is configured to, search for image data to be newly registered by,
setting the image data that is stored in the memory as search targets before the image data is registered in the memory, and
searching for the image data to generate the search result.

14. The information processing apparatus according to claim 11, wherein the back-end operator terminal device is a first back-end operator terminal associated with a first account, and the processor is configured to manage the first account associated with the back-end operator terminal device such that the processor is configured to distinguish the first account associated with the first back-end operator terminal from a second account associated with a second back-end operator terminal by,
assigning a module ID to the first back-end operator terminal, and
associating an application program installed in the front-end client terminal device with the module ID such that the module ID indicates that the application program is associated with the first account.

15. The information processing apparatus according to claim 14, wherein the identification information included in the search request received from the terminal device includes the module ID such that the processor is configured to set the searchable storage area based at least on the module ID.

* * * * *